(12) United States Patent
Gordon

(10) Patent No.: US 7,833,134 B2
(45) Date of Patent: Nov. 16, 2010

(54) EXERCISE DEVICE

(76) Inventor: Joel D. Gordon, 38 Gwynns Mill Ct., Owings Mills, MD (US) 21117

( * ) Notice: Subject to any disclaimer, the term of this patent is extended or adjusted under 35 U.S.C. 154(b) by 0 days.

(21) Appl. No.: 12/591,672

(22) Filed: Nov. 27, 2009

(65) Prior Publication Data

US 2010/0152001 A1   Jun. 17, 2010

Related U.S. Application Data

(62) Division of application No. 11/501,780, filed on Aug. 10, 2006, now Pat. No. 7,645,215.

(60) Provisional application No. 60/707,026, filed on Aug. 11, 2005.

(51) Int. Cl.
*A63B 22/00* (2006.01)
*A63B 22/04* (2006.01)
*A63B 71/00* (2006.01)

(52) U.S. Cl. .......................................... 482/52; 482/51

(58) Field of Classification Search ............. 482/51–53, 482/57, 62, 70–71; *A63B* 22/00, 22/04, 71/00
See application file for complete search history.

(56) References Cited

U.S. PATENT DOCUMENTS

| | | |
|---|---|---|
| 219,439 A | 9/1879 | Blend |
| 3,316,898 A | 5/1967 | Brown |
| 3,316,899 A | 5/1967 | Raeder |
| 3,970,302 A | 7/1976 | McFee |
| 3,995,491 A | 12/1976 | Wolfla, Ii |
| 4,023,795 A | 5/1977 | Pauls |
| 4,053,173 A | 10/1977 | Chase, Sr. |
| 4,185,622 A | 1/1980 | Swenson |
| 4,188,030 A | 2/1980 | Hooper |
| 4,379,566 A | 4/1983 | Titcomb |
| 4,456,276 A | 6/1984 | Bortolin |
| 4,456,279 A | 6/1984 | Dirck |
| 4,470,597 A | 9/1984 | McFee |
| 4,496,147 A | 1/1985 | DeCloux et al. |
| 4,509,742 A | 4/1985 | Cones |
| 4,555,109 A | 11/1985 | Hartmann |
| 4,561,318 A | 12/1985 | Schirrmacher |

(Continued)

FOREIGN PATENT DOCUMENTS

DE   2919494   11/1980

*Primary Examiner*—LoAn H. Thanh
*Assistant Examiner*—Oren Ginsberg
(74) *Attorney, Agent, or Firm*—Rosenberg, Klein & Lee

(57) ABSTRACT

An exercise device upon which a user generally standing upright supported by foot platforms suspended from a frame via linkages in which the linkage lengths and pivot points correspond generally to the users upper and lower legs and hip and knee joints. This device not only allows natural free and spontaneous leg movement, able to simulate such exercises as walking, jogging, running, stepping, skiing or gliding, bicycling, climbing, reverse action and various isolated leg exercises, where the exercises can be performed at random generally without the need to reconfigure the device. This device preferably includes an isolation system capable of simulating natural forces throughout the entire range of movement in the horizontal and/or vertical plane. A safety/suspension system can be provided, alone or in combination with the isolation system, to resist sudden foot movement in the same direction, yet allows a slow and controlled tilting of the linkages whereby the user may simulate uphill and downhill travel.

20 Claims, 36 Drawing Sheets

U.S. PATENT DOCUMENTS

| | | |
|---|---|---|
| 4,679,786 A | 7/1987 | Rodgers |
| 4,685,666 A | 8/1987 | DeCloux |
| 4,708,338 A | 11/1987 | Potts |
| 4,709,918 A | 12/1987 | Grinblat |
| 4,720,093 A | 1/1988 | Del Mar |
| 4,733,858 A | 3/1988 | Lan |
| 4,779,863 A | 10/1988 | Yang |
| 4,786,050 A | 11/1988 | Geschwender |
| 4,850,585 A | 7/1989 | Dalebout |
| 4,869,494 A | 9/1989 | Lambert, Sr. |
| 4,900,013 A | 2/1990 | Rodgers, Jr. |
| 4,940,233 A | 7/1990 | Bull et al. |
| 4,949,954 A | 8/1990 | Hix |
| 4,949,993 A | 8/1990 | Stark et al. |
| 4,951,942 A | 8/1990 | Walden |
| 4,989,857 A | 2/1991 | Kuo |
| 5,000,442 A | 3/1991 | Dalebout et al. |
| 5,000,443 A | 3/1991 | Dalebout et al. |
| 5,038,758 A | 8/1991 | Iams et al. |
| 5,039,087 A | 8/1991 | Kuo |
| 5,039,088 A | 8/1991 | Shifferaw |
| 5,040,786 A | 8/1991 | Jou |
| 5,048,821 A | 9/1991 | Kuo-Liang |
| 5,062,627 A | 11/1991 | Bingham |
| 5,129,872 A | 7/1992 | Dalton et al. |
| 5,131,895 A | 7/1992 | Rogers, Jr. |
| 5,135,447 A | 8/1992 | Robards, Jr. et al. |
| 5,149,312 A | 9/1992 | Croft et al. |
| 5,186,697 A | 2/1993 | Rennex |
| 5,195,935 A | 3/1993 | Fencel |
| 5,242,343 A | 9/1993 | Miller |
| 5,279,529 A | 1/1994 | Eschenbach |
| 5,279,530 A | 1/1994 | Hess |
| 5,290,211 A | 3/1994 | Stearns |
| 5,295,928 A | 3/1994 | Rennex |
| 5,299,993 A | 4/1994 | Habing |
| 5,336,141 A | 8/1994 | Vittone |
| 5,352,169 A | 10/1994 | Eschenbach |
| 5,383,829 A | 1/1995 | Miller |
| 5,401,226 A | 3/1995 | Stearns |
| 5,419,747 A | 5/1995 | Piaget et al. |
| 5,423,729 A | 6/1995 | Eschenbach |
| 5,496,235 A | 3/1996 | Stevens |
| 5,518,473 A | 5/1996 | Miller |
| 5,527,246 A | 6/1996 | Rodgers, Jr. |
| 5,529,554 A | 6/1996 | Eschenbach |
| 5,529,555 A | 6/1996 | Rodgers, Jr. |
| 5,540,637 A | 7/1996 | Rodgers, Jr. |
| 5,549,526 A | 8/1996 | Rodgers, Jr. |
| 5,573,480 A | 11/1996 | Rodgers, Jr. |
| 5,577,985 A | 11/1996 | Miller |
| 5,593,371 A | 1/1997 | Rodgers, Jr. |
| 5,593,372 A | 1/1997 | Rodgers, Jr. |
| 5,595,553 A | 1/1997 | Rodgers, Jr. |
| 5,611,756 A | 3/1997 | Miller |
| 5,637,058 A | 6/1997 | Rodgers, Jr. |
| 5,735,773 A | 4/1998 | Vittone et al. |
| 5,746,681 A | 5/1998 | Bull |
| 5,769,760 A | 6/1998 | Lin et al. |
| 5,788,610 A | 8/1998 | Eschenbach |
| 5,792,026 A | 8/1998 | Maresh et al. |
| 5,792,027 A | 8/1998 | Gvoich |
| 5,792,028 A | 8/1998 | Jarvie |
| 5,792,029 A | 8/1998 | Gordon |
| 5,813,949 A | 9/1998 | Rodgers, Jr. |
| 5,857,940 A | 1/1999 | Husted |
| 5,910,072 A | 6/1999 | Rawls et al. |
| 5,967,944 A | 10/1999 | Vittone et al. |
| 6,036,622 A | 3/2000 | Gordon |
| 6,183,397 B1 | 2/2001 | Stearns et al. |
| 7,226,390 B2 | 6/2007 | Stearns |
| 7,645,215 B2 * | 1/2010 | Gordon ................ 482/52 |

* cited by examiner

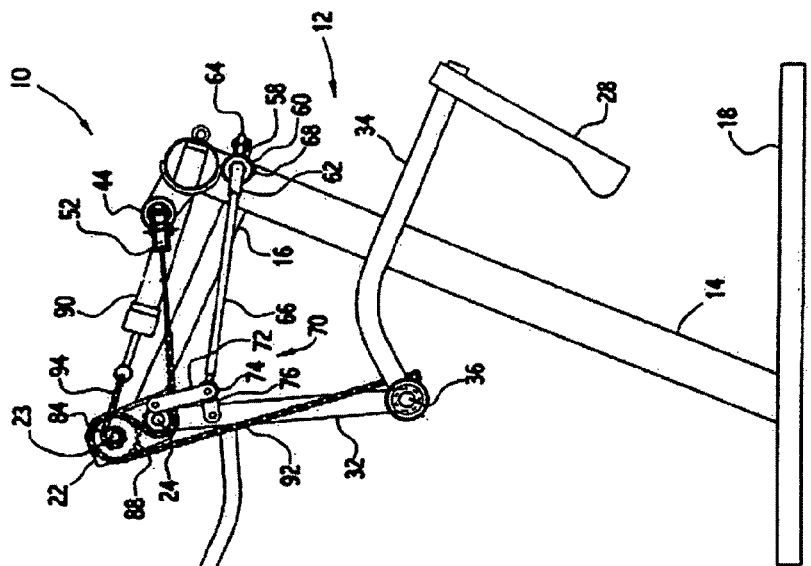
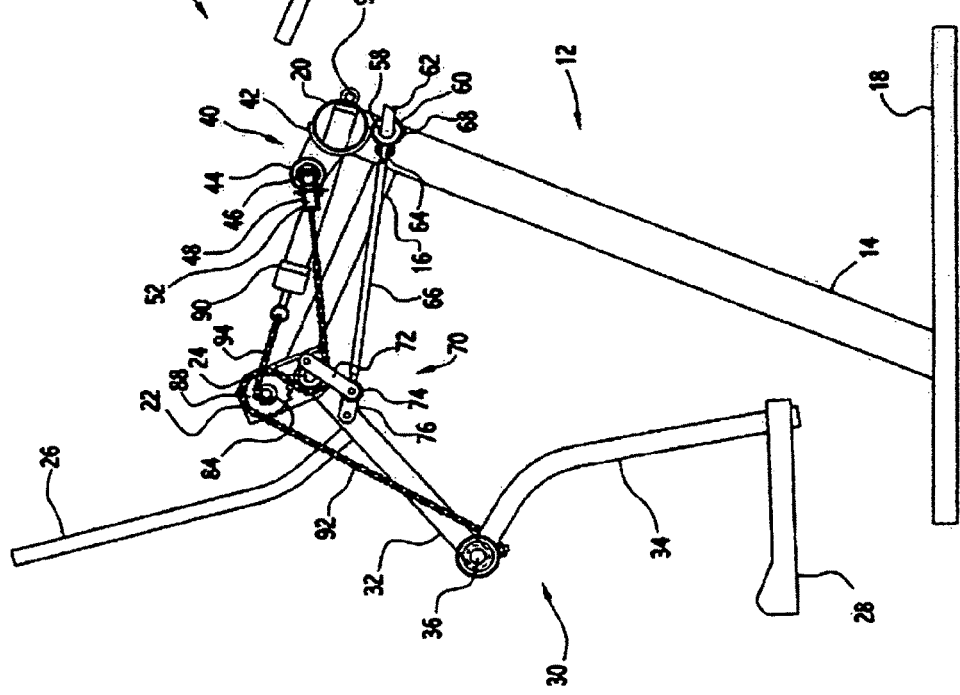
FIG. 5
FIG. 4

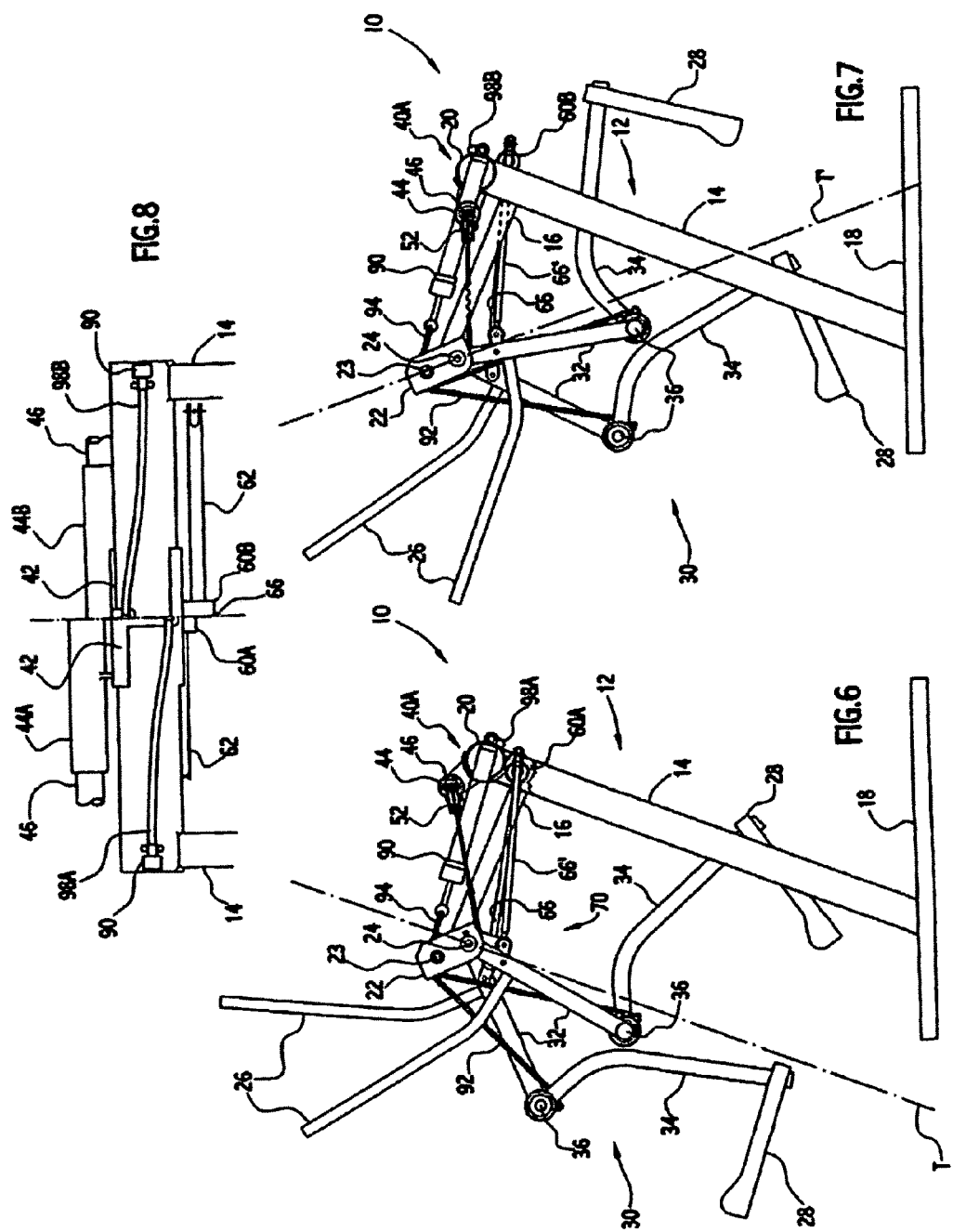

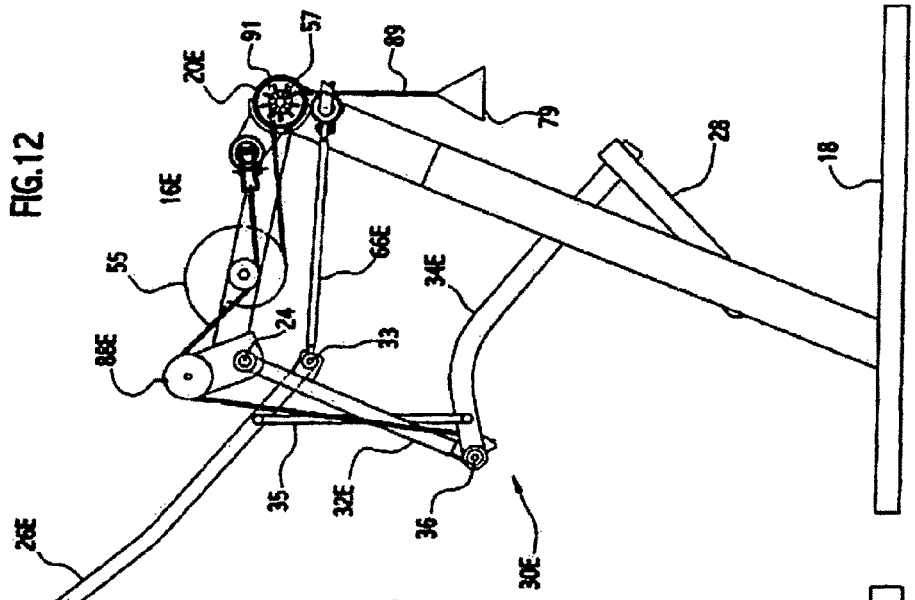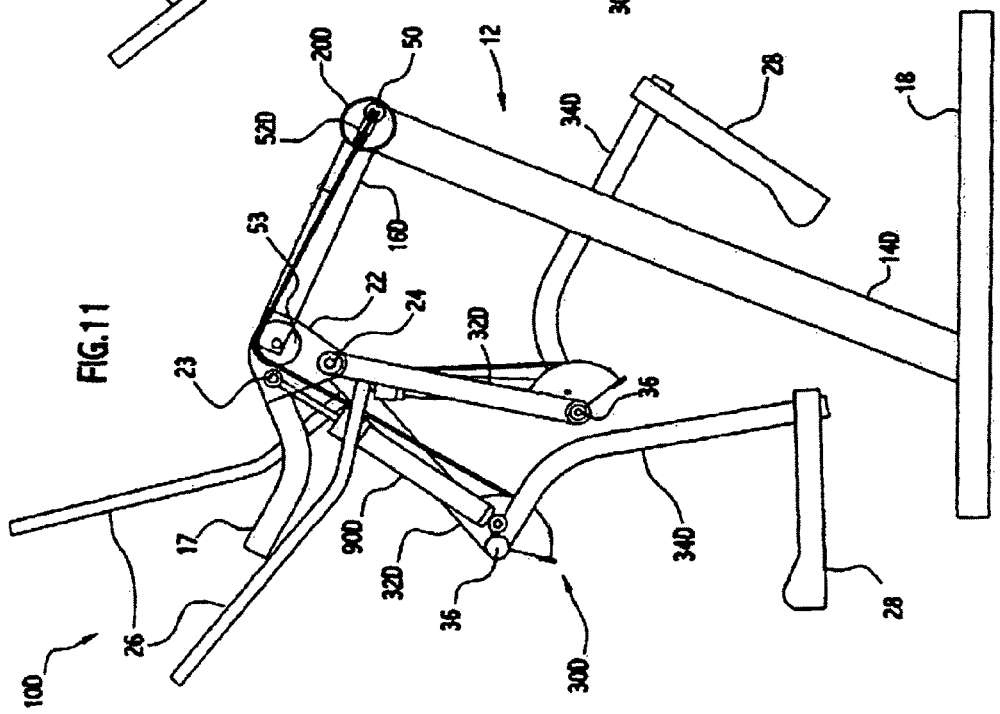

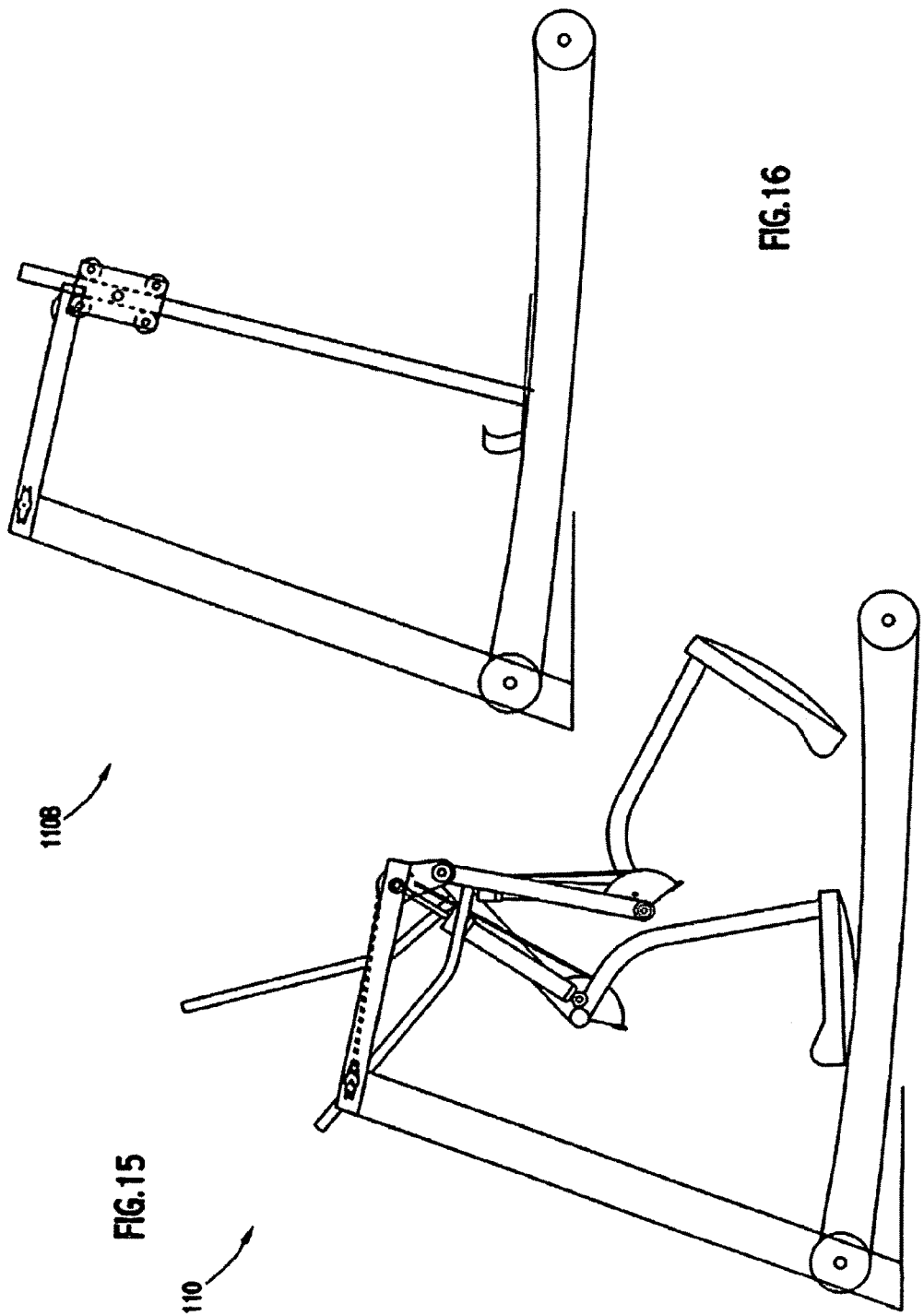

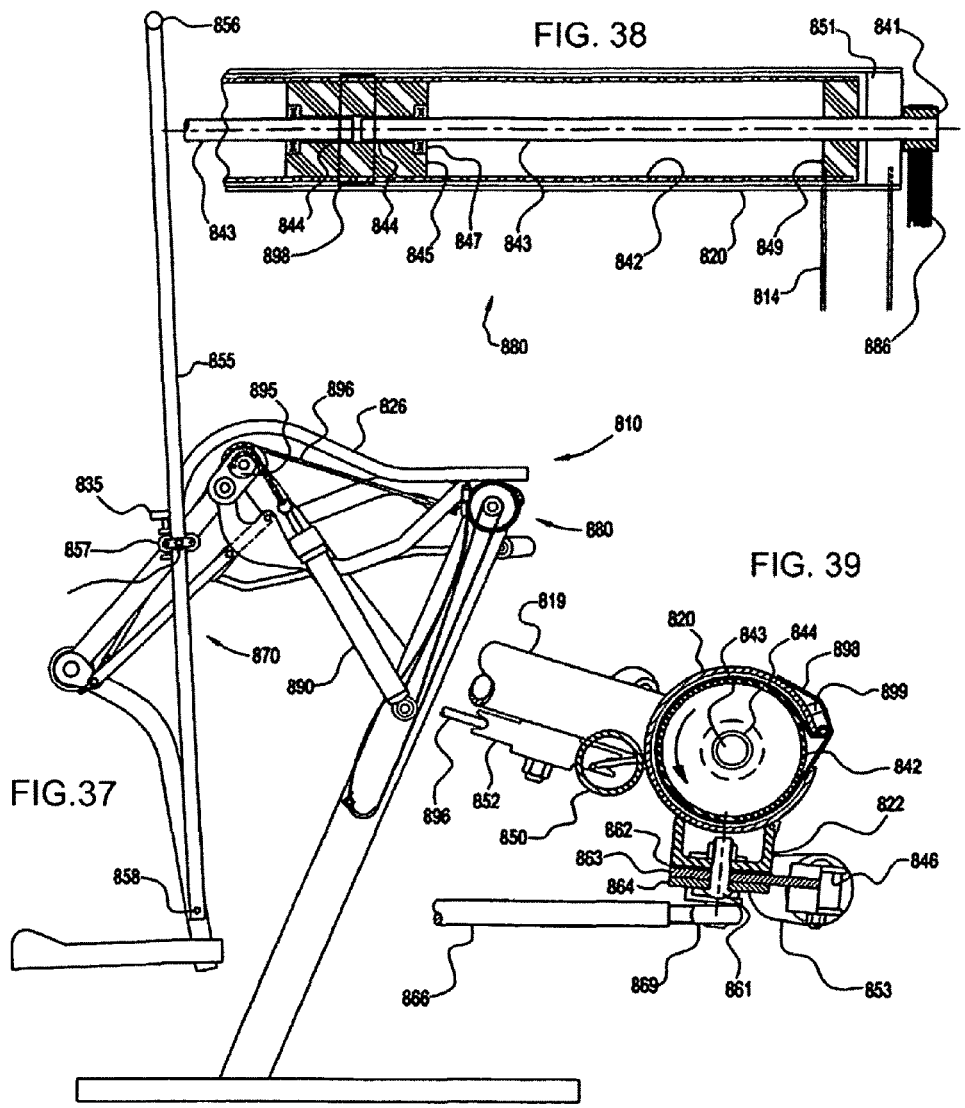

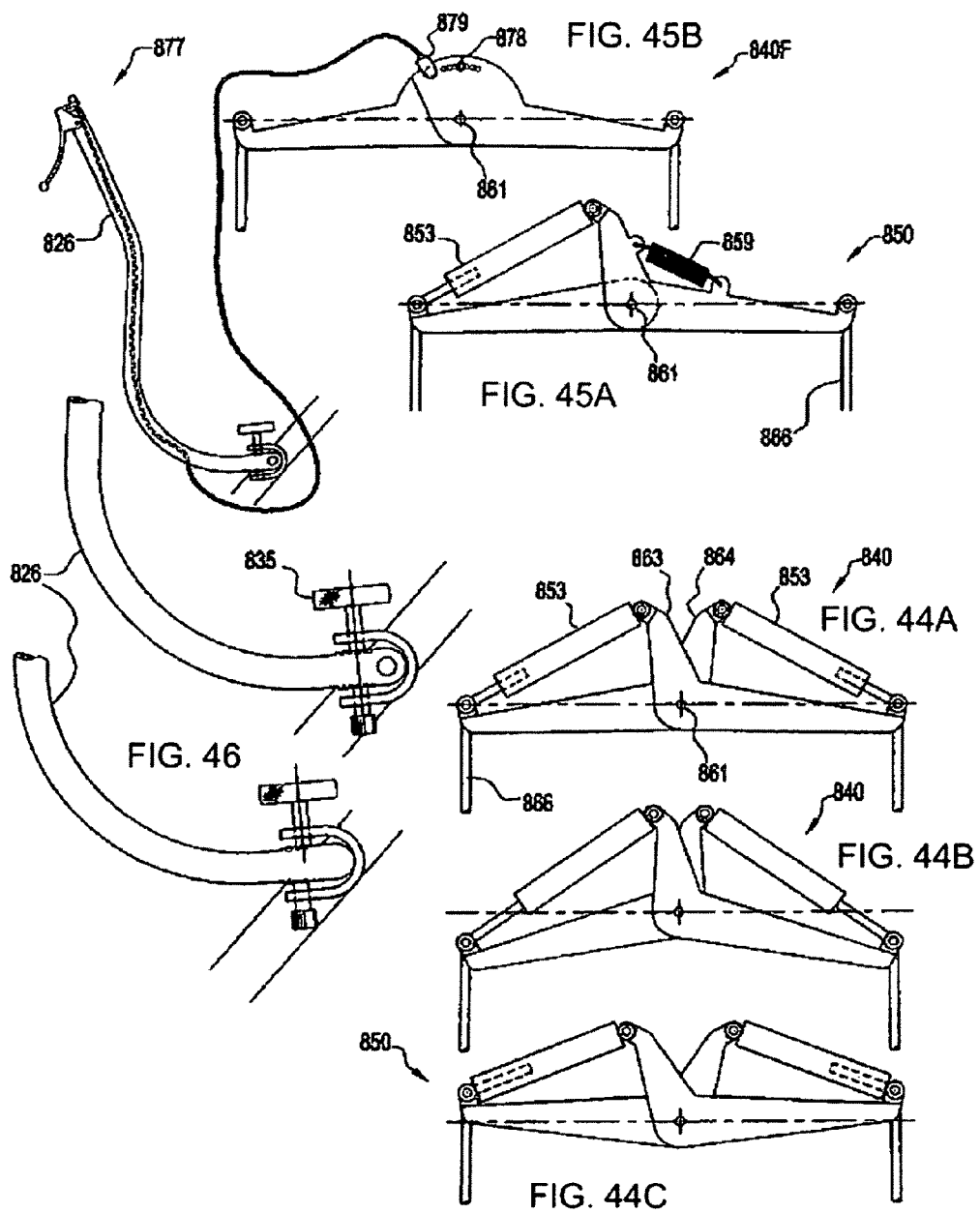

EXERCISE DEVICE

REFERENCE TO RELATED APPLICATIONS

This application is a Divisional patent application of co-pending application Ser. No. 11/501,780, filed on 10 Aug. 2006, now U.S. Pat. No. 7,645,215, which is based upon Provisional Application Ser. No. 60/707,026 filed 11 Aug. 2005. The entire disclosure of the prior application, Ser. No. 11/501,780, from which an oath or declaration is supplied, is considered a part of the disclosure of the accompanying Divisional application and is hereby incorporated by reference.

BACKGROUND OF THE INVENTION

1. Technical Field

The present invention relates generally to exercise equipment and, more particularly, to an exercise device permitting a user to perform walking, running, cross-country skiing and stair stepping exercises.

2. Background Information

A variety of exercise devices have been developed to simulate activities found to be effective in conditioning the body. One type of exercise device, exemplified by U.S. Pat. No. 3,970,302 to McFee, U.S. Pat. No. 4,685,666 to DeCloux, and U.S. Pat. No. 5,129,872 to Dalton et al. permits a user to perform a stair stepping exercise simulating climbing stairs. Another type of exercise device, exemplified by U.S. Pat. No. 4,850,585 to Dalebout, and U.S. Pat. No. 5,419,747 to Piaget, permits a user to perform a striding exercise simulating cross-country skiing or skating.

A disadvantage of such exercise devices is that the user cannot change the type of exercise being performed without mechanical adjustment of the device. One exercise device, exemplified by U.S. Pat. Nos. 5,290,211 and 5,401,226 to Stearns permits a user standing on foot supports to perform simultaneously a stair stepping or climbing type exercise and a cross country skiing or skating type exercise. The foot supports are mounted on a pair of generally horizontal linkages pivotally connected to a pair of vertical linkages at a first pivot location disposed at about the same elevation as the user's feet allowing the horizontal linkage to pivot up and down. The vertical linkages are pivotally connected to a frame at a second pivot location spaced forwardly of the user's feet and hips allowing the vertical linkages to move back and forth. While this type of device permits multiple exercises to be performed, it suffers from many disadvantages when used to simulate some of the exercises described above. For example, a disadvantage of mounting the horizontal linkages in cantilevered relation to the vertical linkages is that some force-resisting member is needed to prevent the foot supports from impacting the floor during use. In addition, complicated and costly mechanisms such as parallelogram linkages are needed to counteract tilting of the foot supports in directions apposed to the natural direction or tilt of the user's feet during certain types of exercises; and, even with such tilt correcting mechanisms, the foot supports are always maintained in a general position which does not necessarily correspond to the natural movement of the feet during certain exercises. Also, when used to perform exercises involving swinging of the vertical linkages relative to the frame, the placement of the upper pivots forward of the user's hip causes the foot supports to move in an arc having a geometric center offset from the user's hips, thereby detracting from the overall feel and stability of the device.

SUMMARY OF THE INVENTION

Accordingly, it is a primary object of the present invention to overcome the above-mentioned disadvantages of the prior art and to improve exercise devices of the type, which permit striding, walking and other exercises to be performed.

The present invention is generally characterized in an exercise device that permits a user to stand on foot supports suspended from a frame such that they may generally perform at least walking, striding and stair stepping exercises by simply altering their leg motion, and engaging or not engaging optional arm poles for exercising the upper body. Further, alternating from one exercise mode to the other may in most cases be done without stopping movement or having to reconfigure or make adjustments to the device. For example, to perform a striding exercise, users can straighten their legs and swing them forward and backward as if they were cross-country skiing. A stepping exercise can be performed by alternating lifting one knee upward and lowering the other knee. Walking is performed by combining the striding and stepping motions so that the legs move forward and backward while the knees move up and down. The exercises mentioned above may be performed in an upright position but may also be performed in a more rearward or forward tilted position if desired, as the user may simply shift body weight to cause elements of the machine to tilt, simulating uphill and downhill travel. If an exercise device according to the present invention is provided with optional arm poles or levers, a rearward tilted position is had when the user pulls back on both arm poles while leaning back; the further back the user leans, and the greater the pulling force against the arm poles, results in a greater degree of tilt or uphill simulation. Downhill simulation is had, by the user leaning forward and pushing on the arm poles. The exercise device can be provided with an optional safety mechanism that is coupled to the leg members and/or a suspension system linking movement of the leg members to counteract against the user from tilting too quickly past the desired angle of tilt. For example, two spring loaded hydraulic cylinders or a single dual action cylinder can be coupled with a suspension system to cause the tilt of the machine to occur in a more controlled and gradual fashion. Another advantage of such a safety mechanism is that it prevents the foot supports from suddenly moving together in the same direction in an unsafe manner that could cause a user to lose balance and fall.

In another embodiment a climbing exercise can be had by performing the same leg movement as performed for stair climbing while engaging one or more optional handles attached or linked to elements of the machine (such as arm poles) that travel generally upward and downward during the machine's use or travel up and down from a mounted position on the frame.

In another embodiment, for example as shown in FIGS. 18-23b, the walking, striding, stepping and climbing movements are made possible by mounting a suspension system upon the frame at a location near or substantially above the user's hips. Attached to and descending from the suspension system, are support members, a left and a right, where at bottoms ends, a foot platform is affixed to support the user in an upright position. The support members, are attached to the suspension system, and move in arcuate fashion from a pivot point located on the suspension system from an element that generally moves upward and downward, at a location near or substantially above the user's hips. The support members travel in any path desired by the user, whereby, the user can move his or her feet back and forth, up and down, or in circular, elliptical, or in a freeform elliptical pattern. The horizontal, vertical and combination movements of the foot supports are made possible by the support members movement attached to and from two separate pivot points on the suspension system, where from one point, movement is generally upward and downward, and movement from the other point is generally backward and forward. Further, mechanical methods are used that link the twin suspension systems together and force their movements to perform in an opposite movement pattern from one another. Further, the simulation of uphill and downhill travel is accomplished through manually changing the preset position of the suspension system. During the normal or flat ground mode the suspension system is adjusted, so that the foot supports are at a neutral preset position, where each foot support when directly side-by-side, are both positioned near to and directly below the user's hips. Uphill simulation can be had, when the preset foot support position is brought forward of the user's hips, while conversely, downhill simulation is had when the foot supports are drawn rearward to the user's hips. An automatic system using springs or hydraulic cylinders could replace the manual method of configuring the suspension system to allow uphill and/or downhill simulation to adjust automatically.

The support members described above may be used as a guide means to define the movement patterns of a pair of foot supports suspended from one or more leg members or linkages pivotally or glidingly attached elsewhere on the frame, yet linked to the support members, for example as seen in FIGS. 24-28*b*. Alternative foot support members would support the user through independent elements from the suspension system, yet movement would still be controlled by the suspension system. The alternative support member(s) could be used to control the tilt of the foot supports to maintain an angular alignment close to the natural angular alignment of the user's foot throughout the exercises performed. The support members may also be attached to or made apart of a motion control system that may be used to simulate forces of momentum, such as the use of a flywheel(s), to assist the user or to add further realism to the exercise(s). Continuous motion control devices may also be attached to any element influencing the movement of the foot supports for driving the device, similar to a motor on a motorized treadmill. Another system that could be coupled to the device to encourage continuous motion could include a flywheel coupled to a roller or flywheel/roller combination that may be engaged or activated when a downward force is present.

The exercise device according to the present invention can also be provided with a horizontal isolation mechanism that creates resistance to rearward movement of the leg members while causing little or no resistance to forward movement of the leg members. For example, the linkages can be coupled to a one-way clutch that causes a flywheel to be engaged in response to rearward movement of a user's leg and releases the flywheel as the leg moves forward. In a preferred embodiment, the flywheel is disposed within the frame of the exercise device for quiet operation.

Other features of the present invention will become apparent from the following description of the preferred embodiments taken in conjunction with the accompanying drawings, wherein like parts in each of the several figures are identified by the same reference numerals or by reference numerals having the same last two digits, unless otherwise specified.

BRIEF DESCRIPTION OF THE DRAWINGS

The preferred embodiments of the invention, illustrative of the best mode in which applicant contemplated applying the principles of the invention, are set forth in the following description and are shown in the drawings and are particularly and distinctly pointed out.

FIG. 4 is a side view of the device shown in FIGS. 1-3, partly in section, showing the configuration of the device with the leg linkages drawn to a forward position.

FIG. 5 is a side view of the device shown in FIGS. 1-3, partly in section, showing the configuration of the device with the leg linkages positioned more rearward.

FIG. 6 is a side view of the device shown in FIGS. 1-5 showing the position of the leg members and suspension system when operating in tilted uphill mode.

FIG. 7 is a side view of the device shown in FIGS. 1-5 showing the position of the leg members and suspension system when operating in tilted downhill mode.

FIG. 8 is a fragmentary partial view of the rear upper portion of the exercise device shown in FIGS. 1-7. The portion of FIG. 8 left of the center line shows the deflection of the spring rod when the device is in uphill mode as seen in FIG. 6; the portion of FIG. 8 right of the center line shows the same spring rod when in the downhill mode as shown in FIG. 7.

FIG. 11 is a side view of a fourth embodiment of an exercise device according to the present invention showing hydraulic resistance members extending from the frame to the lower leg members.

FIG. 12 is a side view of a fifth embodiment of an exercise device according to the present invention, partly in section, showing a system of resistance using a cam, one-way clutch and flywheel mounted to rotate inside of round tube frame member. Also shown is a modified arm lever which is pivotally attached to upper leg link and linked to lower leg link via a linkage bar resulting in a greater range of arm movement as compared to arm pole fixed to upper leg linkage as shown in previous FIG. 1,2-11.

FIG. 15 is a side view of a seventh embodiment of an exercise device according to the present invention that marries leg components to work in conjunction with a modified treadmill like embodiment.

FIG. 16 is a side view of an eighth embodiment of an exercise device according to the present invention where foot supports suspend from a frame, support user and control impact upon engagement with treadmill like system.

FIG. 37 is a side view of the device illustrated in FIG. 34 showing an optional climbing pole attachment, and an optional arm handle in a folded down position.

FIG. 38 is a partial sectional rear view of the upper rear portion of the device illustrated in FIG. 34 showing the horizontal resistance system, consisting of a drive pulley, internal flywheel housing one-way clutches.

FIG. 39 is a partial sectional side view of the upper rear portion of the device illustrated in FIG. 38, taken through 40-40, showing the attachment of the safety/suspension system to the frame and flywheel braking mechanism.

FIG. 44A is a top view of a safety/suspension system for disallowing sudden foot movement in an exercise device according to the present invention.

FIG. 44B is the same top view of same safety/suspension system shown in FIG. 44A, however in this figure the system is manipulated in an uphill travel mode, where user is tilted back.

FIG. 44C is the same top view of same safety/suspension system shown in FIGS. 44A & 44B, however in this figure the system is manipulated in a downhill travel mode, where user is tilted forward.

FIG. 45A is a top view of a similar safety/suspension system as shown in FIGS. 44A-44C, however a single dual action hydraulic cylinder is used to serve virtually the same function as if two separate cylinders (one a compression and one an extension type) where used.

FIG. 45B is a top view of a similar safety/suspension system as shown in FIGS. 44A-44C illustrating a braking and ball detent system whereby the suspension system may be encouraged to stop in intervals or locked through a brake handle.

FIG. 46 is a partial side view of two similar arm poles or handles for an exercise device according to the present invention with fine adjustment knobs. Arm handles may optionally be configured to be removed or rotated to a storage position.

DESCRIPTION OF THE PREFERRED EMBODIMENTS

Figure 1:
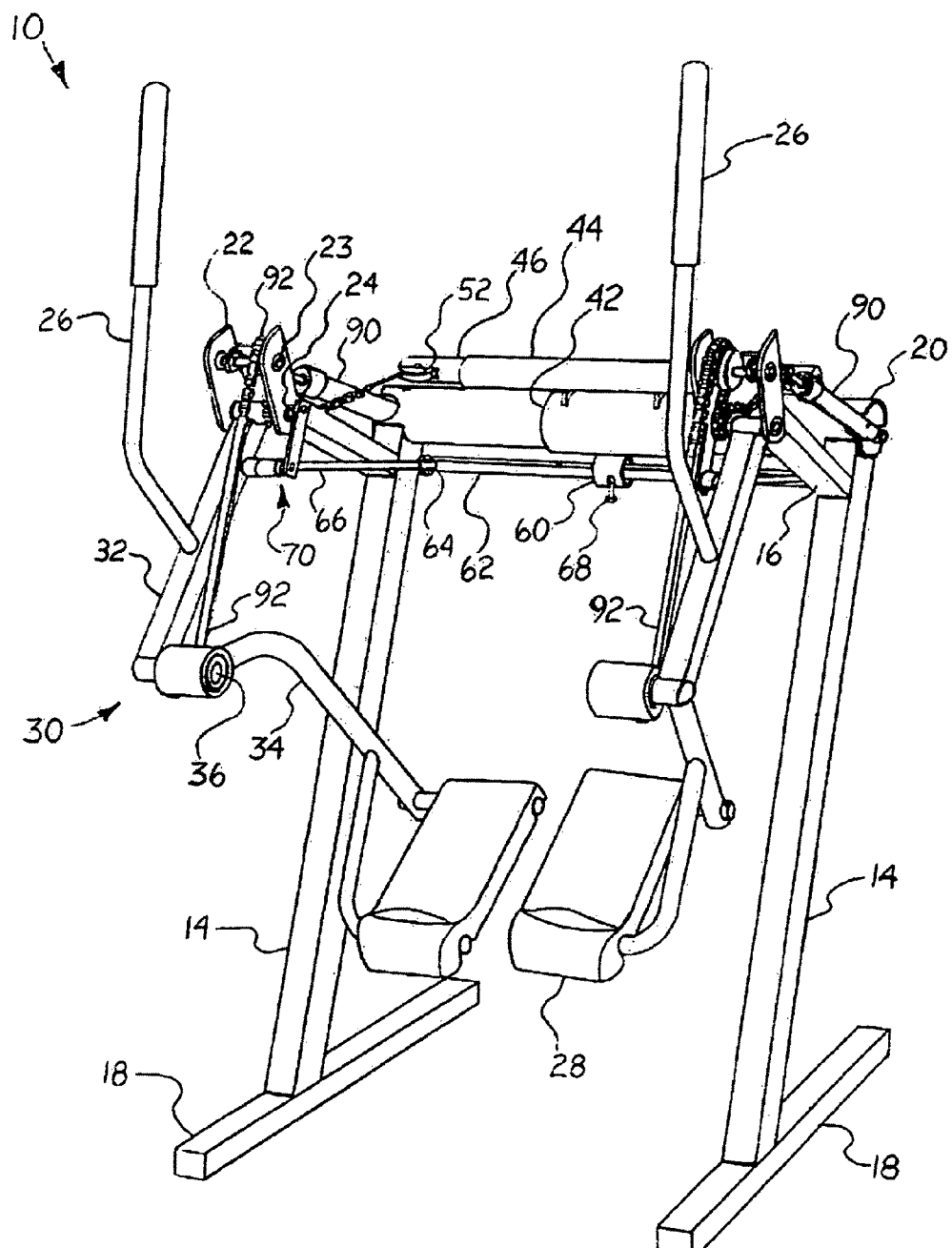
FIG. 1 is a perspective view of a first embodiment of an exercise device according to the present invention.

An exercise device, generally indicated 10, according to the present invention, as shown in FIGS. 1-10, include a pair of foot supports 28 suspended from a frame 12 via a pair of linkages 30. Frame 12 is formed of tubular steel and includes a base 18 formed by a pair of parallel base members adapted to rest on a horizontal surface such as a floor, a pair of uprights 14 extending upward from each base member at an angle, a frame extension 16 formed of a pair of tubular steel members extending forward from the uprights at a perpendicular angle away from upper portion of uprights to a forward position about the user's hips. Affixed to the forward end of each extension tube 16 is a bracket 22 from which each leg linkage 30 is pivotally attached. Each leg linkage 30 includes an upper linkage 32 pivotally connected at a first end to a frame bracket 22 at a hip pivot 24 and pivotally connected at a second end to a lower linkage 34 at a knee pivot 36, such that the knee and hip pivots are generally aligned with the knees and hips, respectively, of a user standing on the foot supports to permit the user to perform walking, striding and stepping exercises, simply by altering their leg motion.

Left and right sides of frame 12 are joined together by a bridge tube 20, which extends horizontally between upper ends of frame uprights 14, maintaining the uprights spaced apart a distance adequate enough to allow the user to stand comfortably between left and right sides of the frame and to operate the device without interference. The bridge tube 20 is formed of round steel tubing sturdy enough to hold left and right sides of frame 12 stable when device is operational. The round shape of the bridge tube provides a surface for which the suspension system 40 rotates about as defined by the user as the user changes body tilt to simulate uphill and/or downhill travel. Suspension system 40 includes a curved arc plate 42 extending at least partly around bridge tube 20 and secured with a clamp or the like allowing rotation about the bridge tube. The suspension system further includes one or more gussets 43 extending radially outward from arc plate 42 to a first suspension tube 44 oriented parallel to the bridge tube, and a second suspension tube 46 fitted telescopically within the first suspension tube for rotation therein. A pair of pulleys 52 are mounted on brackets 48 at opposite ends of the second suspension tube to rotate therewith relative to the first suspension tube. In addition, suspension system 40 is shown as including a third suspension tube 60 secured to a bottom portion of arc plate 42 in parallel relation to the bridge tube. A swing bar 62 extends longitudinally through the third suspension tube 60 and is pinned inside the tube at 68 to pivot thereabout. More specifically, the suspension system works as follows: As the leg members 30 swing back and forth from hip pivot 24, the back and forth generally opposite swing pattern of each upper leg linkage 32 is permitted through the arrangement of linkages, making up the leg interlink system, linking one upper leg linkage to the other. A few inches below the hip pivot, a short link 76 is at its forward end pivotally attached to the upper leg linkage and the rearward end is pivotally attached to both a control link 72 and linkage rod 66 through rod ends 64 affixed to each end of linkage rod 66. Control link 72 pivotally attaches at its upper end to bracket 22 just behind the hip pivot 24. The linkage rods 66 at their rearward end pivotally attach to their corresponding end of swing bar 62. Swing bar 62 swings forward and away nearly parallel to the ground, having a center distance pivot 68 located within tube housing 60, which is affixed to the underneath of arc plate 42, which travels about bridge tube 20 as defined by the user. As left and right linkages 76,72 and 66 move in direct opposite fashion to one another, as a result of their connection to and action of the swing bar 62; upper leg linkages 32 move generally opposite to one another, but not in perfect synchronization. Sub linkage system 70 made up of short link 76 and control link 72, which bridges upper leg link 32 to linkage rod 66, allows the upper leg link to move forward at a slightly faster rate than the opposite upper leg link swinging in the rearward direction. As the upper leg link 32 moves forward, the control link 72 pulls up on short link 76 drawing the forward end of the linkage rod 66 nearer to the hip pivot. This feature more accurately simulates the exercise by allowing the leg of the user to move forward at a faster rate and with more slack than the rearward leg. If the swinging movement of each leg member were to be held in a strict opposite movement pattern, the forward moving faster leg would experience excessive resistance, held back, by the slower rearward moving opposing leg.

There are several advantages to the above horizontal leg interlink system made up of components 62, 66, 68, 72 & 76 and the suspension system 40. As this system allows generally only an opposite movement pattern between leg linkages 30, it helps ensure safety by restricting the user from suddenly and dangerously falling forward or backward from the machine, by disallowing the leg members to suddenly move together in the same directions. The system is also used to control rate of tilt and to automatically maintain a constant foot platform raise assist cord 92 tension and length throughout the full tilt range, ranging from uphill to downhill tilted operation. Maintaining a constant cord length and tension is desirable in order for the user to experience a fluid stride height consistency; as the user changes body tilt position the vertical range of motion available should preferably stay nearly the same.

Figure 13:
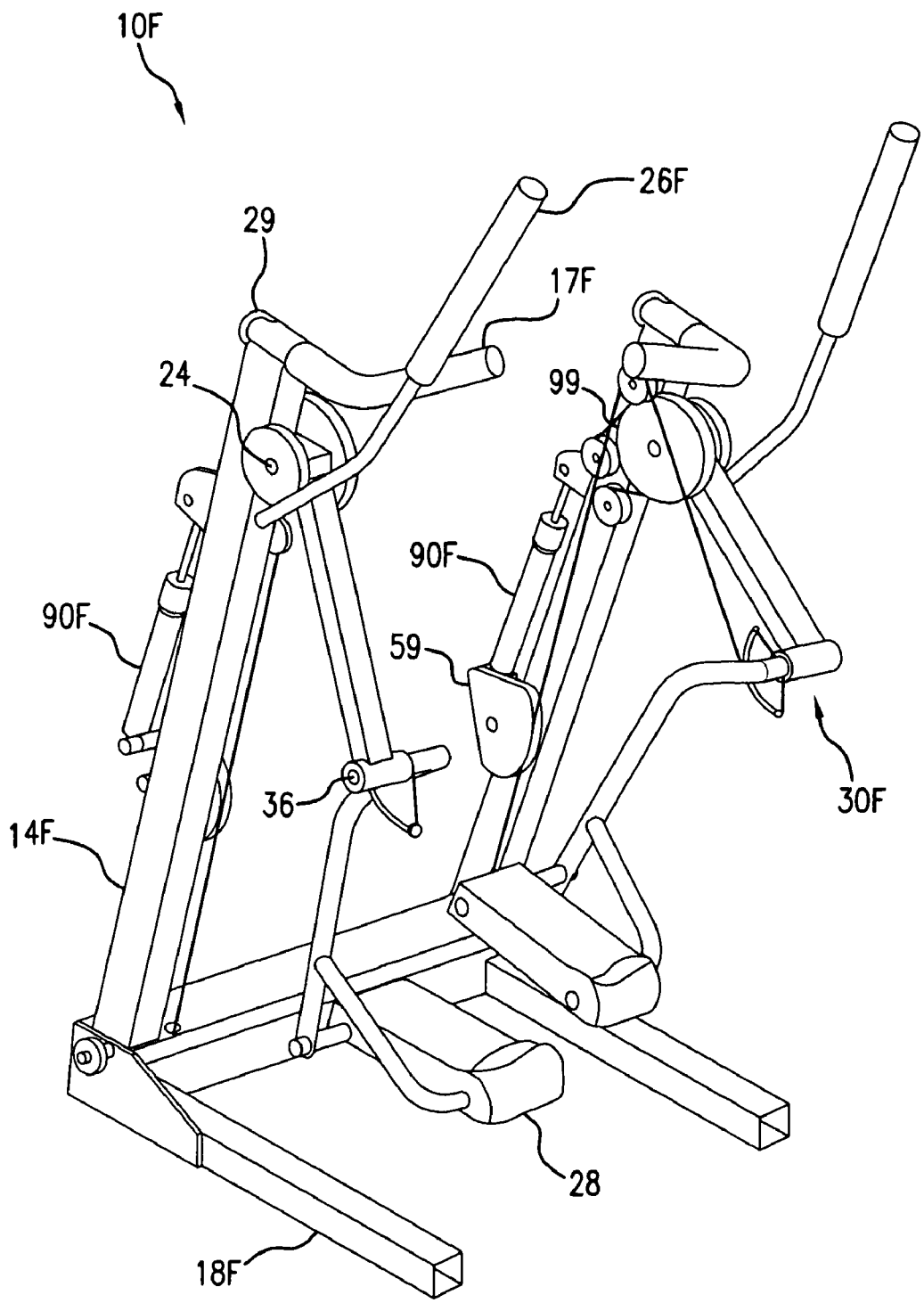
FIG. 13 is a perspective view of a sixth embodiment of an exercise device according to the present invention featuring a leg interlink/safety system utilizing spring loaded hydraulic cylinders to control rate of user tilt. This device also utilizes an alternative resistance configuration and an added arm exercise method.
Figure 14:
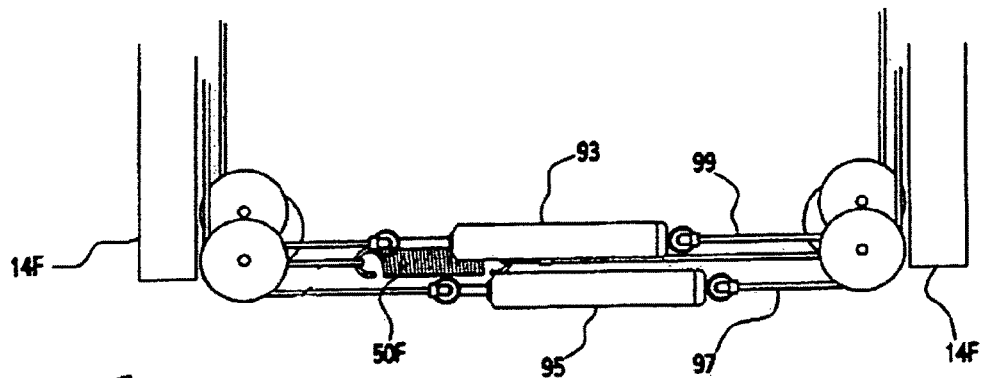
FIG. 14 is a fragmentary partial rear bottom view of FIG. 13, featuring the spring-loaded hydraulic cylinders of the leg interlink/safety/tilt system and a spring coupling within the cord segment connecting leg members for assisting generally vertical movement.
Figure 13A:
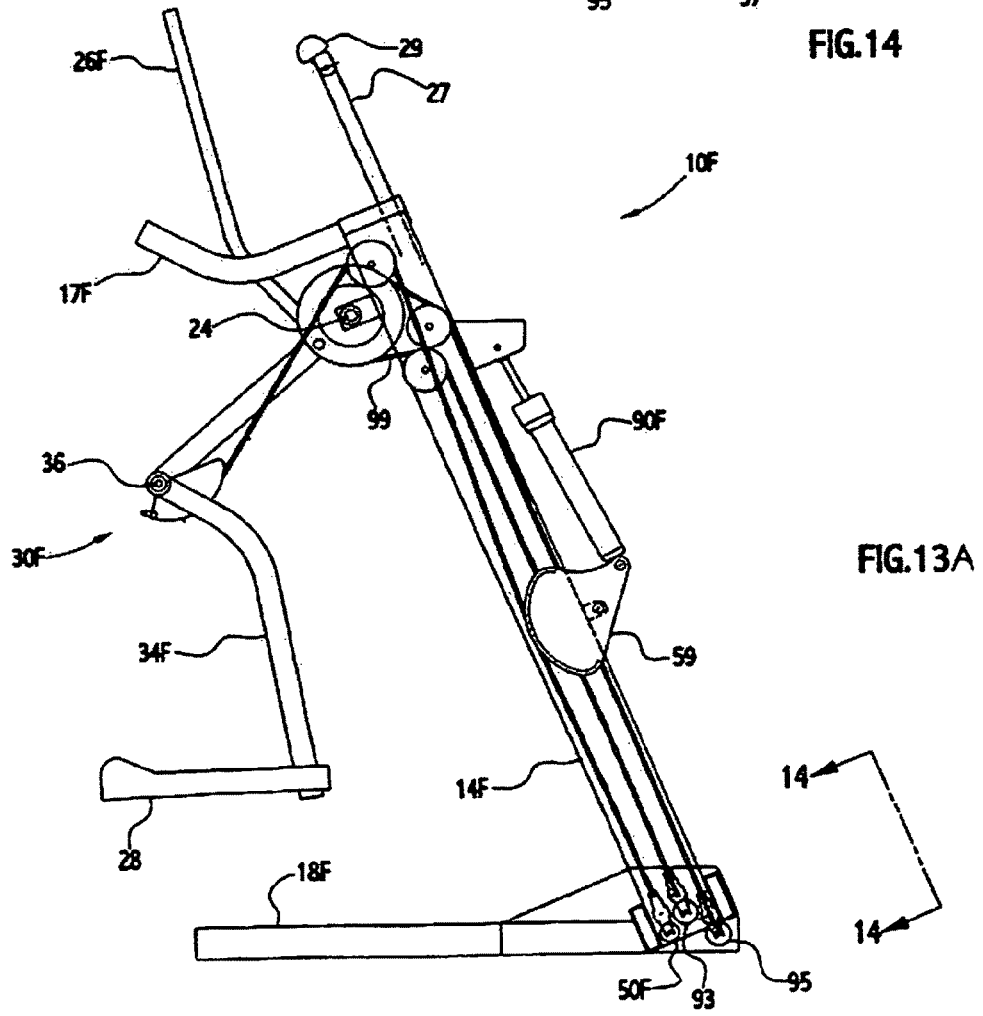
FIG. 13A is a sectional view of the device shown in FIG. 13

The rate and degree of tilt by the user, whether forward to simulate downhill travel or backward to simulate uphill travel, are both controlled by a spring bar 98, as best seen in FIGS. 6-8. Each end of the spring bar 98 is held in position by a keeper component affixed to bridge tube 20, while the center of the spring bar is captured and held by an extension of and from arc plate 42. As arc plate 42 is caused to rotate about bridge tube, as the user changes body tilt position, the spring bar is forced to flex and resist against arc plate's 42 rotation about bridge tube 20. As the user tries to increase tilt angle, the opposing force generated by the spring bar's increased flexure creates a greater force against the user trying to increase tilt. While standing upright in the neutral position, no resistance is present as the spring bar is straight and at rest. Other types of springs or combinations thereof may be configured to machine instead of spring bar to act as a centering system centering user to stand upright and causing increased resistance against user desiring to increase tilt angle for uphill and downhill exercise position. Other means integrated into this system could make use of braking systems, ball detents for graduated positioning, magnets, computer controlled motors or combination of components to make this tilt feature effective, safe, and convenient to the user. FIGS. 13 and 14 show the use of two hydraulic cylinders 93 and 95 having return springs that allow tilt, but in a slower controlled rate.

Figure 10:
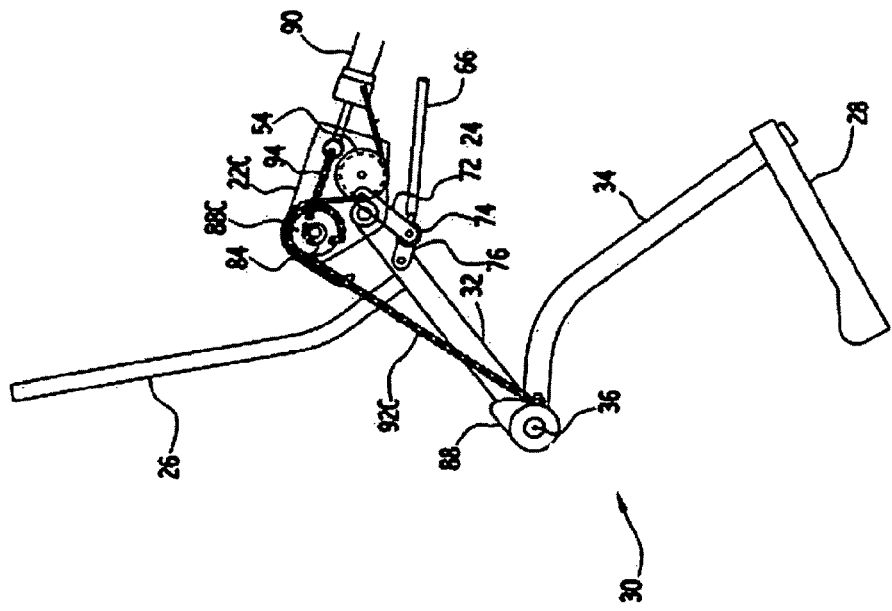
FIG. 10 is a fragmentary partial side view of a third embodiment of an exercise device according to the present invention showing a disk and idler pulley as a replacement for the sprocket.
Figure 9:
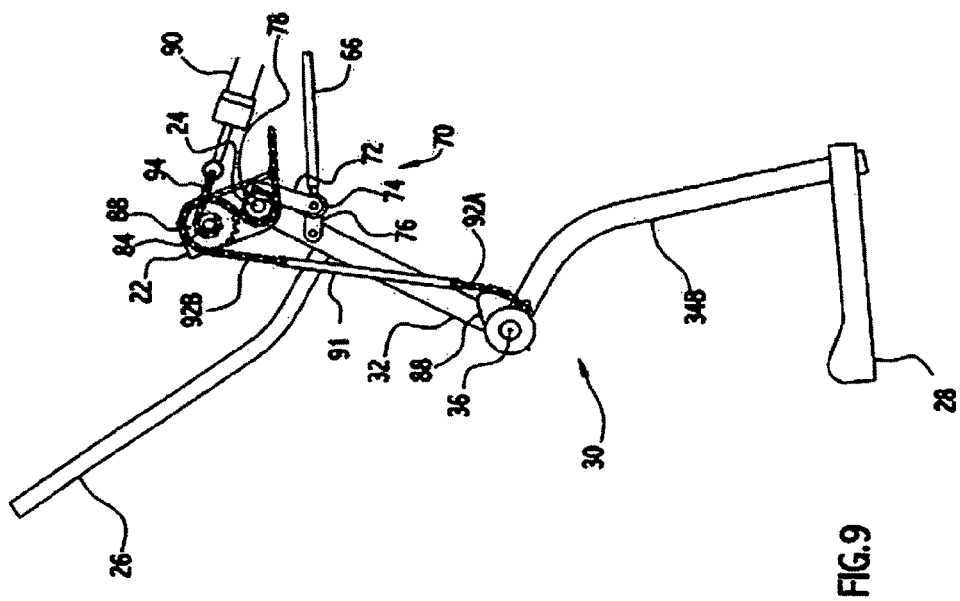
FIG. 9 is a fragmentary partial side view of a second embodiment of an exercise device according to the present invention with modified knee joint cam to slow rate of rotation of lower leg linkage to improve simulation accuracy.

As each system of this device 10 is easier to describe alone, it is far more difficult and complex to describe the integration and harmony of the systems working and acting together. In other words, in this device which has foot platforms 28 suspended from a frame 12 by leg linkages 30 made up of an upper linkage 32 and lower linkage 34, pivoting via hip pivot 24 and knee pivot 36, the leg components by themselves would just hang down from their attachment to the frame and could only swing back and forth by the user, not able to move up then down in the vertical plane, unless strapped to the user's feet. Bringing vertical movement to life in this device, a drive cord 92 is attached from one lower leg link 34 to the other via generally guide pulleys and or sprockets, spools or the like. The attachment of the flexible drive component 92 to the lower link 34 is made at a point near to and just behind the knee pivot 36 such that as the cord 92 is drawn upward the lower leg link 34 is caused to pivot up and back, similar to the human lower leg when lifting the heel. The flexible drive component 92 may be a cord, cable, chain, belt, linkages or like or combination thereof. The attachment point of cord 92 to lower link 34 is at a point where the initial onset of downward resistance goes from less to greater as the lower link travels from a heel upward or knee bent position to a position of leg extended downward or straightened position. The use of a cam 88 affixed to lower linkage about the knee, as seen in FIGS. 9 & 10 shows a more dramatic way of varying the resistance from less to greater to more accurately simulate movement and achieve a more stable feel, by balancing the rate of movement between the upper linkage 32 and lower linkages 34 as the foot platform 28 lower and move back during the various exercise modes. Resistance against the downward movement of the upper link is also variable, however the resistance changes from greater to less as the upper linkage 32 lowers from knee 36 up and forward, to knee 36 down and back. Variable resistance is produced through the mechanical advantage change against the pulling of the drive cord 92 from the pulley or sprocket 88-88e from which the cord 92 is directed and coupled to resistance element such as hydraulic cylinder 90 as shown in FIGS. 1-10 & 12. The drive cord 92 is directed from and about position 23, which is just above and forward hip pivot 24. Coupling drive cord 92 to the resistance member 90 is accomplished as follows: As the drive cord 92 attaches to lower link 34 it is also attached at it opposite upper end to or engages sprocket or pulley 88 causing shaft 86, at component 88's axis to rotate as lower link pulls when straightening. Also affixed to shaft 86 is a disk or cam 84, which causes resistance cord 94 to spool around as it pulls upon resistance member 90. Resistance member 90 has a spring-return to return cylinder 90 to a start position as the lower linkage 34 rotates heel upward. The configuration and use of a flexible member 94 linked to pull resistance member 90 is done in a fashion described and best shown in FIGS. 4,5,9 & 10 to enable instantaneous onset of resistance as upper and lower linkages pull when moving rearward and down, while near zero resistance is present as linkages return forward and up. The flexible member 94 insures that zero resistance is maintained for the return stroke of the leg 30. If the resistance member 90 is unable to retract as fast as the user returns leg the flexible member 94 will crimp, unable to push against resistance member 90 which would cause undesirable resistance against forward leg stroke.

Figure 3:
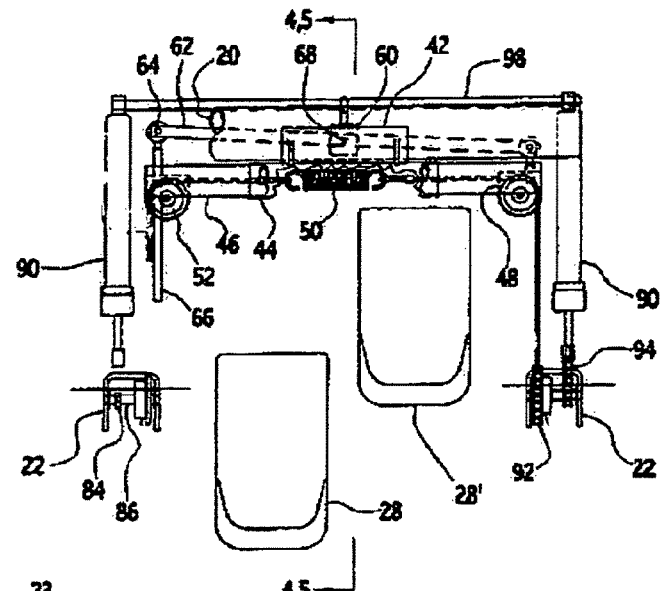
FIG. 3 is a fragmentary top view of exercise device shown in FIGS. 1 & 2.
Figure 2:
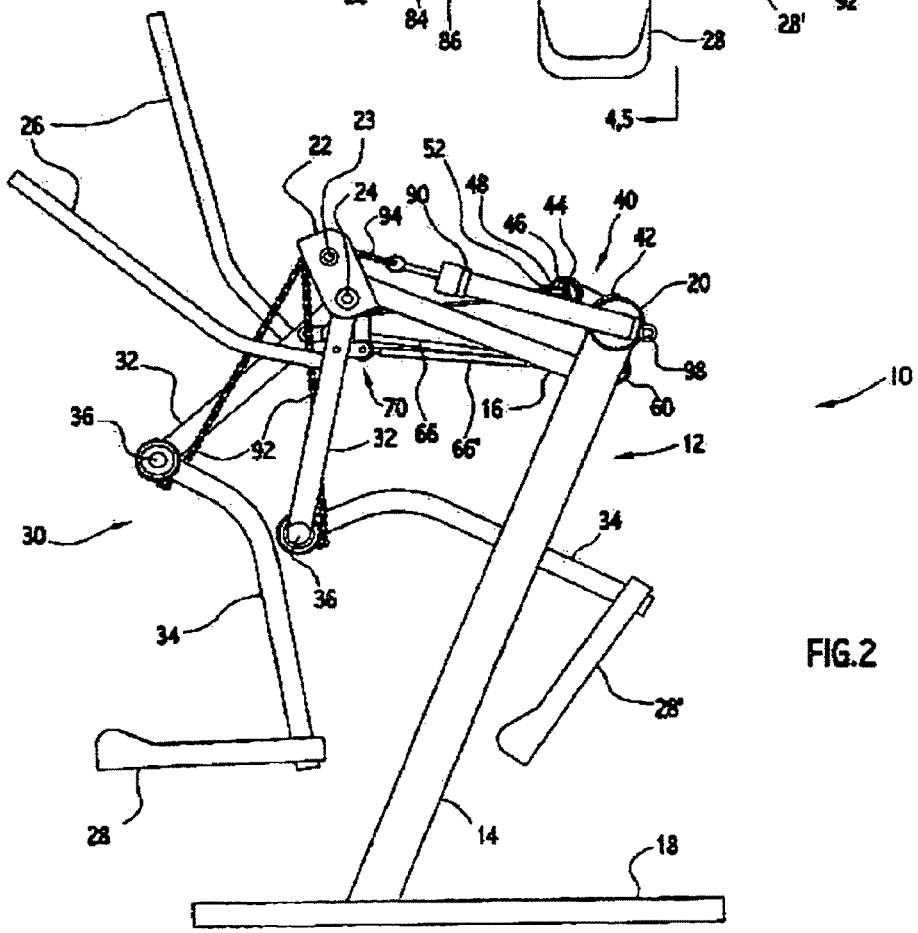
FIG. 2 is a side view of the exercise device shown in FIG. 1

While the flexible drive cord 92 pulls against resistance member 90 via shaft 86 and flexible cord 94, drive cord 92, continues to makes its way from one lower link to the other by channeling through the device as directed by pulleys, thus linking one leg linkage 30 to the other, where downward movement of one leg causes the other leg to move upward and forward. As the above action describes an instantaneous equal reaction where one leg drives the other with same force, this is not the case, as there is a spring or spring like component 50, as seen in FIG. 3, coupled to and separating the drive cord 92 into two separate cords. The purpose of spring is to rather than directly link each leg 30 to one another it rather and more effectively indirectly links one leg to the other. This configuration is more beneficial for three reasons: 1) As the forward moving leg travels forward and begins to lower it is desirable to only have resistance form the resistance member 90 and not be opposed against by downward forces created by the other leg. The spring breaks the link between opposing leg members. 2) As there is present a return-spring within the resistance member, not only causing the resistance member to reset itself, yet also applies some force toward the raising of the lower leg linkage 34 to draw upward, so as to keep the foot platform 28 held underneath user's foot as foot is lifted. The return spring does exert some force toward this goal, yet it is desirable that the return spring not have to great a force to cause excessive resistance against the exercise functions nor have to great a force to cause lower leg linkages to each draw to far upward making it more difficult to mount and dismount from the device. 3) The spring 50 coupled to the drive cord 92 enables the user to enjoy the versatility and ease of use by being able to enjoy a movement pattern having very little vertical displacement as preferred when skiing or gliding or flatter walk or able to enjoy a much more vertical movement pattern best suited for jogging or high stepping. The range of movement is automatic for the user as dictated by the user's leg movement. The spring 50 is easily lengthened by the applied weight of the user upon the foot platforms, yet the spring has enough tension to at least partially lift foot platforms towards the goal of maintaining foot platform alignment up against and under the user's foot regardless of the height the user lifts his foot up. Alone, the spring 50 and return-springs within each resistance member 90 are only able to generate enough force to partially lift foot platforms, however, as the user forces one foot platform down the further extended spring now generates a greater force, enough to raise foot platform the desired height.

The movement of the leg members 30 are linked and integrated to the suspension system as a result of the drive cord 92 channeling through the suspension system by encircling pulleys 48 which are housed within pivot tube 46 which rotates within housing tube 44 affixed to arc plate 42 of the suspension system 40. A pulling force is applied against the suspension system as the user exerts force on the drive cord 92, less the force absorbed by the resistance member 90.

To understand better the workings of the system, which maintains a near constant length, and tension in the drive cord 92, view FIGS. 6 & 7. As the user draws both legs forward, as seen in FIG. 6, by leaning back and pulling both arm handles 26 back simultaneously, to perform uphill travel, the horizontal linkage system is drawn forward causing suspension system 40 to rotate back around bridge tube 20, therefore, taking idler pulleys 52 back and away along with the drive cord 92. If the pivot location 23 were at, closer to, under, or behind hip pivot 24, then the drive cord 90 would seem to shorten causing the leg members 30 to draw upward. However, since as the attachment point of the drive member to the lower link 34 draws closer to the pivot location 23 along with the suspension system rotating back and away, the drive cord maintains nearly the same tension. This process works in reverse fashion as the user reconfigures the device toward and into the downhill mode, as seen in FIG. 7.

An exercise device 10D according to the present invention, as seen in FIG. 11, features the device having a resistance member 90D attached at one end to the frame at pivot point 23D and the lower end attached directly to lower linkage 34D at a point to still cause less to greater variable resistance to be had by the lower link 34D and greater to lesser resistance to upper linkage 32D. To ensure that there is no resistance hindering the forward and upward return of the leg members a flexible member (not shown) could be used as a bridge in attaching resistance member 90D to either frame or lower linkage 34. Also not shown is a horizontal leg interlink or suspension system, which could certainly be coupled to this device.

An exercise device 10E according to the present invention, as seen in FIG. 12, features the device using a flywheel 91 housed inside bridge tube 20E with a braking mechanism (not shown) to generate resistance against the user during exercise. A one-way clutch positioned inside of a drive pulley or sprocket 57 causes resistance to occur only as the leg members 30E swing backward and down. A cam spool 55 may replace a more circular spool pulley to create a more natural resistance feel. Different degrees of resistance having different variable curves applied individually to each upper and lower leg linkages individually can simulate different types of terrain that may be traveled, such as a fast track or muddy like ground surface.

Further illustrated in FIG. 12 is an arm lever or pole 26E, which is pivotally linked to the upper linkage 32E, as well as, linked to the lower linkage 34E via member 35. The result to this configuration is an arm pole having a greater range of motion as it not only moves at a rate along with the swing of the upper linkage yet, the movement of the arm pole 26E is also cause to move further by the pivot movement of the lower linkage.

An exercise device 10F according to the present invention, as seen in FIG. 13, shows still another configuration creating nearly the same results as previously shown devices. Unique to this device 10F and best seen in FIG. 14 showing lower rear view of device 10F, is the use of hydraulic cylinders 93 & 95 each having return-springs, used as part of the suspension system. These cylinders 93 & 95 slow rate of forward and rearward tilt as a result of the dampening affect of the hydraulic cylinders, tilt occurs much slower then when using a spring or spring bar 98A&B as seen in FIG. 8.

FIGS. 15 & 16 show how a modified treadmill T can act as a landing platform for an exercise device 110 or 110B according to the present invention, in which foot platforms suspended from a frame to carry a user in one of the ways described herein and absorb user selected degrees of impact upon making contact with the treadmill belt B. The treadmill may use a single belt B as a contact surface or may use a plurality of belts in the form of narrow continuous ligaments per each foot and positioned under and in line to make interference with falling foot platform. An additional advantage to the shock absorbing nature of this device, arm poles 126 linked to the linkage(s) suspended from the frame, offer a means for the user to exercise his upper body. Further, as the user is held in a stationary position as a result of standing upon foot platforms which swing back and forth having a pivot point located and held near center of the modified treadmill, the user may exercise free of concern with having to apply effort towards remaining within the treadmill limits.

Figure 17:
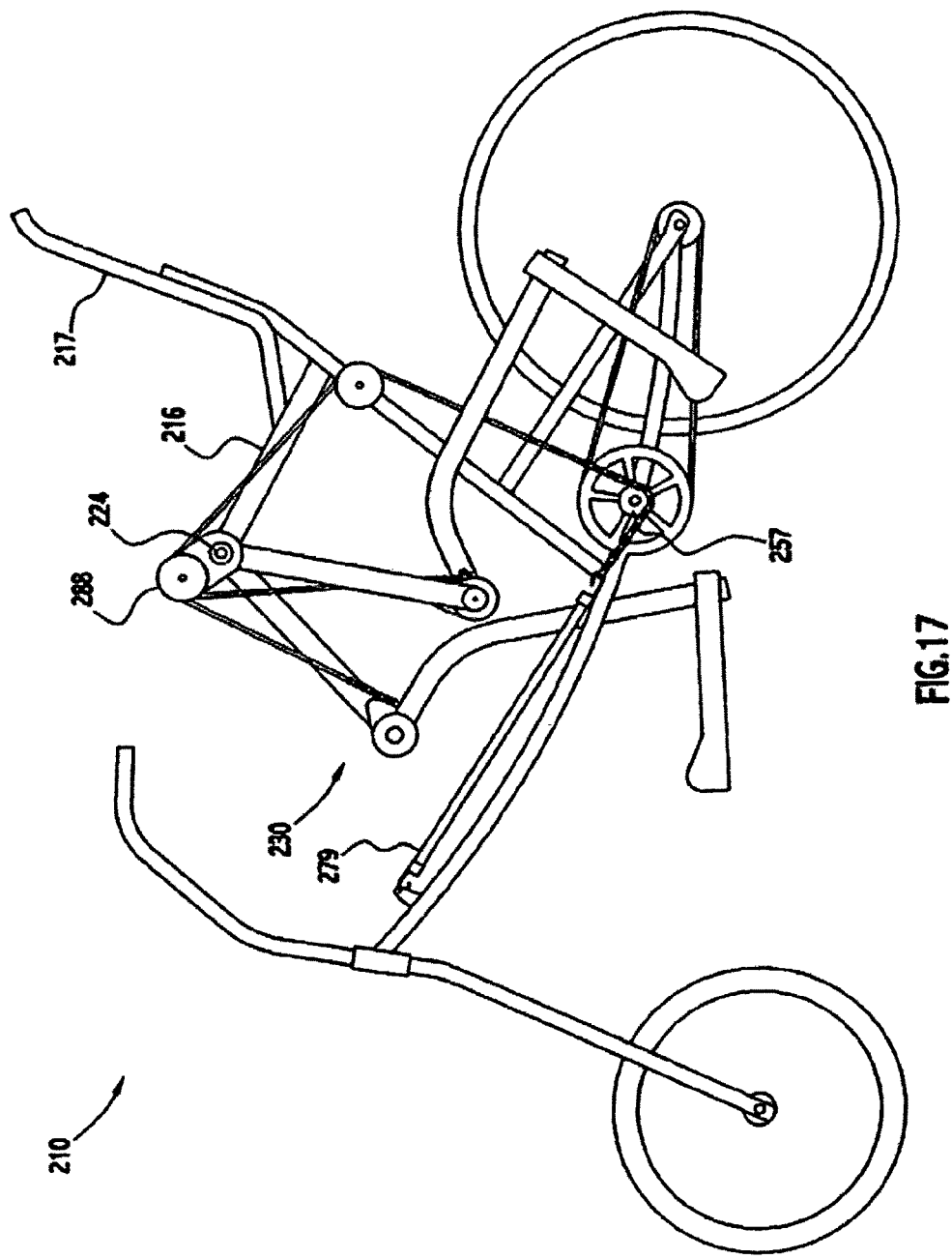
FIG. 17 is a side view of a ninth embodiment of an exercise device according to the present invention, which marries leg components to a bicycle-like configuration.

An exercise device 210, shown in FIG. 17, includes a frame 212 in the form of a bicycle and leg linkages 230 mounted from the frame to function as the pedals and crank arms of the bicycle and to drive the wheel(s). For example, a drive cable 292 can be attached at one end to a leg linkage 230 and routed around one or more pulleys to drive the front sprocket of the bicycle via a one-way clutch 257. This modified bicycle exercise device using leg linkages allows the user to propel oneself by incorporating a variety of different movement patterns, rather than forced to only crank pedals in a circular fixed pattern as on the standard bicycle. The user can use the handle bars 226 attached to the front wheel of the bicycle frame or optional arm levers (not shown) could be attached to the leg linkages as shown in previous embodiments to allow greater use of the body towards driving this device. Arm levers attached to the leg linkages could further be used to steer the device while being used to propel the device as well. Also shown in FIG. 17 is an optional seat 217 allowing the user the option to operate the exercise device much like a standard bicycle.

This device 210 could further be modified to be used as a stationary exerciser or coupled to a floating platform for which the leg linkages would be used to propel this modified boat to travel on water.

An exercise device 310 according to the present invention, as shown in FIGS. 18-23b, includes a pair of foot supports 312 affixed or pivotally attached to the lower end of the support members 314. Support members 314 are affixed to suspension disks 355 which are pivotally attached to lever arms 318 at attachment locations 330. The pivotal attachment location 330 is located above and in general vertical alignment with the position of the user's hips when user stands upon foot supports 312 when foot supports are positioned in near vertical alignment below the user's hips. The other end of the arm lever 318 is pivotally attached to frame 320 at location 332 on the same horizontal plane as pivot attachment location 330. The distance between pivotal locations 330 and 332 must be great enough to allow the vertical distance traveled by location 330 during its arcuate path from center point 332 to be at least equal to the vertical range of motion needed to perform the multitude of exercises. Pivot 332 is located within and through frame member upright 322. Frame member 322 is made of tubular steel and stands connected upon base 324 to hold pivot location 332 in a fixed position upon the frame at a location around shoulder height and rearward to the user when mounted upon the device. Base 324 is of generally U-shaped configuration for the purpose of joining the two symmetrical left and right hemispheres of the device 310 and to hold the entire device stable upon the floor.

Figure 20:
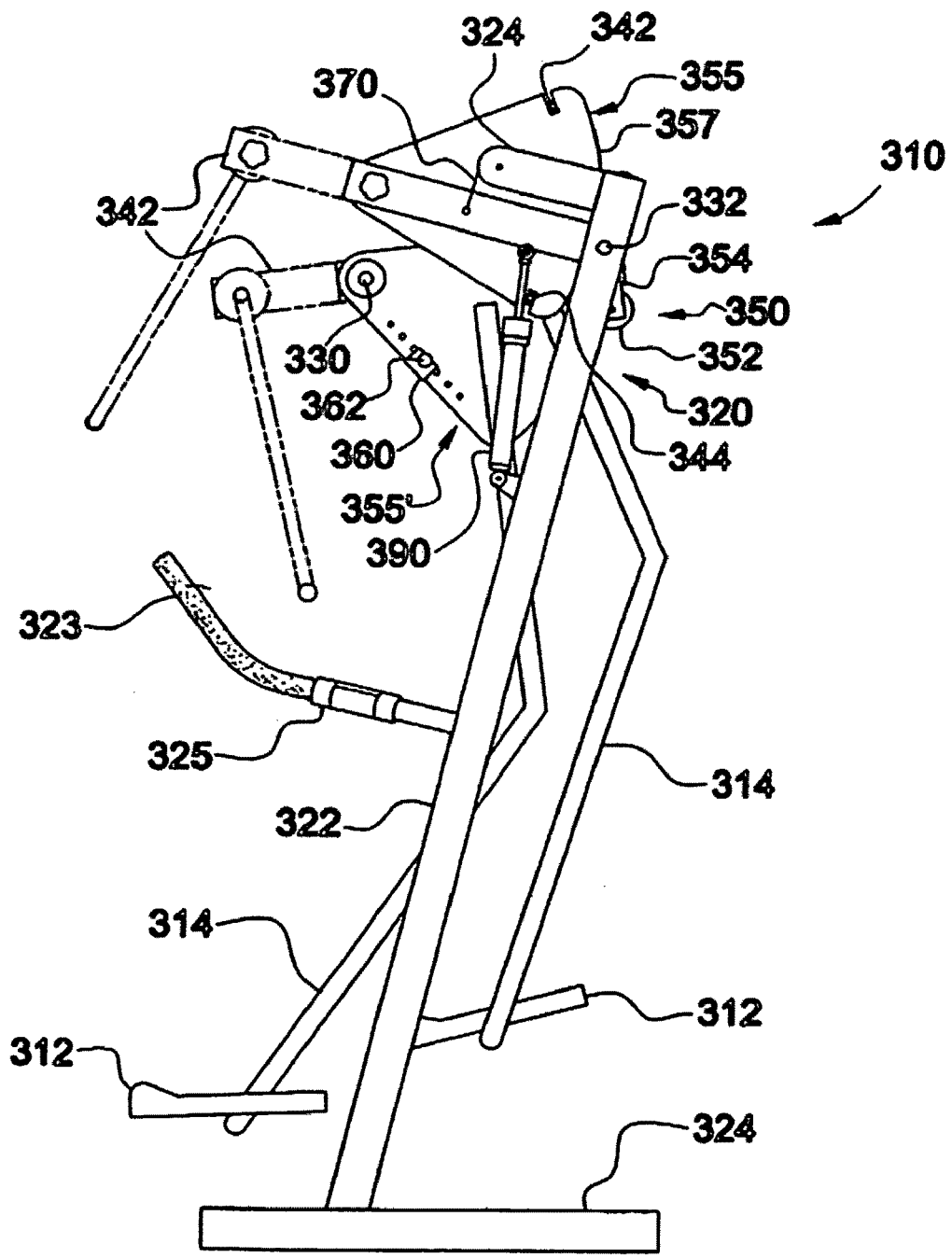
FIG. 20 is a side view of the exercise device shown in FIG. 18, with the addition of arm levers.
Figure 21:
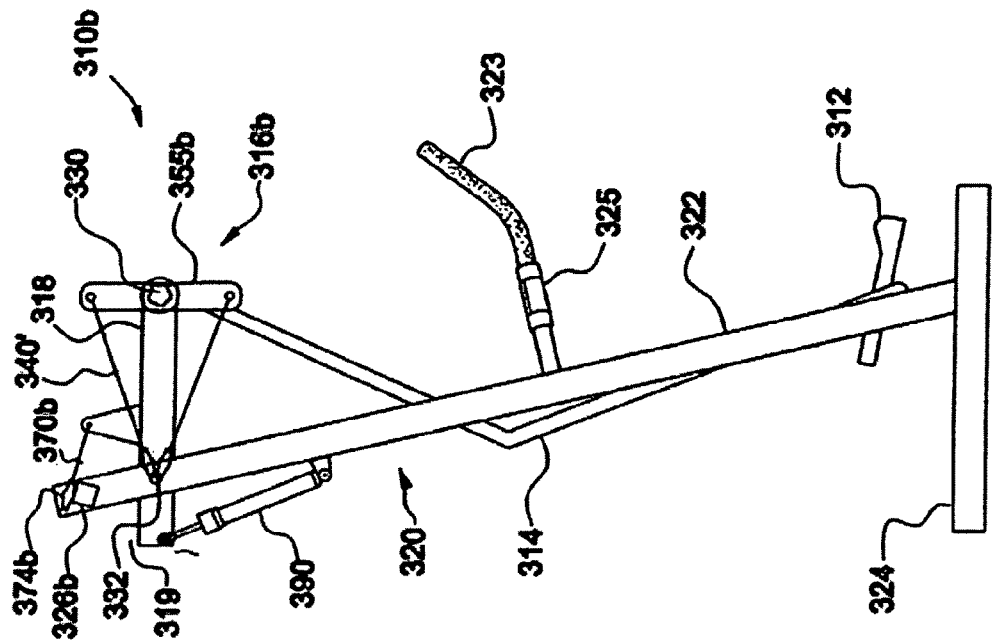
FIG. 21 is a side view of the exercise device shown in FIG. 18, showing a modified drive system.
Figure 22:
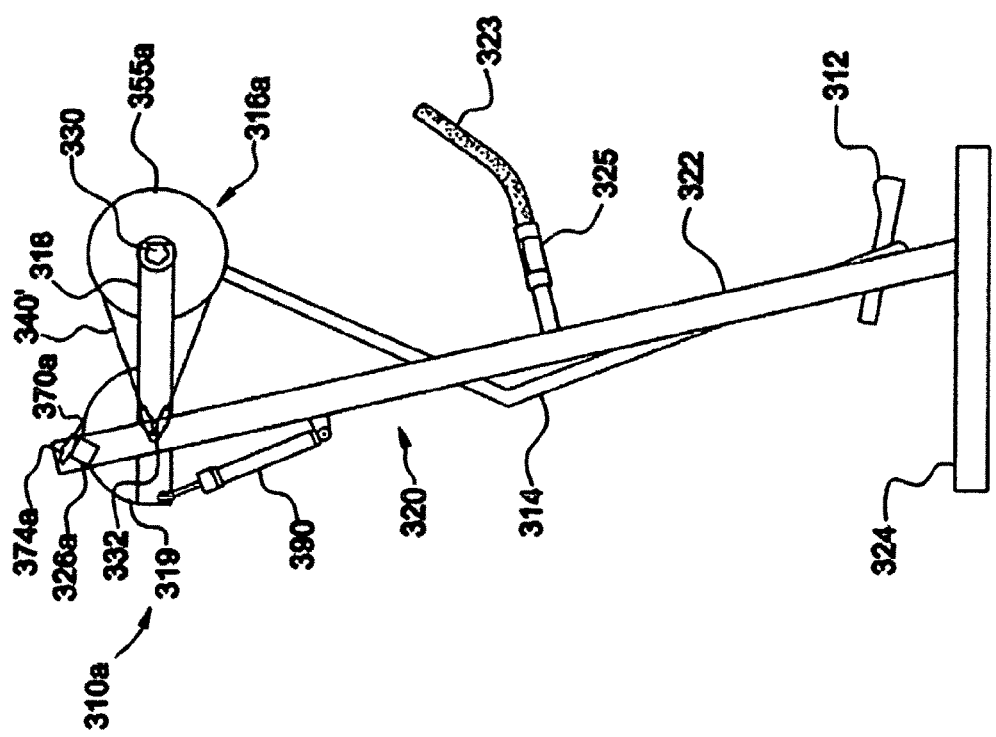
FIG. 22 is a side view of the exercise device shown in FIG. 18, showing another modified drive system.

Support members 314 are linked together via cable 340 which path is defined by a series of pulleys 350 that are attached to lever arms 318 near and about pivot locations 332. The pulleys 350 are configured near and about pivot axis location 332 for maintaining position relative to the suspension disks 355 such that cable 340 will maintain constant tension as the suspension disks pivot back and forth. The pulleys 350 and cable 340 are also configured in such a way to force the support members 314 to move in an opposite direction pattern from one another. As the suspension disks 355 are affixed to support members 314 and share pivot locations 330, the two parts move together in opposite rotation. Suspension disks 355 are flat pie shaped material having a thickness just enough to allow the cable 340 to be attached and to provide a track or groove for cable 340 to travel within. Suspension disks 355 are pivotally attached to lever arms 318. The groove or channel 357 maintains a consistent arc shape with a radius near to but less than the distance between pivot location points 330 and 332, as shown in FIG. 20. The radii of suspension disks 355 are, as large as possible to minimize sloppy movement at the foot supports 312 due to the mechanical advantage or distance that the foot supports 312 are from the pivot location 330. While the suspension disks 355 have a radius as large as possible to minimize slop, they must be small enough to allow the arrangement of pulleys 350 to be able to pick up and transfer cable 340 from the suspension disks 355 and direct the same cable 340 across the pivot location 332's axis to the same pulley arrangement 350 located on the other hemisphere of suspension system 316. Cable 340 must run close in alignment to pivot location 332's axis in order to maintain constant tension in the cable system, as the lever arms 318 pivot up and down in opposite directions. The suspension disk's arc 357 length is at a manufactured determined length, whereby the angle distance between the top and bottom of the arc 357 is equal or greater than the greatest angle of movement made by the back and forth movement of the support members 314. During the skiing or gliding exercise were the lever arms 318 are kept in nearly a stationary horizontal position, total angle of rotation of the suspension disk 355 directly equal to the back and forth swing of the support members 314. During the walking, stepping and climbing exercise, the total angle of rotation by the suspension disks 355 is a cumulated sum of the greatest angle of movement by the lever arms, during upward and downward motion, and the rotation of the suspension disks 355 upon the lever arms, created by the back and forth swing of the support members 314.

Figure 19:
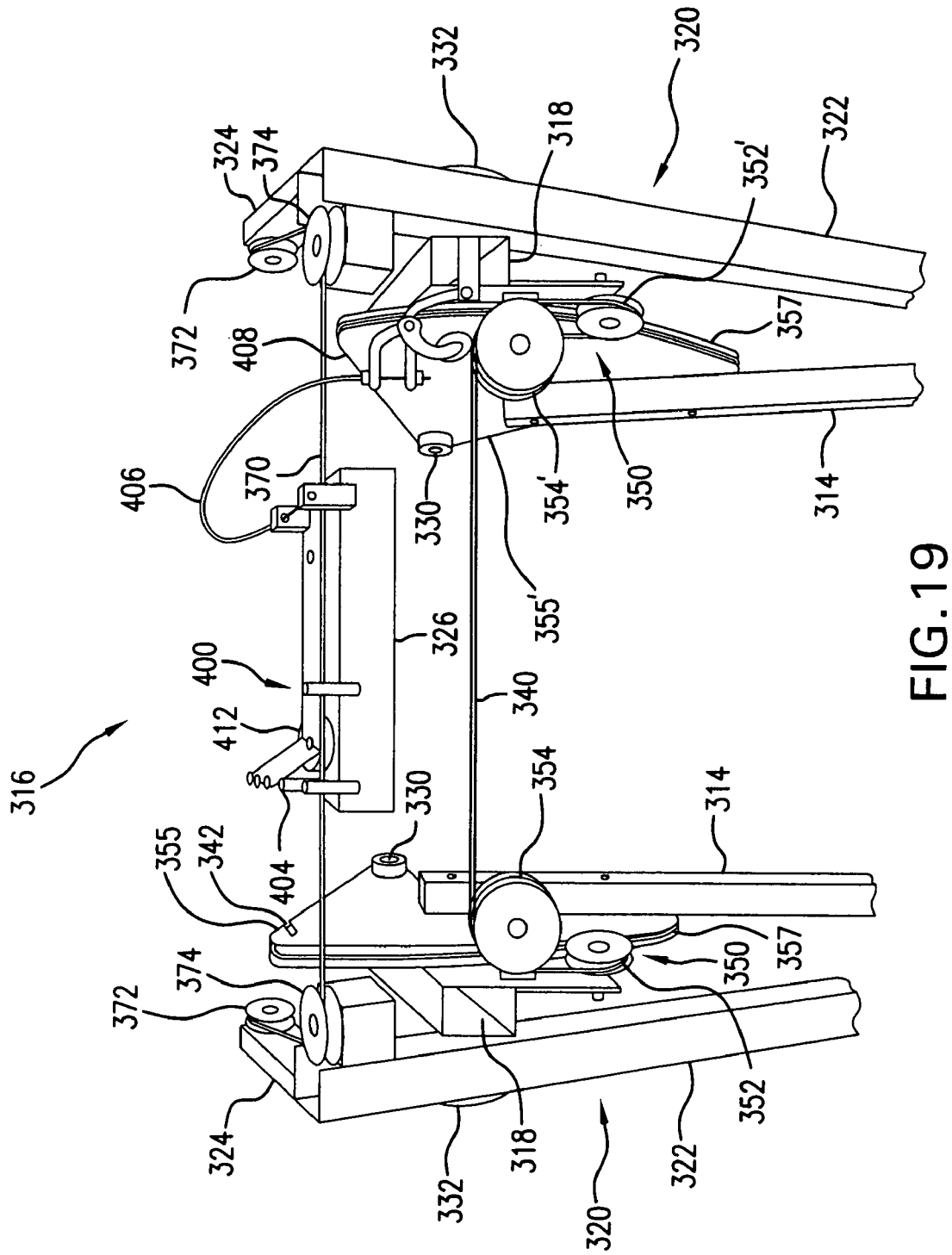
FIG. 19 is a rear perspective view of the upper portion of the device shown in FIG. 18 showing the suspension system.
Figure 29A:
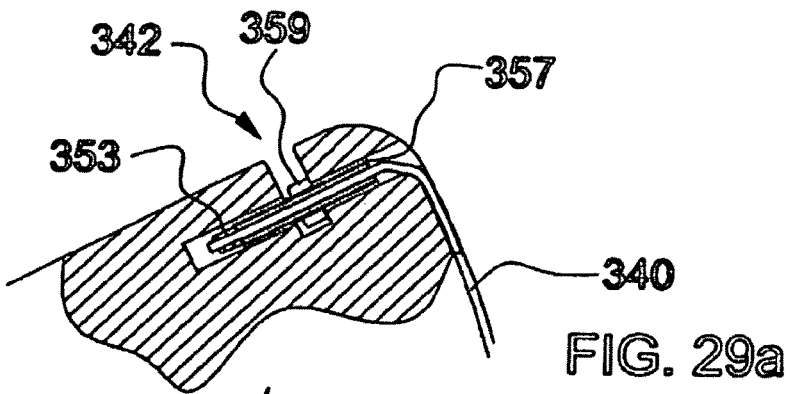
FIG. 29A is cut-through view of the guide disk shown in FIG. 29 showing a method of attaching the cable to the guide disk.
Figure 29:
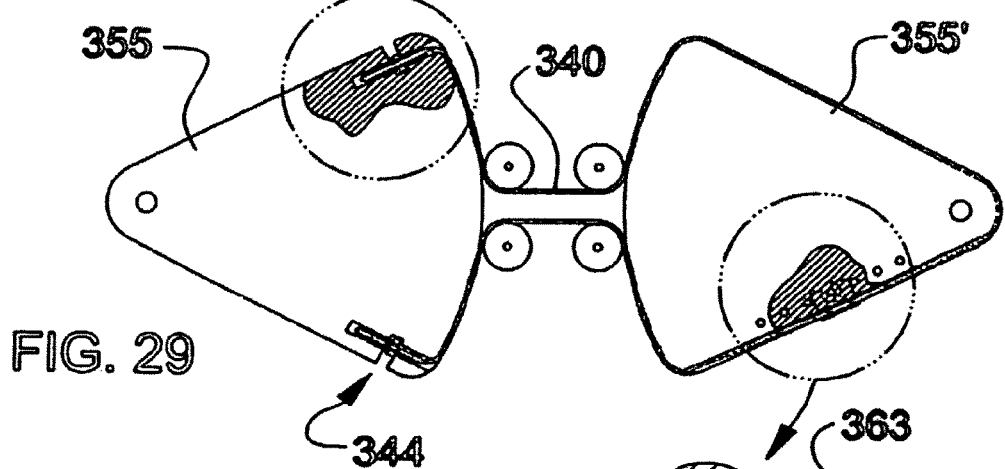
FIG. 29 is a fragmentary side view of the device shown in FIG. 20 illustrating the configuration and attachment of the cable to the guide disks.
Figure 29B:
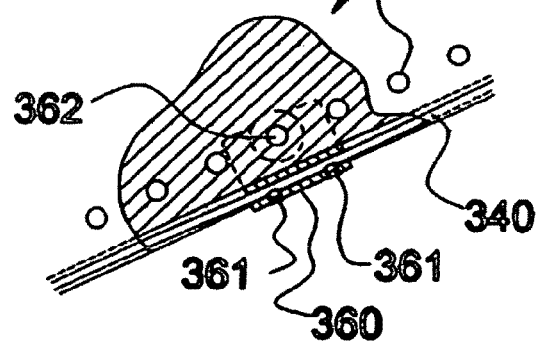
FIG. 29B is a cut-through view of the guide disk shown in FIG. 29 showing an attachment element to the cable and means for selective positioning upon the guide disk.

The routing of cable 340 upon suspension system 316 controlling generally horizontal movement of the foot supports 312 is shown in FIGS. 19 and 29. Looking at and starting with the top portion of the suspension disk 355 on the left hemisphere of suspension system 316 at the beginning of arc 357 it will be found that one end of cable 340 is attached to suspension disk 355 at attachment location 342 by way of being held in place by a nut 359 threaded over the hollowed out all-thread 357 into which the cable 340 is threaded and kept from pulling out by a cable stop sleeve 353. From attachment location 342 the cable 340 follows the cable channel upon the suspension disk's rearward perimeter in the arc of the suspension disk 355 and picks up pulley 352 by wrapping around pulley 352, first making contact with pulley 352 in its groove located tangent to and in alignment with suspension disk's 355 arc. Cable 340 than tucks under and around pulley 352 and leaves contact with the nearly opposite side of pulley 352 on its way upward to pulley 354 which is turned on perpendicular angle to pulley 352 and is in alignment with pulley 352 such that the cable 340 may engage pulley 354. Pulley 354 then redirects cable 340 to pulley 354' on the opposite or right hemisphere of suspension system 316. Now referring to the right hemisphere of suspension system 316, cable 340 follows the same path in mirror image to the left hemisphere. Therefore, cable 340 catches the top portion of pulley 354' which is in line with other pulley 354 and in line with pivot location 332, and pulley 354' directs cable downward to pulley 352' which in turn directs cable up and over to suspension disk 355' of the right hemisphere. Cable 340 then becomes in bedded into the channel in the arc of the suspension disk 355 and travels upward and around the top of the suspension disk 355 finding the cable groove in the remaining perimeter and following the perimeter of the suspension disk 355 until reaching the bottom of the arc where it travels upward within the cable channel upon the arc. Cable 340 then picks up pulley 352' which redirects cable 340 along the axis of pivot location 332 and parallel to cable 340 running the opposite direction, to pulley 352 on the left hemisphere. Cable 340 is then directed in the downward direction by pulley 352 to again be attached and terminate into suspension disk at location 344 near the bottom of the arc by same attachment means as attached to location 342. Tension can be increased to remove slack in cable 340 by tightening 359 upon threaded sleeves 357.

Located on the underside of suspension disk 355', of the same right hemisphere, is selector bracket 360. Selector bracket 360 clamps onto cable 340 by pressure exerted against cable through the act of tightening setscrews 361 against same cable 340. The location upon which selector bracket 360 is affixed to cable 340 corresponds to the adjustment holes 363 positioned along the underside of suspension disk 355'. Attachment of selector bracket 360 to one of the selector holes 363 is accomplished by insertion of selector pin 362, which travels through a hole in selector bracket and through one of a series of selector holes 363. With selector pin 362 disengaged, suspension disks 355 becomes unlinked to each other, whereby the position of support members 314 may be altered such that the foot supports 312 may be preset more rearward to simulate downhill travel or preset more forwardly to simulate uphill travel, as illustrated in FIGS. 6a and 6b. To preset the foot supports 312 rearward, the user selects a hole position more forwardly on the suspension disk, and visa versa to preset the foot supports 312 more rearward.

Figure 18:
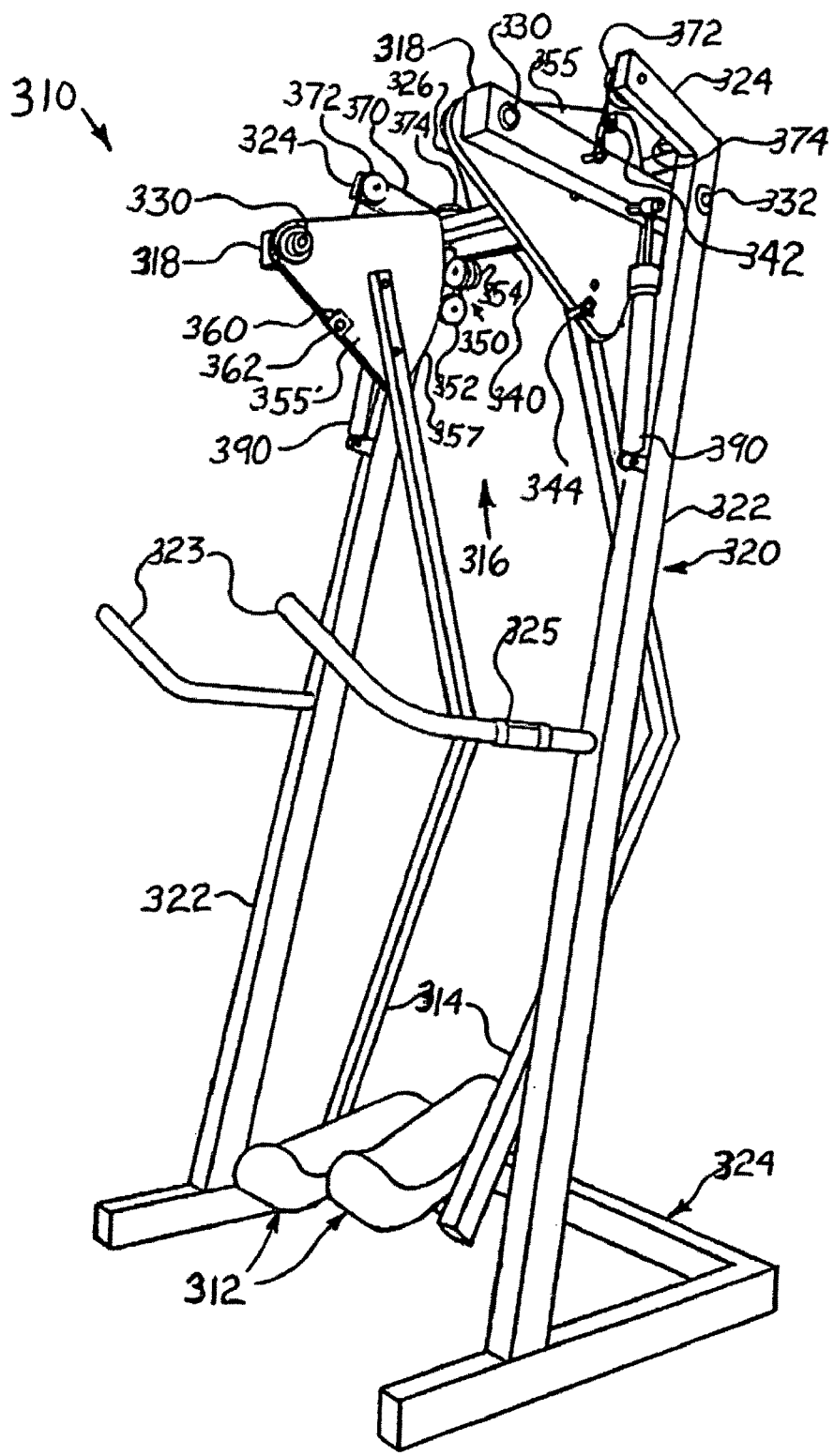
FIG. 18 is a perspective view of a tenth embodiment of an exercise device according to the present invention using a suspension system mounted substantially above the hip pivot.

Suspension system 316 as describe above is capable, as is, to perform all movements to allow the user to perform the multitude of exercises listed earlier. However, as a further enhancement to the basic suspension system 136, it is preferred that an additional mechanism be added to the suspension system 316 to better control the movement of the lever arms 318, therefore, becoming the primary means of linking one lever arm 318 to each other. The arcuate movement path of the lever arms 318 translates into the vertical movement pattern of the foot supports 312. As the vertical downward force is the greatest force upon the suspension system 316, it is preferred but not necessary that a more structurally sound linkage means be in place to control and alternate, in opposite movement pattern, the movement of the lever arms 18. There are many methods that would suffice, one example of a method for interlinking arm levers 318 is shown in FIGS. 18 and 19. A cable 370 is attached to the lever arm 18 at a location nearly midway between pivot locations 330 and 332 and is routed upward around pulley 372 which is bolted to frame member 324, that is perpendicularly attached to frame member 322. After cable 370 makes its way around the forward and top of pulley 372, it then is routed around pulley 374, which is attached to frame member 326, which is the upper bridge that connects both hemispheres of the frame 322. Pulley 374 changes the direction of cable 370 sending cable 370 to the other hemisphere of the frame to other pulley 374, in turn to pulley 372, and back down to other lever arm 318 to an attachment point an equal distance from pivot point 332, corresponding to the location of attachment to the lever 318 on the other hemisphere. The weight of the components linked to the lever arms 318 is keeps in constant tension. As the user exerts downward forces upon one of the foot supports 312, cable 370 is pulled downward by the corresponding lever arm 318, which in turn the same cable 370 pulls upward on the other lever arm 318, which translates into the upward movement of the corresponding foot support 312.

A resisting means such as a hydraulic piston 390 may be attached to the lever arms 318 and fixed to the frame in a fashion that will cause resistance and/or shock absorption to the vertical downward travel of the foot supports 312 as the user's foot induces pressure upon the foot support 312, as shown in FIGS. 18,20-23b.

Figure 30:
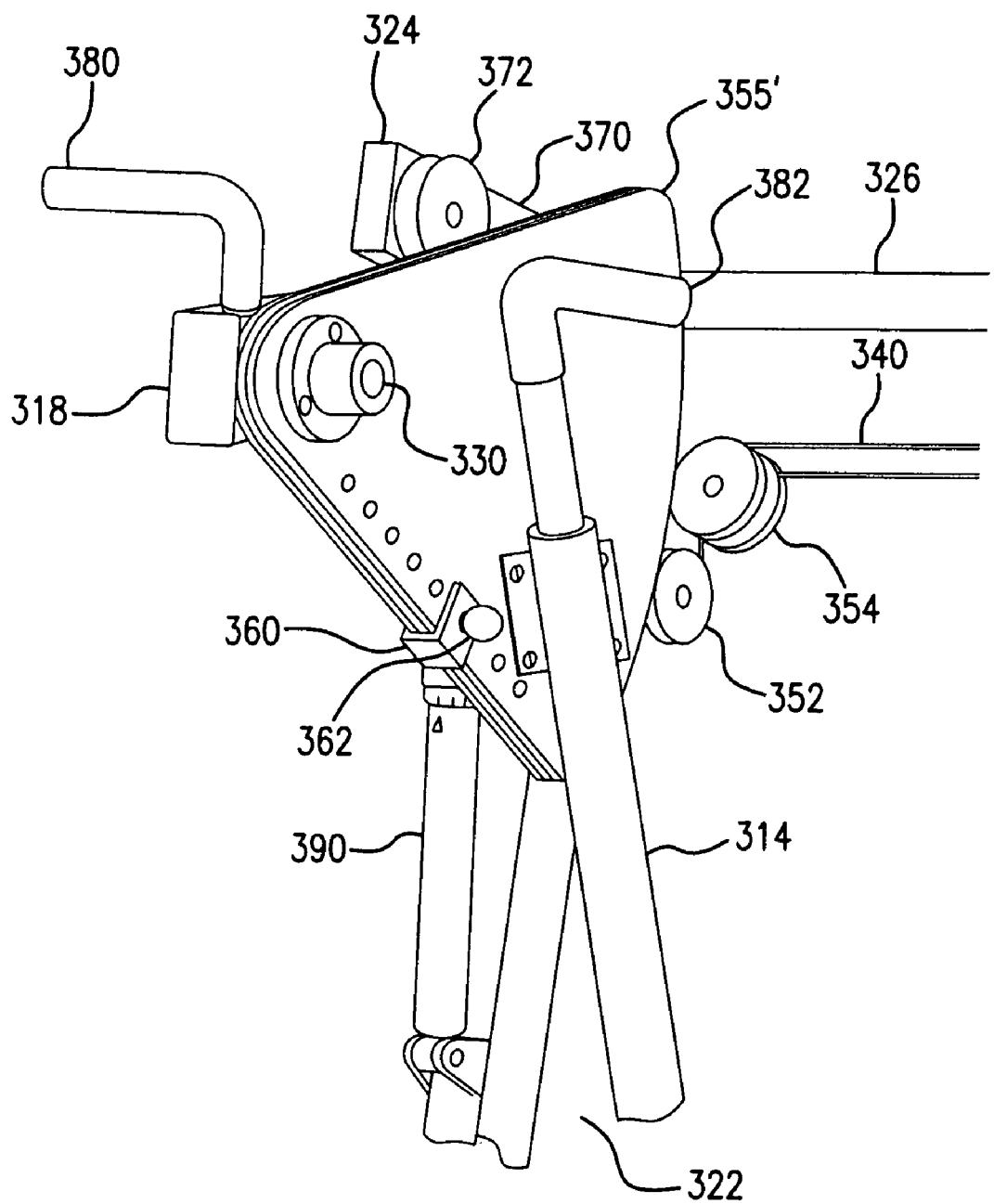
FIG. 30 is a perspective view showing handle attachments for the exercise device shown in FIG. 20.

Handles 380, shown in FIG. 30, may be attached to the lever arms 318 near the forward end so that the user can grasp and exert pulling forces to simulate climbing exercises. A more realistic climbing exercise is made available using arm handles 382 attached to the inner and upper portions of the suspension disks 355 nearer to the arc 357. The handles 382 mounted at this location on each suspension disk 355 travels further vertically due to the combined movement of the pivoting lever arms 318 and the suspension disks 355, which gives the user a greater range of motion when performing the climbing exercise. The arm handles 382 may be removed or may be rotated to lay along side the suspension disks 355 for storage, and may in addition, be adjustable in height to accommodate the reach of different size users.

Suspension system 316, as described above, and shown in the specified figure drawings, show a system that integrates horizontal and vertical movements such that the attached support member 314 with foot supports 312 can move in an endless combination of back and forth and up and down movements; having consistent, fluid motion at all times, unlike systems that involve two separate systems that control horizontal and vertical movement. It needs to be pointed out that this invention of integrating horizontal and vertical movements into a single operating system may be achieved, as well, using components other than those described above. The lever arms 318, for example, that control and allow vertical movement, by pivoting up and down a distance sufficient enough to fulfill the vertical displacement requirements of the exercises, may be substituted with telescoping members or carriage systems, that may travel up and down, yet still offer pivotal connection to the support members 314. The generally horizontally moving control members may be modified to accommodate the telescoping members thru the use of components that still control horizontal movement and yet are not influenced or interfered upon by the telescoping components.

Coupling horizontal and vertical movement patterns into one integrated system lends itself to other applications within the exercise field where infinite movement possibilities are desirable. In the same exercise field, alternative foot supporting members could be married to the basic suspension system 316 to achieve additional functional capabilities or enhance appearance. In FIGS. 24-28b alternative leg members, illustrated in devices 410 and 510 are shown coupled to the suspension system 316 through a pivotal attachment means 488 and 588.

Device 410 provides an exercise device that makes use of the same suspension systems 316, 316a, and 316b, shown as device 310 in FIGS. 18-23b, with a modification to the support members 314, such that foot supports 312 have been removed from support members 314 and made apart of an alternative pair of leg members 400. These alternative leg members 400 are pivotally attached to frame branches 428 stemming off from frame 420's frame uprights 422 at locations 434. Some advantages of alternative legs 400 coupled to suspension system 116 is to: 1) bring to the exercise device another means to which foot supports 412 may be attached and support the user, 2) offer a vehicle for which arm levers 490 can be mounted and coupled to the leg movement, and 3) be a means for automatically changing the tilt of the foot supports 412 and 512 to follow the natural angular position of the user's feet during all exercises. The legs 400 also prevent the support members 414 from dropping to the floor and provide a means to the user to be able to select a number of settings that represent different degrees or different distances of vertical movement that can be obtained by the user.

Each leg 400 includes an upper support or link 482 pivotally connected to the frame branch 428 at a hip pivot 434 and a lower support link 484 pivotally connected to upper link 482 at knee pivot location 436. The knee and hip pivots are generally aligned with the knees and hips, respectively, of a user standing on the foot supports 412, as well as, the hip pivot is in near vertical alignment with pivot locations 430 located substantially above. Standing upon foot supports 412 the user is still able to perform walking, striding, stepping, and climbing exercises simply by alternating their leg motion, same as done on device 510. Each foot support 412 is fixed at an angle (e.g., perpendicular) relative to the lower support link 484 to follow the natural motion of the user's foot and a foot restraint 478 in the form of a toe kick, preventing the foot from sliding off from the foot support in the forward direction. Near the lower end of the lower support link is an attachment stud 446, which is round bar material fixed to and perpendicular to, and facing outward from the lower support link 484. The attachment stud 446 mates with the engagement plate 448 found attached to the lowest end of support member 414, thus linking the legs 400 to the suspension system 416 via support member 414. The engagement plates 448 each have a series of holes into which the user may insert the attachment stud 446. Selecting an upper hole on the engagement plate 448 gives the user greater vertical range of motion, which is better suited for jogging, stepping, and climbing exercises where the user's knees and feet travel a greater vertical distance. A lower hole selection results in a lesser range of vertical movement, which is better suited for walking and gliding exercises.

Another modification of an exercise device according to the present invention is shown in same FIGS. 24-28b where device 410 and 510 contain arm levers 490 that extend forwardly from upper links 482 at an angle (e.g., perpendicularly) to couple arm movements with leg movements, for example during striding, stepping, and walking exercises. Levers 490 are shown as nearly straight bars or poles extending forwardly from an upper end of link 482, but can be bent or curved or attached anywhere along upper link 482 at any desired angular orientation. The upper link 482 and arm levers attached, always move, during any exercise, regardless of whether the foot supports 412 move only back and forth or only up and down; this allows the user the option of enjoying an upper body workout during any exercise.

Figure 25:
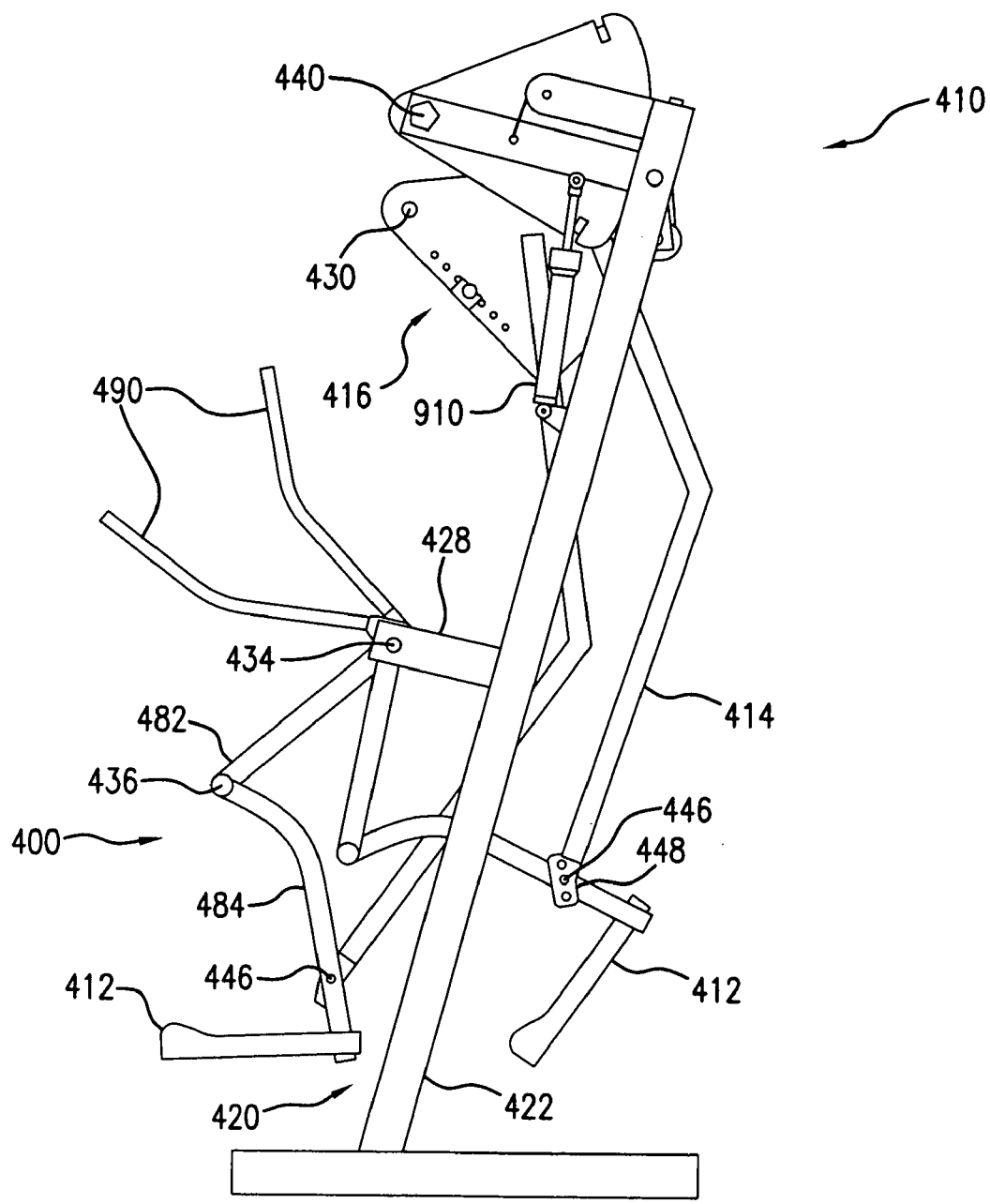
FIG. 25 is a side view of the exercise device shown in FIG. 24
Figure 26:
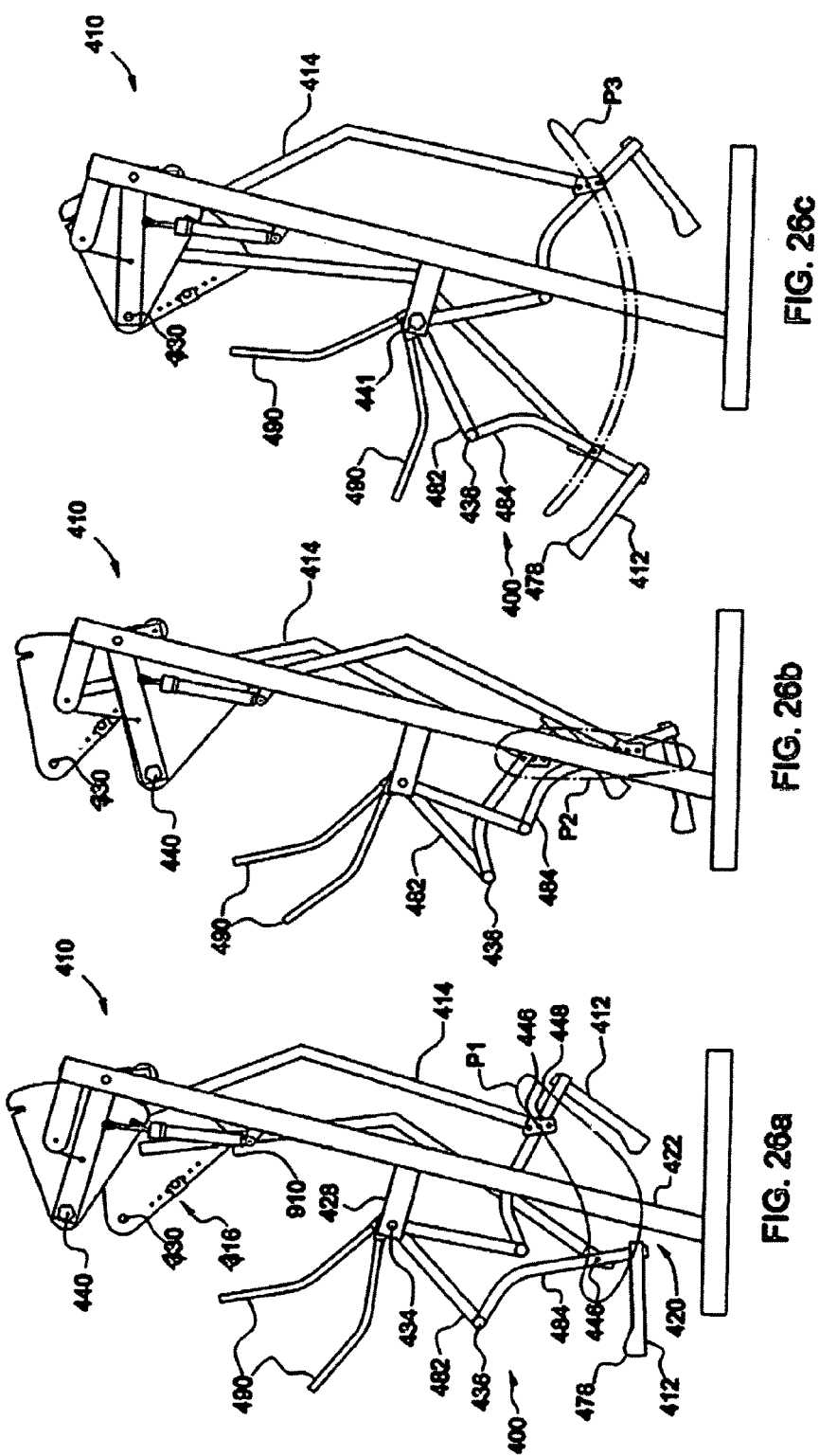
FIG. 26A is the same side view as FIG. 25, illustrating the device operating in a walking mode.
FIG. 26B is the same side view as FIG. 25, illustrating the device operating in a stepping or climbing mode.
FIG. 26C is the same side view as FIG. 25, illustrating the device operating in a cross-country skiing or gliding mode.

A resistance means may be added to the legs 400 to resist movement in the horizontal or back and forth motions. It is natural to feel an increased resistance against horizontal movement as the incline of travel increases, therefore a horizontal resistance means 440, as shown on device 410 in FIG. 25 and means 441, as shown on device 410 in FIG. 25c, are add to the device. Frictional resistance added to the movement of the upper links 382 or to the suspension system, is a natural addition to the device. Both locations for adding resistance to the horizontal movements offers the user the ability to change resistance setting during any one of the exercises, by tightening or loosening a control knob. A friction disk and clamping mechanism to adjust the level of resistance is just one of many ways or types of resistance that could be incorporated into these exercise devices.

Another modification of this device would feature independent left and right foot supports that are not forced to maintain opposite back and forth movement, which may use resistance means that may influence backward, as well as, forward travel. It is desirable to have resistance against rearward travel, for the purpose of simulating uphill travel to increase the challenge to those muscles used to propel the body forward when standing upright. Resistance against forward leg movement simulates traveling downhill. Resistance against both rearward and forward leg travel simultaneously, may simulate travel, for example, of walking on sand or in mud. It should be appreciated that different types of resistance, such as, linear or variable resistance or the different degrees of resistance by two opposing directions at the same time, may be preferred to achieve the type of simulation desired by the user.

Figure 27:
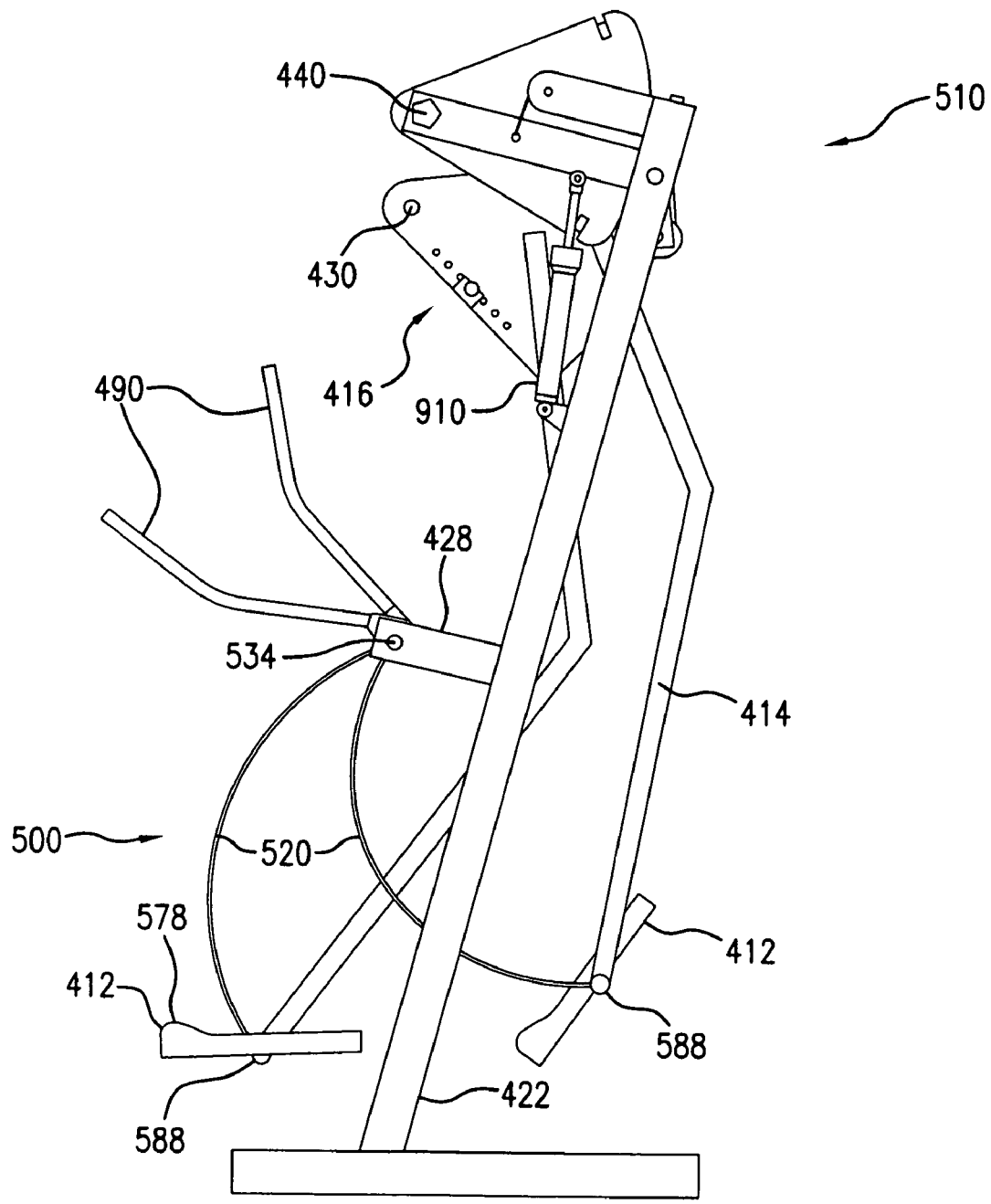
FIG. 27 is a side view of a twelfth embodiment of an exercise device according to the present invention, showing modified alternative leg members.

As legs 400 offer many advantages to the basic exercise device 310, it should be known that other types of legs made up of linkages with pivoting parts, or components that may telescope, may be configured to offer the same or similar benefits. As shown in FIG. 27, a modified leg 500 is featured using a single flexible member with a hip pivot 534 and a foot support 512 attached to the lower end. As leg member 520 flexes during upward lift, the affixed foot support 588 is forced to change angular position, which nearly will follow the natural tilt of the user's foot as the foot platform elevation raises and lowers.

FIGS. 25a-25c, illustrate some of the movement patterns obtainable when using the exercise device, as well as the angular position of the foot supports at various leg positions during certain modes of operation. FIG. 25a illustrates device 410 functioning in a walking or jogging mode, were the foot supports travel freely in an elliptical path P1 defined by the user to simulate natural movement of the feet during walking, jogging or running mode. Walking follows a movement pattern such that the elliptical path is flatter and shorter. Jogging requires a movement pattern that is still somewhat short in length and long in height. Running takes an even longer and higher stride.

FIG. 26b shows the device 410 operating in a stepping or climbing mode, where the foot support movement path P2 is mostly up and down; and FIG. 26c shows the device 410 operating in the cross country skiing or gliding mode, where the movement path P3 is mostly back and forth.

Figure 23B:
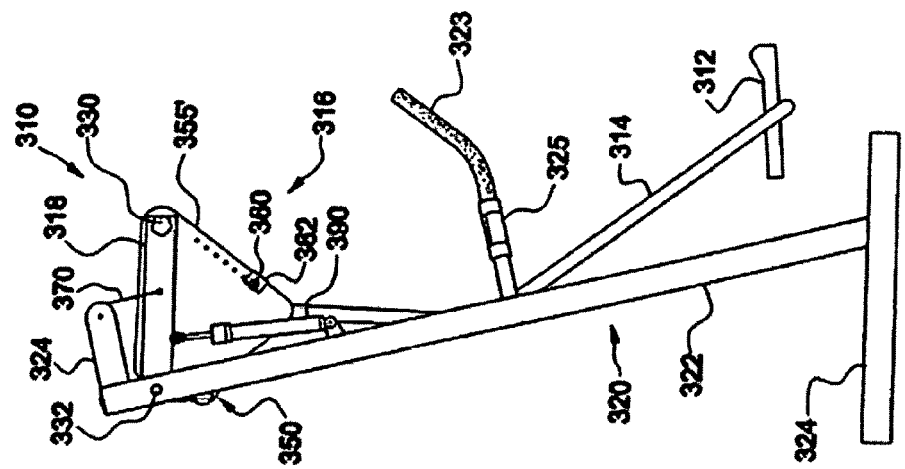
FIG. 23B is the same side view of the exercise device in FIG. 23, showing the foot supports preset in a forward uphill simulation position.
Figure 23A:
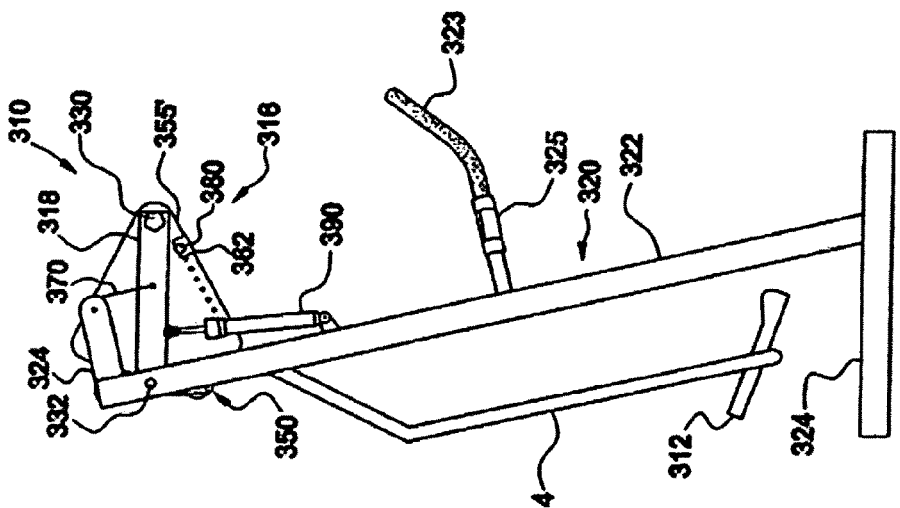
FIG. 23A is the same side view of the exercise device in FIG. 23, showing the foot supports preset in a rearward downhill simulation position.
Figure 23:
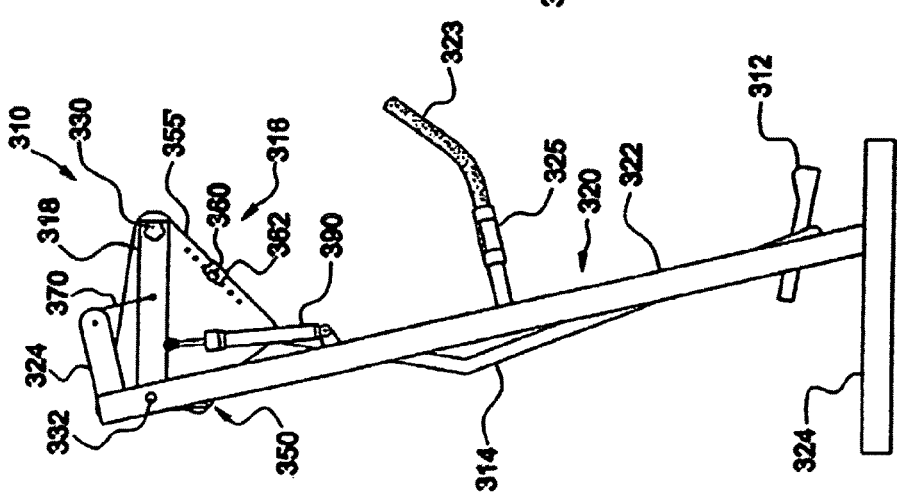
FIG. 23 is a side view of the exercise device shown in FIG. 18 showing the foot supports in a neutral preset position.
Figure 24:
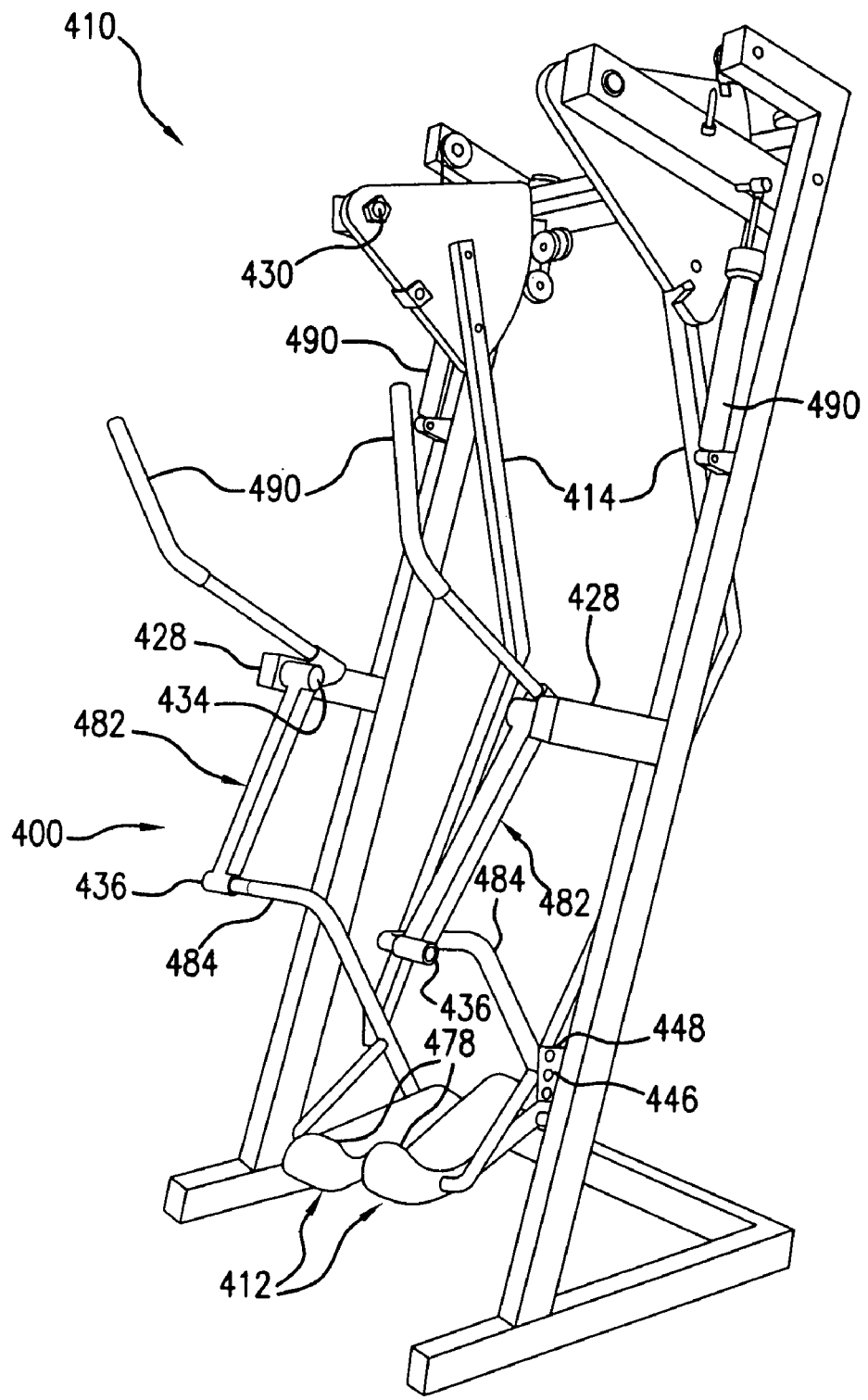
FIG. 24 is a perspective view of an eleventh embodiment of an exercise device according to the present invention with the addition of alternative leg members with arm poles.
Figure 28B:
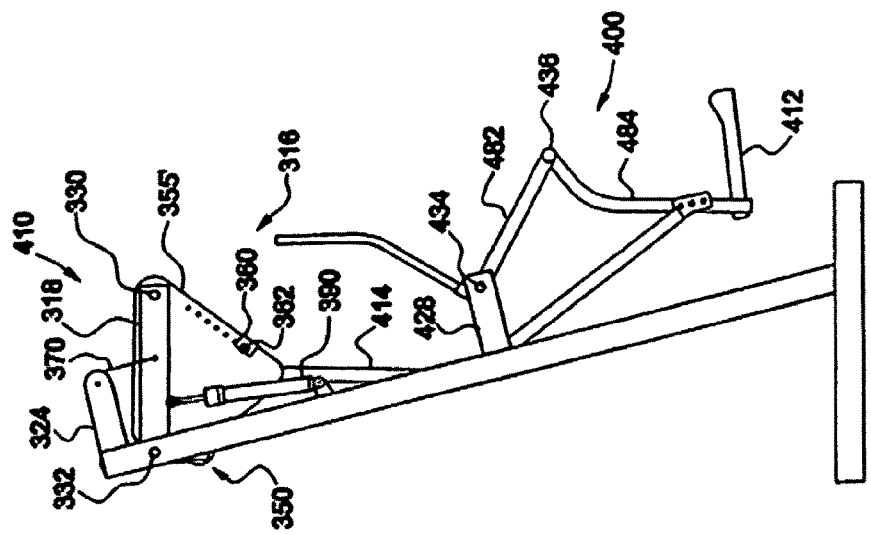
FIG. 28B is a side view of the exercise device shown in FIG. 24, illustrating the exercise device configured in an uphill preset position.
Figure 28A:
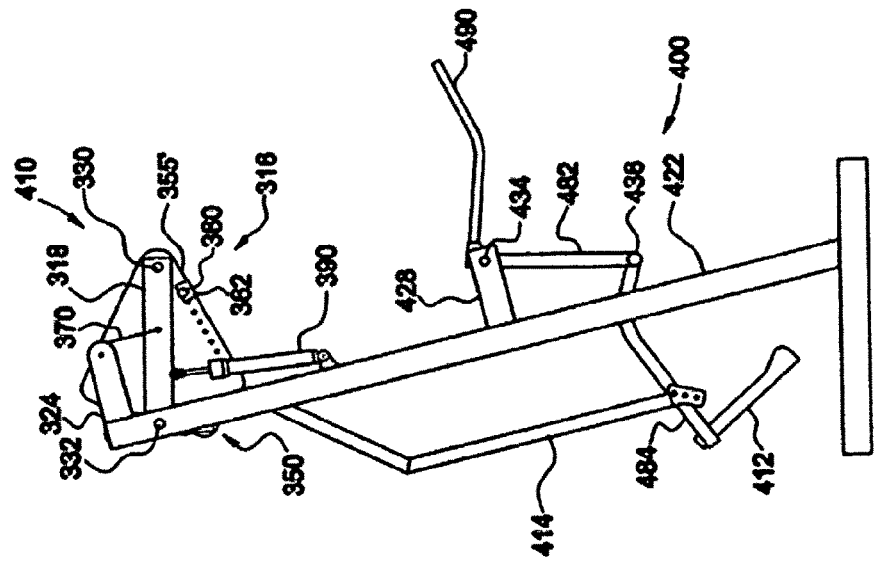
FIG. 28A is a side view of the exercise device shown in FIG. 24, illustrating the exercise device configured in a downhill preset position.
Figure 28:
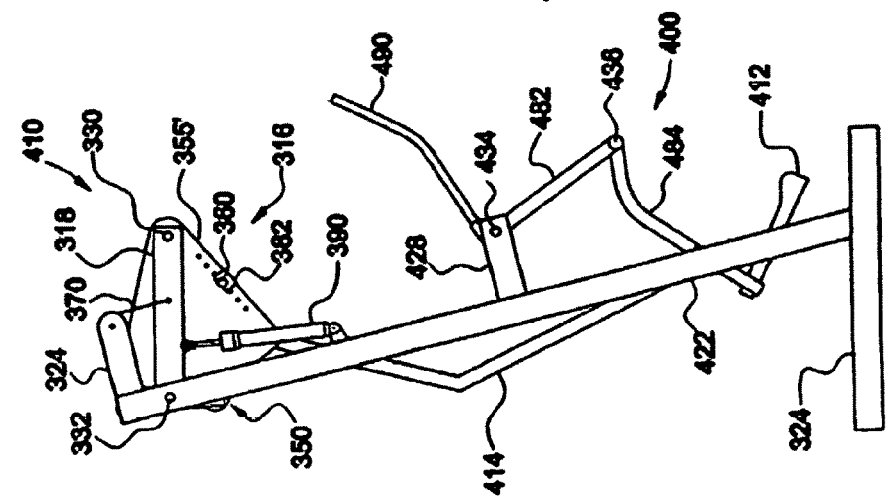
FIG. 28 is a side view of the exercise device shown in FIG. 24, illustrating the exercise device configured in a neutral preset position.

Simulation of level, downhill, and uphill travel shown in FIGS. 23-23b, can be simulated, as well, on devices utilizing alternative leg members, as shown in FIGS. 28-28b, as is the case, without alternate leg members. The arm poles 490 give a means to which the upper body can benefit from the various simulations listed above. For example, the downhill simulation mode shown in FIG. 28a causes the user to have to lean forward whereby the user supports some of his weight against the arm poles 490. In this mode the chest and triceps, as well as other muscles enjoy the benefits of the resistance. The uphill simulation mode, as shown in FIG. 28b, causes the user to lean back, whereby the user engaging the arm poles 490 takes on having to support some body weight by having to pull on the arm poles. In this mode, the user works shoulders, back and bicep muscles, to name a few.

Figure 31:
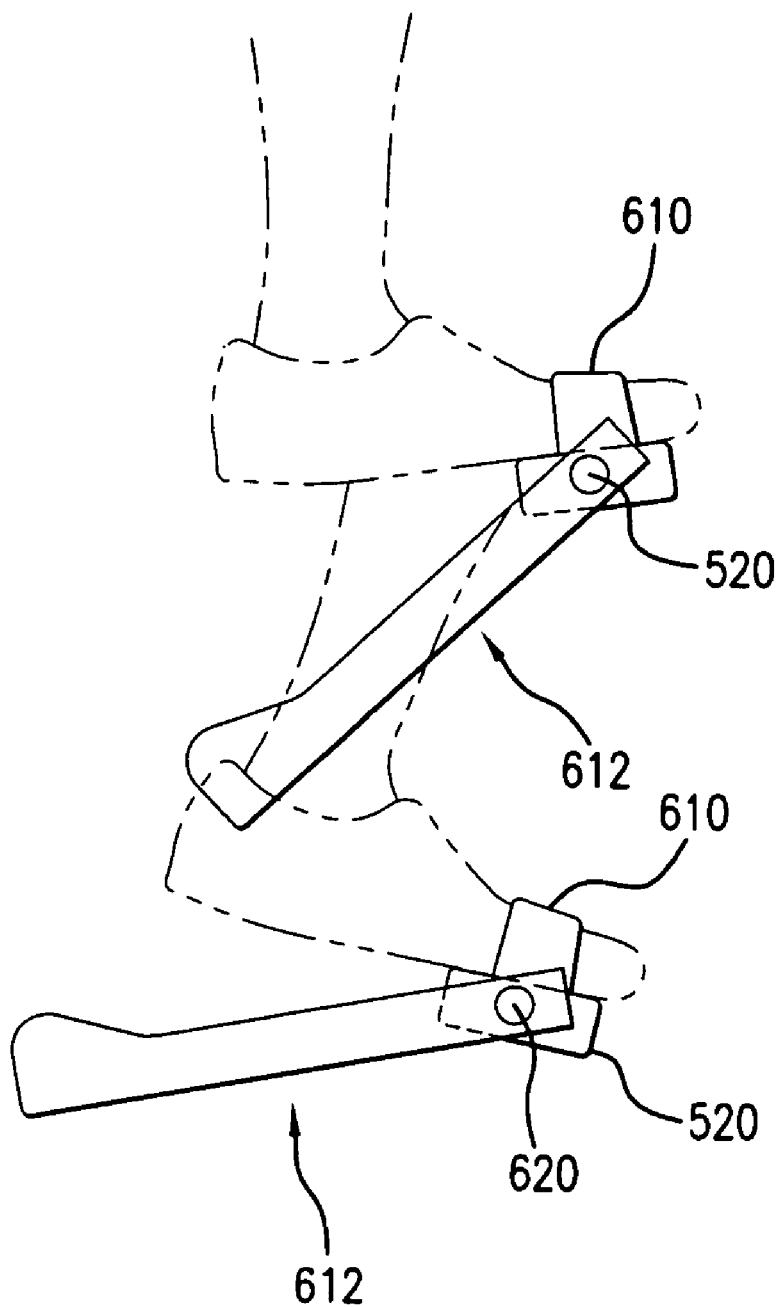
FIG. 31 is a side view illustrating a modified foot support for use in an exercise device according to the present invention.

FIG. 31 shows a modified foot support 612 that allows the user to engage the pivotal pedal 520 located at the heel of the foot support 612. The advantage of operating the exercise device, whereby the user stands upright turned a 180 degrees from the typical forward facing position, is to give the user a vertical range of motion greater than can be had facing forward. The heel of the foot support 612 will travel a greater distance vertically as a result of the bending and/or flexing of the alternative leg members 400 and 500 relative to position of their pivot points 434 and 534 upon the frame. The greater vertical range of motion makes a more challenging climbing exercise mode. In this position, facing rearward and standing on the pivoting pedals 520, the user may engage the arm handles 382 shown in FIG. 30. Stirrups 610 prevent the user's feet from sliding off the pivoting pedal during the exercise. When not in use, the pivoting pedal 520 may be rotated such that the stirrup 610 faces downward and out of the way, and the flat under portion surface of the pedal is positioned upward and flush with the top surface of the foot support 612 to support the user's heel during regular operation.

As an additional feature, a safety device or mechanism, shown in FIG. 19, can be fitted to the exercise device, and coupled to the suspension system, whereby the foot supports 312, 412, 512 and 612 can be held nearly still during the sometimes unsteady time when the user mounts and dismounts the machine. The time during which one foot is planted on the foot support and the other is not in contact with either the floor or other foot support is a time in when the engaged foot support may swing away from the non-planted foot, giving the user a sense of instability. The additional safety device remains engaged, clamping for example, one of the suspension disks 355 to the pivot arm 318. Clamping these two elements together causes the suspension system to lock, therefore preventing the movement of the support members 314 and 414, and therefore holding still the foot supports. Clamping of the mechanism may be done using a spring to force the mechanism into the clamping mode. Disengaging the clamp would occur upon the addition of weight applied by the user standing upon both foot supports, thus making the system work in automatic fashion. The weight of the user upon the foot supports causes there to be significant tension in cord 370, which carries the load of the user. An idler pulley pushing against the cord and indenting its path is forced to do so by the force created by the clamping spring. The idler pulley is positioned to have a significant mechanical advantage over the clamping spring by having a location a greater distance away from the pivot point on a lever arm. The weight of the user upon the foot supports, thus increasing the tension on the cord 370 forcing the idler pulley to draw inward, causing the lever arm to pivot, and thus disengaging the clamping mechanism, and freeing up the suspension system for operation.

From the above, it will be appreciated that the exercise device according to the present invention permits a user to stand upright on a pair of foot supports suspended from a suspension system attached to a frame or directly to an alternative leg element attached to a frame and controlled by the suspension system, whereby a user can perform walking, striding, stepping, and climbing exercises, without mechanically adjusting the device. It will also be appreciated that the invention may be integrated into another device where horizontal and vertical movements are had and whereby the same device can utilize the invention as a means for assisting, controlling, interlinking, or resisting all or certain movement made by that device. It will also be appreciated that the invention while having been shown as having twin features interlinked to one another and operating in opposite movement patterns from one another, can as well, be a single unit. The use of a single unit may have applications, as well in the exercise field, where free movement is desired coupled with resistance means to offer resistance in any direction of movement throughout that free movement. For example, a multi functional exercise gym device, offering many different exercises, could feature the invention, whereby the invention would offer the user total freedom of movement, to move in a path defined by the user, whereby resistance would be present at all times in both the horizontal and vertical directions. In such an application, a support member similar to component support member 314 shown in FIG. 18, would rather than have a foot support attached, may have a handle bar, padded bar, handle, or foot strap to allow the user the ability to engage the suspension system to simulate many different strength training exercises. It will also be appreciated that the suspension system can be positioned on another plane, whereby for example; movement would be parallel to the floor. It will also be appreciated that the invention may be in a non-affixed position, where freedom of movement to cover all directions, whereby total freedom of movement would be three-dimensional.

It will be appreciated that the invention, which is a system that allows simultaneous movements in different planes, can achieve this function using many different types of construction materials, and design configurations.

The frame can have any configuration to support a user standing on the foot supports, including, but not limited to, configurations wherein one or two uprights extend upwardly from a horizontal base or configurations where the frame is part of the wall or ceiling. Any suitable structural members can be used in fabricating the frame, but not limited to, solid or hollow members formed of metal, plastic or reinforced materials.

The suspension system, whether directly attached to foot supports or linked to alternative leg members, may or may not link each foot support to the other to ensure that opposite movement in either or both the horizontal and/or vertical directions are maintained. The suspension system may or may not be fitted with resistance means, as resistance means could attach to, for example, alternative leg members, yet still influence movement. In addition, the suspension system may be responsible for carrying the entire load of the user, partial load, or may rely on a separate means to support the weight of the user.

The linkages making up the alternative leg members can be straight, curved, or angled and can be formed of any suitable material, such as plastic or reinforced plastic, in solid or hollow configurations. While the linkages preferably include two links, it will be appreciated that any number of links can be used to suspend the foot supports from the frame.

Applications for this invention may expand beyond the scope of the exercise field. As a non-impact, freeform or having paths of movement directed by mechanical and/or computer programs, and having the ability to accurately simulates many lower body movements each having many levels of resistance available, as well as, many different combinations of resistance affecting horizontal and/or vertical movement; this device can be greatly appreciated in the field of rehabilitation.

Another application for this invention could be in the field of virtual reality, where its use as an input device by a user to interact with a computer for the purpose of training, entertainment, sport, exercise, rehabilitation, and/or media production could be enjoyed.

Figure 32:
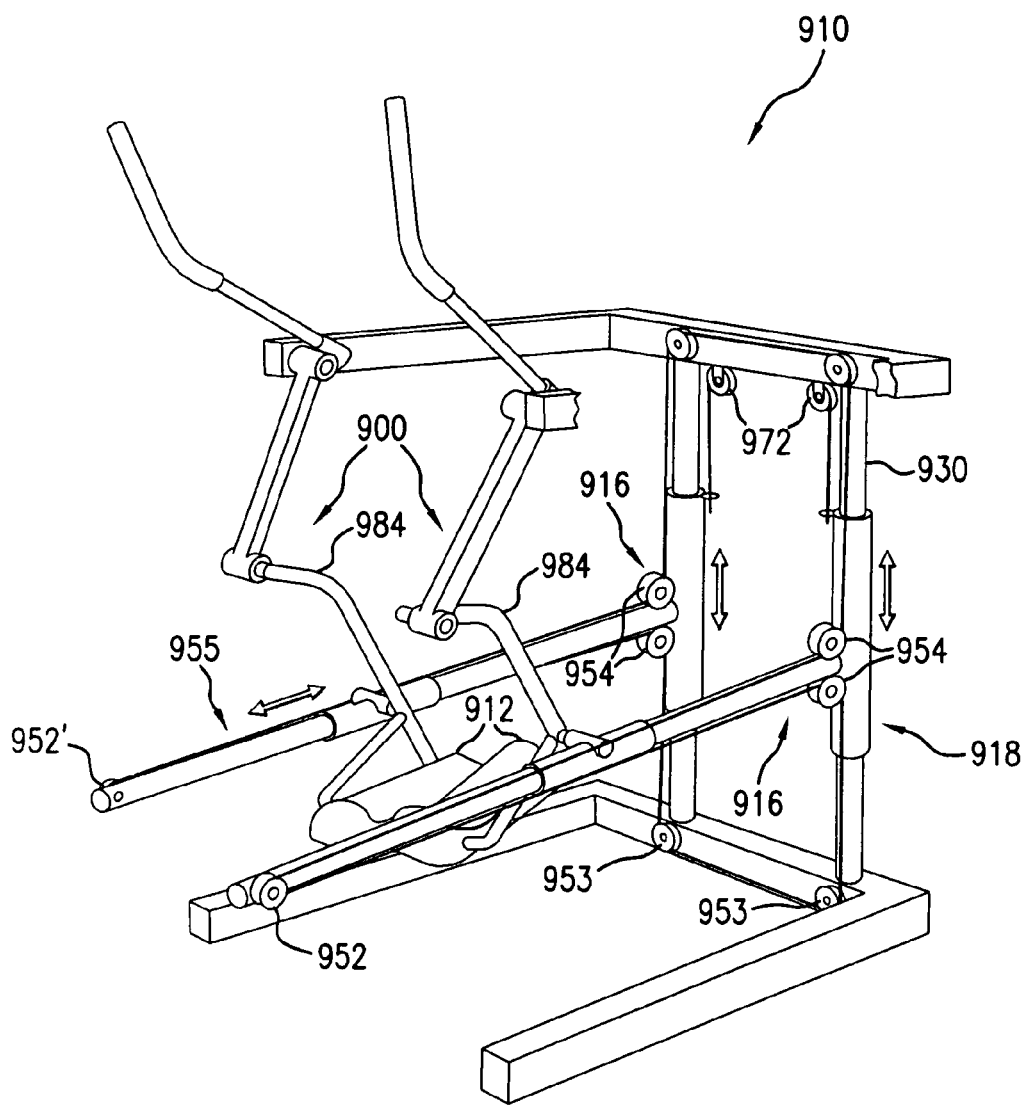
FIG. 32 is a perspective view of a thirteenth embodiment of an exercise device according to the present invention illustrating another method of suspending foot supports from a frame.

Another variation of the invention, shown as device 910 in FIG. 32, utilizes twin left and right dual carriage systems 916. The left and right carriage systems 916 each include a vertical carriage system 918 that travels on a linear path directly up and down, and a horizontal carriage system 955, which travels on a linear path back and forth on a horizontal plane parallel to the ground. Each carriage system is coupled to there twin carriage counterpart, such that opposite movement is maintained consistently throughout the entire ranges of motion. The vertical travel carriage 918 of the left side is linked to the vertical carriage 918' of the right side, by way of a vertical drive cable 970. Vertical drive cable 970 is a short segment of cable that attaches to weldment brackets 919, that are affixed to the top outer edge of each vertical left and right guide sleeve 918. Cable segment 970 links each guide sleeve together by routing over idler pulleys 972 which are mounted to the underside of the upper frame member 922, in such a manner, that when downward force is placed upon one side, the other side reacts by being drawn upward an equal distance. Each left and right guide sleeve 918 travels upon guide rods 930, which are positioned parallel to each other starting from their attachment to the frame base 924 and run up and terminate upon their attachment to upper frame 922. The length of the guide rods 930 need only be long enough to allow a vertical travel distance of the guide sleeves adequate enough to meet the vertical displacement demand of the most demanding exercise. Affixed perpendicular to and directly forward from each left and right guide sleeve 918 is a horizontal guide rod 914, which are held in a parallel position to the ground and are a length long enough to allow an adequate range of back and forth motion of the guide sleeves 955. A low friction bearing material, linear ball bearing, or rollers will be found between the guide sleeves 918 and 955 and the guide rods 930 in order to maintain consistent low friction travel throughout the travel path, as pressure between the guide sleeves 918 and guide rods 930 change as downward forces greatly increase as the force is delivered further out on the cantilevering guide rods 914.

Horizontal left and right guide sleeves 955 are pivotally attach to the lower leg links 984 and slide upon the horizontal guide rods 914. The lower leg links 984 are pivotally attached to the horizontal guide sleeves 955 so that the foot supports 912 may tilt along with the user's feet throughout the different exercise movements. Movement of each foot support in the horizontal directions are held in an opposite movement pattern, as a result of, an inter linkage system between the left and right guide sleeves 955, consisting of ten idler pulleys and an endless loop of cabling. The cable and pulley arrangement and the attachment of the cable to the guide sleeve 955 on one side of the device mirrors the arrangement on the other side. Opposite back and forth movement of the guide sleeves 955 is always maintained and not affected by the up and down travel of the vertical guide sleeves 918. Force resisting members, shock absorption members and momentum simulation devices may be added to enhance the effectiveness, safety, realism, and performance of this device. As leg members 900 are shown in FIG. 32, it must be appreciated that similar performance can be had on this device without their presence.

Figure 33:
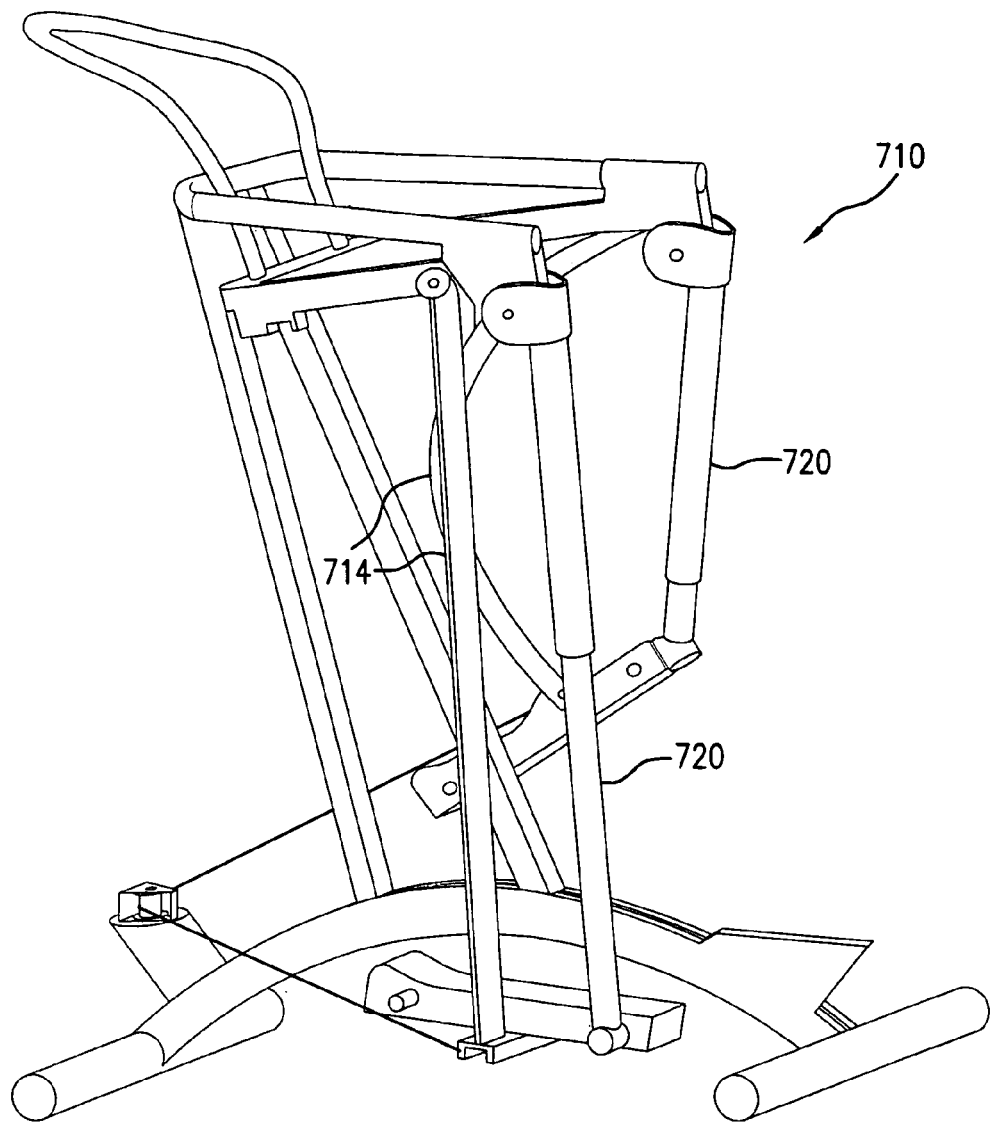
FIG. 33 is a side view of a fourteenth embodiment of an exercise device according to the present invention featuring flexible leg linkages and telescoping linkages.
Figure 34:
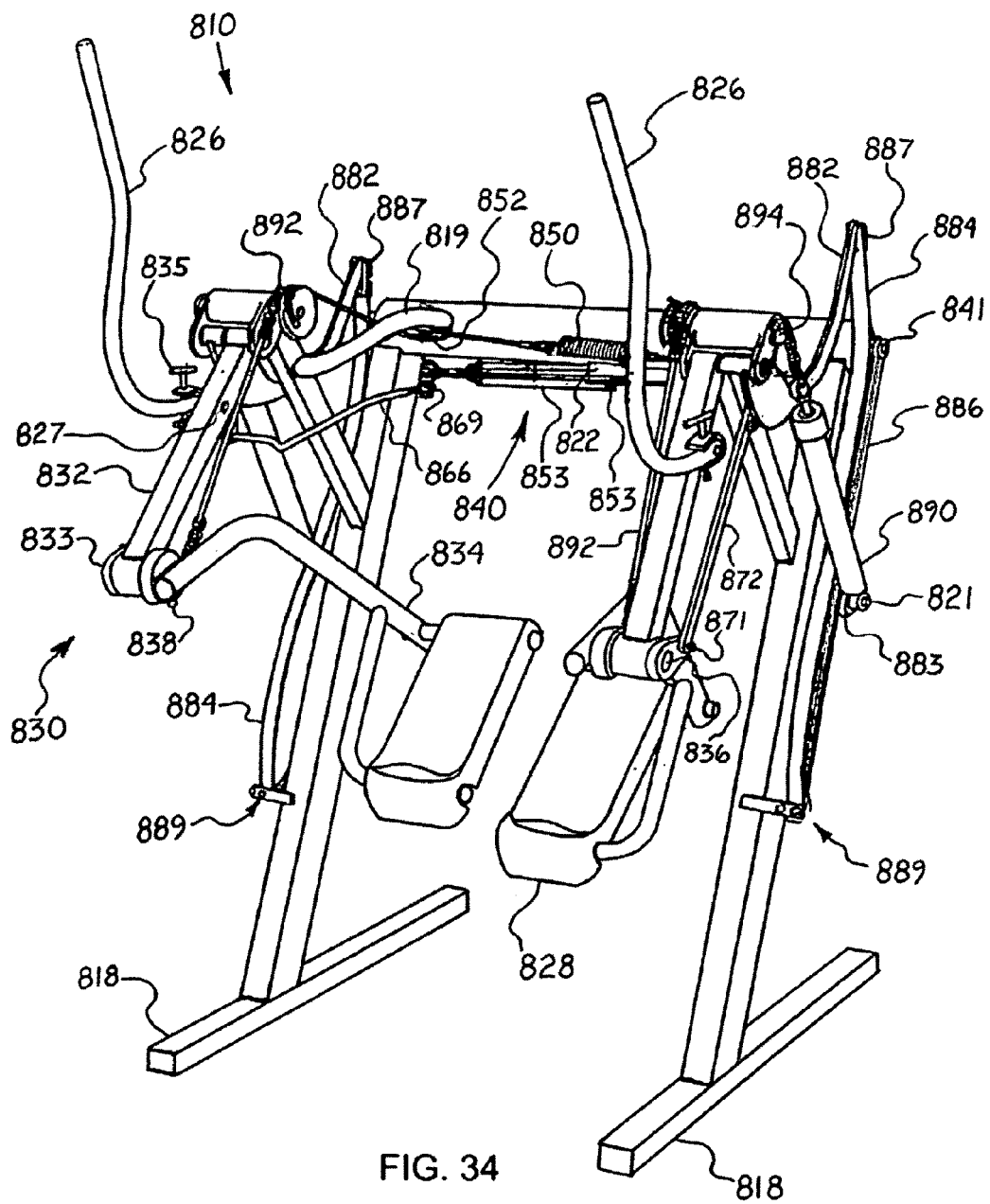
FIG. 34 is a perspective view a fifteenth embodiment of an exercise device according to the present invention featuring a horizontal isolation system linked to a specific resistance source. This device also features an improved safety/suspension system, as well as, other distinct features.

An exercise device 710, as seen in FIG. 33, uses a flexible linkage bar as a replacement for the leg linkages. The flexible bar 714, same as leg linkages, cause foot platforms to stay in near perfect alignment with the users feet regardless of the exercise movement pattern. A suspension system could be coupled to the rearward positioned telescoping tubes 720 to make available the different exercise options as described earlier.

An exercise device, generally indicated 810, according to the present invention, as shown in FIGS. 34-39, features a device similar in general structure to device 10, as shown in FIGS. 1-10, however, there are several modifications found on this device 810 which, when implemented alone or in combination, further enhance the performance and improve simulation accuracy. The first modification comes with the addition of the horizontal movement isolation system 870, which will only activate the horizontal resistance system 880, causing resistance against rearward horizontal movement, when the lower leg linkage 830 travel rearward along the horizontal plane. The horizontal movement isolation system 870 will deactivate the horizontal resistance system 880 when the foot platforms 828 move in pure up and down fashion, such is the case when in stepper mode. Such a system, which provides resistance to the horizontal movement of the user's feet, yet does not apply resistance to the vertical movement of the user's feet, has been found to improve simulation of natural exercises. A separate source of resistance for resisting vertical downward movement will later be described. To initiate and maintain forward travel when performing natural exercises, the lower body must first overcome the forces that hold the body at rest, then it must overcome the forces of gravity and friction which oppose continuous travel. An effective method of simulating those natural forces present against the body when initiating and maintaining forward motion is to cause the foot platforms 828 to move rearward against a resisting force. FIG. 38 illustrates how the rotation of the flywheel pulley 841 translates into the rotation of flywheel tube 842. The illustration of flywheel pulley 841 in FIG. 38 shows an alternative pulley design having multiple grooves, sometimes referred to in the industry as a "Poly-V type" pulley, which would be activated by a "Poly-V Belt" 886 rather than a cord. Alternative transmission products such as chain and sprocket would also suffice, but would be noisier during operation.

I have found it generally desirable to have resistance against the rearward moving leg while having no resistance against the forward moving leg. Therefore, as shown in FIGS. 38 and 39, an internal flywheel tube 842 is telescopically fitted within bridge tube 820 with a small gap to permit rotation therein as a flywheel. End caps 849 are disposed at opposite ends of flywheel tube 842, and a shaft 843 extends through the flywheel tube via openings in the end caps. In the configuration shown, shaft 843 is comprised of two shaft portions arranged end-to-end with outer ends of the shaft portions mounting drive pulleys 841 and inner ends of the shaft portions juxtaposed within a clutch/bearing housing 845. The clutch/bearing housing 845 is shown as a cylindrical member secured within flywheel tube 842 and having a bore formed there through in coaxial relation to the flywheel tube. Each half of shaft 843 extends from an end cap 849 into the bore formed through housing 845. One-way clutches 844 are mounted on housing 845 against the shaft portions to permit rotation of the shaft portions in one direction and resist rotation in the opposite direction. Needle-Roller Clutch Bearings, such as manufactured by Torrington Company, are an example of a suitable one-way clutch for this purpose. The Needle-Roller Clutch Bearing drives the shaft in one direction, yet free-wheels in the opposite direction. Circular shoulders are formed in the housing at opposite ends of the bore to mount ball bearings 847 to further reduce friction and to ensure that the shaft and clutch remain in close parallel alignment. The drive pulley 841 is affixed to the shaft 843 and the opposite end is inserted through the clutch 844, which has been press fit into the clutch/bearing housing 845. The clutch/bearing housing is generally in a central location within and affixed to the internal flywheel tube 842. To hold each left and right shaft 843 along the center axis and parallel to the internal flywheel and frame tube 820; end caps 849, mounted within each end of the internal flywheel and having low friction bores, as well as, end caps 851 with low friction bores mounted at each end of the frame tube, together act to ensure that the internal flywheel maintains a centered and parallel position within the frame tube. As an inexpensive method of producing friction against the rotation of the internal flywheel, an optional belt 898, as shown in FIGS. 38 & 39, can be wrapped around the internal flywheel. The belt 898 is at one end attached to the frame tube 820 to the upper side of a slot cut out of the back of the frame tube. The belt 898 then encircles the internal flywheel 842, and clears the inside surface of the frame tube 820, then the belt exits the frame tube at the bottom of the slot headed upward and back over the first mentioned belt attachment point. As belt tension is increased by pulling the second exit end of the belt 898, greater resistance is applied in braking fashion against the internal flywheel 842, which in turn generates greater resistance against the rearward moving leg of the user. To ensure the level of resistance is more evenly maintained as the belt is in tension, a spring, such as the spring 899 may be used to more uniformly transfer the pulling force initiated by the user. In FIG. 38, the belt 898 is shown to be installed at a center of frame location, yet may be installed off center, which may aid in the installation of a manual control belt tension mechanism if mounted to a forward position on the frame or perhaps mounted to an arm pole 826. It should also be appreciated that other friction or non-frictional means could substitute the brake strap method of applying a braking force opposing the rotation of the flywheel. While it is possible to mount one or more flywheels externally of the bridge tube, it will be appreciated that use of an internal flywheel reduces visual clutter and results in quieter operation of the exercise device.

Figure 36:
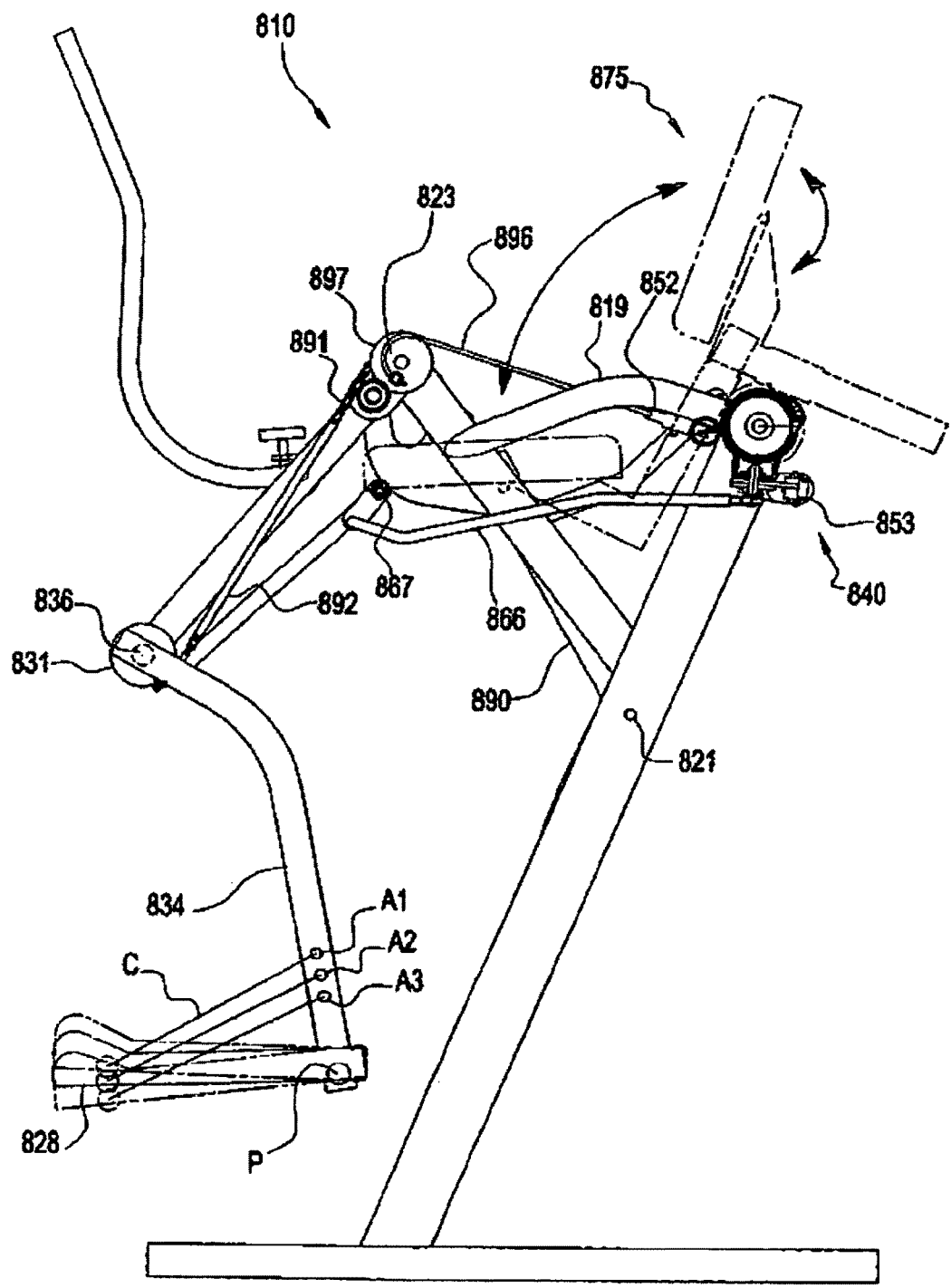
FIG. 36 is a side view of the device illustrated in FIG. 34 showing an optional seat and back support. Also shown is an optional adjustable tilt foot platform.

The horizontal isolation system 870 of device 810, shown best in FIGS. 36-37, produce isolated horizontal resistance through the use of the following variety of components pivotally linked together in such a manner as to only engage resistance from the horizontal resistance system 880 when horizontal rearward movement of the foot platforms 828 occurs. Description of the skiing exercise mode, an exercise having nearly pure back and forth horizontal foot movement, will most clearly demonstrate how this horizontal isolation system 870 works to engage resistance only as the foot platforms 828 move rearward. The skiing exercise mode is performed on these devices by the user standing generally upright upon the foot platforms 828 and generally maintained in a fully lowered position and caused to swing in a back and forth arc about a the hip pivot 824. Throughout this swinging movement, each upper linkage 832 and each lower linkage 834 generally hold in a fixed position to each other whereby there angled position to each other about the knee pivot 836 remains generally the same. The knee linkage component 833 is the first member of the horizontal isolation system 870 to engage the leg linkages 830. More specifically, the knee linkage component 833 is indirectly affixed to the lower link 834 through knee pivot rod 836 upon which both the lower link 834 and the knee linkage are affixed and thus rotate about the knee pivot in perfect unison. In this device 810, the lower link 834 is welded to the knee pivot rod 836, which same rod 836 is pivotally attached to the lower end of the upper linkage 832 which same end has a housing tube containing a bearing sleeve or two maximum spaced ball bearing unto which the knee pivot rod passes through and beyond. The portion of the knee pivot rod 836 that extends beyond the housing becomes the attachment platform onto which the knee linkage component 833 is affixed. Preferred methods of attachment between the two components include, but are not limited to, welding, use of setscrews, keyway, or any other method that does not allow much slippage. Even small amounts of slippage or sloppiness within the early part of this system will become magnified and result in the early span of backward movement having no resistance, then a sudden onset of resistance will occur resulting in a somewhat uncomfortable jarring affect upon the user. The next component of the system is a linkage bar 872 consisting of a rigid material, such as steel bar, which preferably will not flex under the forces of compression, which will act on this link as the horizontal resistance system 880 engages. At one end, this linkage bar 872 is pivotally connected to the knee linkage component 833 a few inches away in the rearward direction from the knee pivot axis 836, while the opposite end engages the pivotally attached lift arm 882. The lift arm 882, the third element of this system, has one end pivotally attached at the hip pivot 824 and the other end, a substantial distance away, pivotally attached to the belt/flat spring mount 887. This lift arm component 882 is caused into rotating action through the pushing action of the linkage bar 872 which, again, is pivotally attached to this lift arm 882, a distance similar to the distance between the knee pivot 836 and the union point between the knee linkage component 833 and the linkage bar 872. Therefore, it should be understood that as the leg linkages swing back and forth during the skiing mode, the three main components 833, 872, and 882 of the horizontal isolation system 870 are forced to move together as one, about the hip pivot 824. As the lift arm 882 is forced to move the attached belt/flat spring mount 887 in an up and down arc pattern about the hip pivot, the stage is set, whereby the transmission belt may be attached to the belt/flat spring mount 887, and caused to pull and drive the drive pulley 841 to rotate and engage the horizontal resistance system 880. From the belt/flat spring mount 887 upon which the transmission belt is affixed at one end, the transmission belt 886 is then directed downward, around and underneath, from the forward side of the idler pulley 883, which rotates freely around the piston mount rod 821, then the transmission belt 886 travels up to and around the drive pulley 841 before finally traveling downward and attaching to the union bridge mount 889. The union bridge, if made heavy enough, can produce enough tension on the transmission belt whereby the transmission belt could cause the drive pulley 841 to rotate, however as the transmission belt is quickly drawn forward, as the user swings the leg linkages forward, the momentum of the upward traveling weight, would continue to carry the weight upward even after the forward leg swing reaches the point in which its direction changes. Therefore, slack would exist in the transmission belt and the belt would not be able to drive the drive pulley until the weight changes direction and is able to generate enough force back onto the transmission belt. Another method, would include an extension spring or stretch cord, which would have to be long enough, whereby the pre-stretch in the spring would generate enough force on the transmission belt to drive the drive pulley, yet not generate to great a pulling tension against the transmission belt at the end of the stroke, as the spring or stretch cord is stretch to its maximum point. The problem with this arrangement is that the tension would increase as the element is stretched, which would produce an undesirable type of resistance on the user or would require the use a stretch element long enough that the margin of stretch would not produce a significant increase in tension during the entire stretch span. To satisfy this requirement would require the use of lengthy stretch elements or complicated linkages or block and tackles linked to a shorter stretch element. Another option would be to use a constant stretch spring, which could satisfy the requirements that would allow for comfortable use and a means to allow the full range of passage by the transmission belt while keeping belt under a consistent minimum level of tension. The problem with the constant force spring is that the component is costly and has a relatively short life span.

One end of the flat spring 884 is affixed to the belt/flat spring mount 887 forward to the transmission belt 886, which piggybacks the flat spring 884. The flat spring 884 then drops downward passing in front of the idler pulley 883 and terminates at the belt/flat spring bridge 889. Before the final union is made attaching the flat spring 884 and the transmission belt 886 to the union bridge mount 889, tension is set into the system. Tension can be set by shortening the transmission belt 886 about the union bridge mount 889 causing the flat spring to flex until adequate tension is created upon the transmission belt 886 by the flat spring, creating enough frictional force to drive the drive pulley 841. The flat spring 884 must also be rigid enough to be able to reset the system as the lift arm 882 pushes the flat spring 884 downward, as the leg linkages return in the forward direction. As the lift arm 882 rotates downward during the return stroke, compression forces increase upon the flat spring 884, which pulls on the transmission belt 886. Tension in the belt must be great enough to resist the creation of slack as the belt passes the freewheeling drive pulley 841 as the return stroke is in progress, and as the leg linkages 830 travel forward. If the flat spring 884 is not rigid enough, it will over-flex under the pushing force, which will cause undesirable slack to form in the transmission belt 886, whereby the transmission belt will not have enough tension to drive the drive pulley upon the initial part of the drive stroke cycle, whereby the user would first experience non resistance then a sudden onset shock of resistance.

To control the rate that the user's foot drops vertically, a vertical resistance system is used and is illustrated on devices 810-810D in FIGS. 35-37 & 40-43, where each device is illustrated using the same system. The vertical resistance system used on this device generally indicated 810, is very similar to the vertical resistance system used earlier on device 10, as seen in FIGS. 1-10. As device 10 and 810 both use similar components, in virtually the same configuration, there is, however a difference in how the resistance is disbursed to the movement of the leg linkages. Device 10, as best illustrated in FIG. 4 positions the upper pull sprocket 84 in a more upward and forward location in comparison to the comparable upper pull spool 897 on device 810 best illustrated in FIGS. 35 & 36. The more upward and forward the positioning of the upper pull sprocket 84 of device 10, causes the resistance to be divided to both the downward and rearward movement of the user's feet. As device 810 is designed to more closely simulate natural movement it is preferred that the hydraulic cylinder not provide resistance against rearward movement of the foot platforms 828, but remain the prime source of resistance or rate control for downward vertical movement. Therefore, the position of the upper pull spool 828 is more rearward, where the forward edge is in close vertical alignment with and above the hip pivot 824. At that location, only a small amount of horizontal resistance will influence rearward horizontal travel, yet only when the knee pivot 836 is drawn significantly upward. Besides, the small amount of horizontal resistance coming from the vertical resistance system is acceptable, as significant upward knee travel when horizontal leg movement is had, simulates uphill travel, which same uphill travel if simulated accurately, demands for there to exist an initial presence of horizontal resistance. One important reason for the slight above the hip pivot location of the upper pull spool 828, is to provide a small, yet sufficient window of opportunity, in which the leg members 830 may straighten, free of resistance, at the knee pivot 836, as the leg of the user nears the forward most position, toward the end of the return stroke. In other words, the design challenge for this device 810 was to be able to provide resistance against the leg linkages straightening from a bent position during rearward movement such as when walking, jogging, and running; or during pure vertical movement such as when stepping, yet allow resistance-free leg straightening as the leg straightens from a bent position during the return stroke of a walking, jogging or running mode. Resistance-free leg straightening during the forward leg stroke of the walking type exercises, is provided; as the knee pivot 836 is moving forward and upward, slack in the flexible ligaments 891 & 891' begins to form as the distance between the spool 823 and the knee pivot 836 shortens; this slack allows the knee to straighten without creating tension on the system.

Another similarity between this device 810 and device 10 is that both devices use of a system to promote additional lifting force upon the foot platform 828 opposite the foot platform being forced downward by the user exerting downward foot pressure. As the hydraulic cylinders 890 contain return springs to cause the extension rods to retract toward their reset position, this same force provides some lifting force on the foot platforms 828, but not enough to cause the foot platforms to maintain adequate underfoot tension to remain in position under the user's foot when quick movement or a high stepping foot pattern is performed. Certainly, the hydraulic cylinders 890 could be equipped with higher tension springs to provide enough upward lift of the foot platforms, however, the negative side-affects make this not the preferred solution. One of the disadvantages to using higher tension springs within the cylinders would make mounting the device more difficult as the foot platforms would be driven upward to a height challenging the ability of the user to be able to comfortably lift his or her foot to the needed height to be able to engage and stand upon each foot platform 828. Dismounting the machine would also be difficult for similar reasons as mounting. Another disadvantage would be an uncomfortable and constant over exertion of the foot platform against the underside of the user's foot, experienced by the user during the various exercise modes, which would also cause premature muscle fatigue of certain leg muscles.

The foot lift enhancement system used on this device 810, and best illustrated in FIGS. 37 & 38 consists of an extension spring 850 generally center mounted between and attaching to a left and right cable segment 896. Each cable segment 896 partially encircles an idler pulley 852, which directs the cable 896 to a termination point up and over the upper pull spool 895 and attached thereto. The extension spring 850 will become most stretched as both foot platforms are fully lowered. Springs having different lengths and stress range characteristics provide differing results on this device. The spring 850 must not have a length to great, at full stretch, when foot platforms 828 are fully lowered, that interference with the idler pulleys would occur as maximum leg swing is had. The spring 850 must also be strong enough to cause adequate foot platform lift as the user reaches maximum foot height. For the beginner or less agile user it may be preferred to have little or no influence by the foot lift enhancement system as this user may only cause or desire that the foot platforms 828 lift a small amount, and further this user may not feel comfortable with the addition foot lift pressure under foot. On the other hand, a user having greater fitness ability may want a higher performance acting foot platform 828 which would give the user a sense of security that the foot platform would remain under foot under quick movements and high vertical foot lifting action. Therefore, knowing individuals have different preferences it would be an advantage and should be appreciated that a spring with adjustable tension could be easily made apart of this device. It should also be appreciated that other types of springs or more than one could be used. For example, a compression spring could be used where the left and right cable segments could pass through bypassing each other and then each passing through and terminating against a cable spring stop. This spring may nearly fully compress when both foot platforms are fully lowered. It should also be appreciated that a flexible linkage possibly made out of fiberglass could be mounted having a center pivot attached to the frame bridge tube 820 whereby the idler pulleys 852 and spring 850 could be eliminated. Further, it may be advantageous to replace or use in conjunction with a spring, a hydraulic or pneumatic cylinder to achieve different performance goals.

Figure 47:
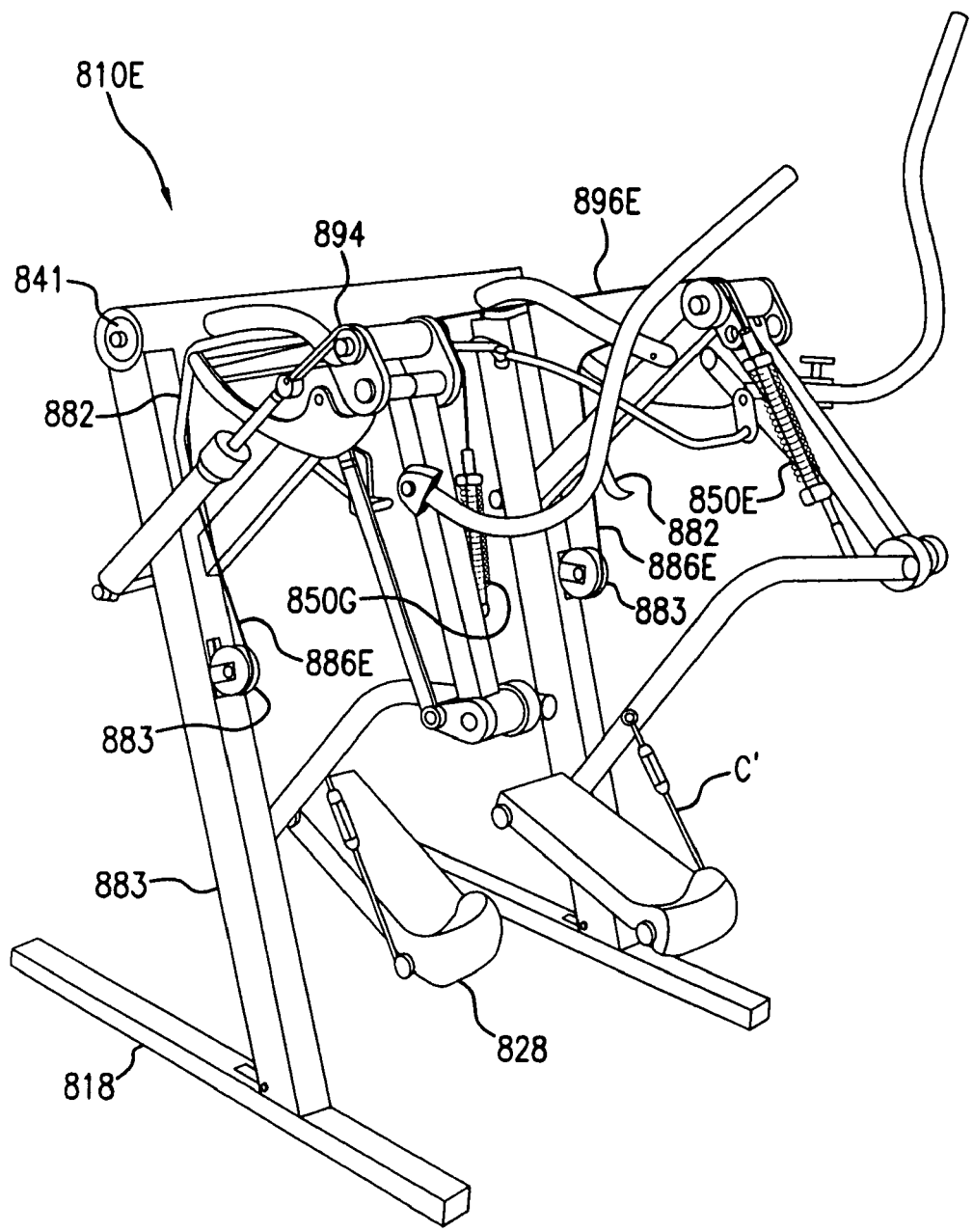
FIG. 47 is a perspective view of a twentieth embodiment of an exercise device according to the present invention featuring yet another mechanism for influencing generally horizontal leg movement. Also shown, is an alternative lift assist configuration having an adjustable means allowing the user to adjust and maintain the preset tension of the spring(s).
Figure 48:
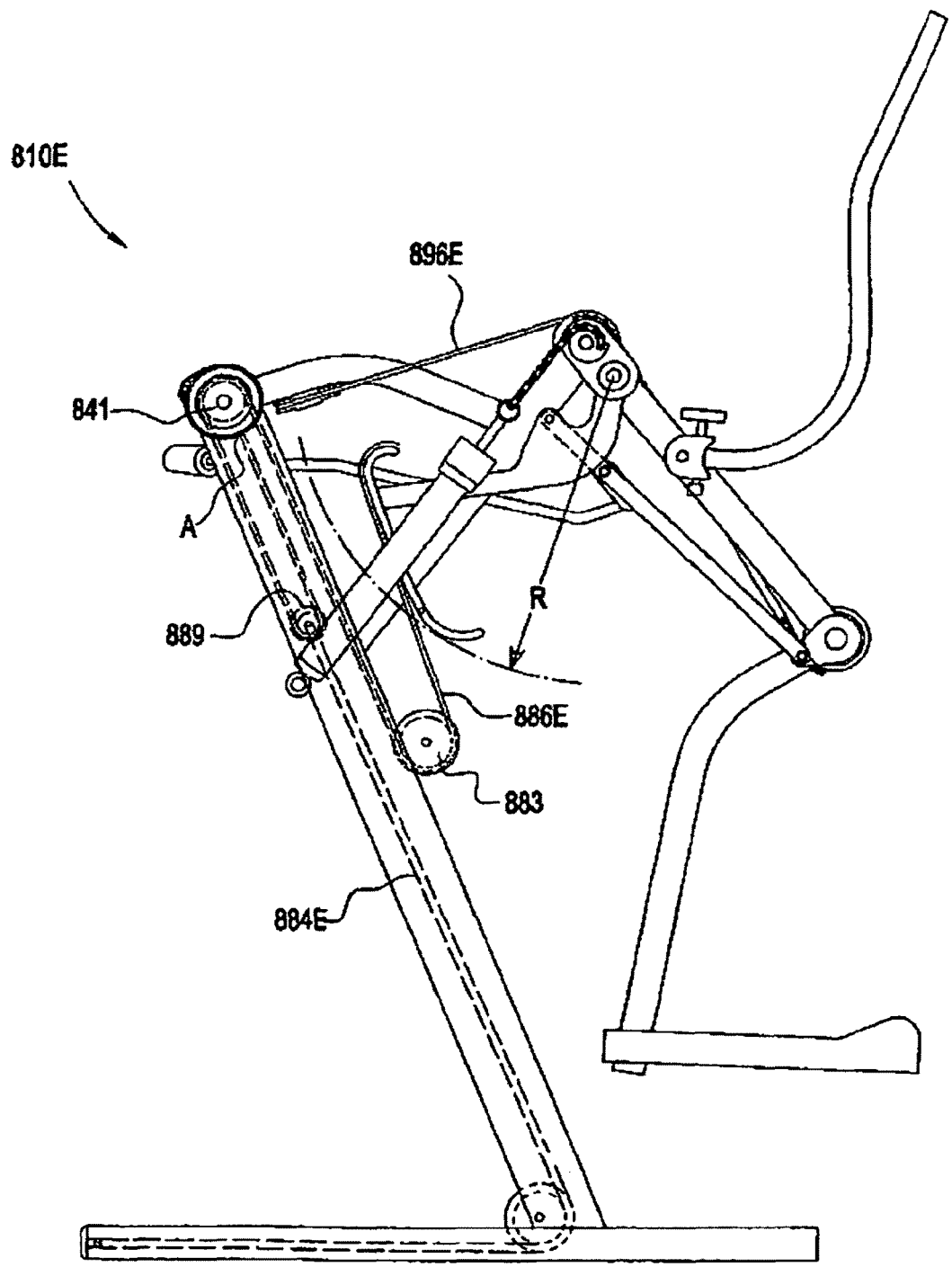
FIG. 48 is a side view of the device shown in FIG. 47, showing in hidden line form, the drive cord and stretch cord of the horizontal resistance system housed within the frame members.

Device 810E in FIG. 47 shows another spring, cable, and pulley configuration for the foot lift enhancement system, which enables the user to select a preset spring tension to best suit a desired fitness level and/or to make easier the mounting and dismounting of the device. Selecting a preset spring tension may on this device be achieved by varying the degree of stretch of extension spring 850G, then holding that stretch length, by pinning or clamping the free upper end of spring 850G to cord 896E or to rod or chain which cord 896E may attach. Stretching the spring 850G lengthens the overall length of the cord 896E assembly therefore reducing the overall lifting tension upon the lower leg linkages causing the foot platforms to remain in a general lower position. Conversely, a preset spring tension, whereby the spring 850G is held in a low or non-stretched state will create a shortened overall cord 896E assembly length and will translate to a more responsive, dynamic overall degree range of knee bending or foot platform lift speed and height.

An optional leg interlink safety system 840 has also been incorporated into device 810, as best illustrated in FIGS. 36, 39 & 44A-C, that is similar in purpose to the previously illustrated and discussed devices utilizing such a safety means, which prohibits the user from being able to simultaneously in uncontrolled fashion, move both foot platforms 828 in the same direction, which could result in the user losing balance and sustaining injury. This device 810, again uses a system very similar in appearance to the system 70 of device 10, best illustrated in FIGS. 2 & 3, as well as, integrates aspects of device 10F, best illustrated in FIG. 14. In addition to using elements from devices 10 & 10F on this device 810, this safety system is indirectly linked to each set of leg linkages through attachment to the horizontal isolation system 870. Attachment of the linkage bar 866 to the pivot bar 872 at pivotal attachment point 867 provides improved performance over the other devices of this general invention. As the leg linkages swing back and forth and the horizontal isolation system is engaged whereby the pivot bar 872 swings back and forth about hip pivot 824, attachment of the safety/suspension system 840 to the pivot bars 872 prevents the foot platforms 828 from uncontrollably moving simultaneously in the same direction. (Device 810A in FIG. 41 offers a more simplified version of the horizontal isolation system 870 which may provide a better understanding of the benefit of using the pivot bar generally indicated 872 as an attachment point for the linkage bars 866A of the safety/suspension system.) Before further discussion of the significance and advantage of these two systems being linked together, discussion of the components and operation of the basic safety/suspension system shall be explored.

FIG. 39 shows one method by which safety/suspension system 840 may be mounted to the frame of the exercise device, generally indicated 810. The safety/suspension system 840 is mounted to the frame channel 822 by way of a bolt passing through the center pivot point 861 of the safety/suspension system 840, which passes through the bearing disk 862, and then the frame channel 822 where the bolt is held into place by a lock nut. The lock nut is tightened just enough to disallow up and down movement of the safety/suspension swing plates 863 & 864, yet allow free back and forth movement. The frame channel 822 unto which the safety/suspension system 840 is pivotally mounted is welded to the underside of frame bridge tube 820 at a middle or centered location. The bearing plate 862 sandwiched between the safety/suspension system 840 and the frame channel 822 is provided to reduce friction and noise between these moving parts.

FIG. 44A shows the safety/suspension system 840 in a neutral position. Neutral position is the position upon which the user stands in a vertical upright position relative to a position when standing upright on a level surface plane. Further, in this neutral position, the pivot attachment point of the pivot bars to the safety/suspension plates 863 & 864, are at or near straight alignment with the center pivot axis 861. The only way to cause this neutral position to change is to simultaneously pull or push the left and right hand linkage bars 866. The left and right hand safety/suspension plates 863 & 864 are held in a tight rigid position against rotating upon each other about their center pivot location 861, due to the use of the dual hydraulic cylinders, each attaching one safety/suspension plate to the other. Each of the hydraulic cylinders 853 with return springs are of a different variety, where one is an extension type and one is the compression type, where each are designed to require the same force to manipulate or move the extension rod. If both of these cylinders where forced to be mounted to share two individual bars each inserted through each mounting post, where the bars would be held parallel to each other and perpendicular to the cylinders, and where each cylinder would lay parallel to one another. The result would be that the bars would be held a distance from one another equaling the length of each cylinder, plus the extension rod distance when half way out from each cylinder. The bars would also be in a very rigid holding pattern from one another and could only be pushed toward or pulled away from each other in a slow controlled fashion, in that in either direction, at least one of the cylinders is controlling the rate of movement.

As FIG. 44A shows the safety/suspension system 840 in neutral position, FIG. 44B shows what the system looks like when the user is in rearward tilt or uphill climbing position. Further, FIG. 44C shows system 840 position when user is tilted forward or is in the downhill body tilt angle.

In this dual cylinder arrangement, components are held very firm whereby the pivotal attachment points of various components are forced against each other, therefore eliminating sources of sloppiness or play in the system. In a more simplified embodiment, safety/suspension system 840E, in FIG. 45A achieves similar results, through the use of a single dual action hydraulic cylinder 853. The dual action cylinder 853 of this system 840E, holds the safety/suspension plates in a firm relationship to one another and resists sudden movement against the user pulling forward or backward, same as in device 840, which only allows gradual tilting of the users upright position. The spring 859 shown in FIG. 45, may be added to counterbalance the slight back tilting influence of the vertical resistance system due to the slight above hip pivot positioning of the upper pull spool 897.

Another variation of a safety/suspension system, illustrated at 840F in FIG. 45B, shows a manually activated brake 879 and a ball detent 878 to secure and maintain the tilt of the user by forcing or encouraging the angle of the safety/suspension plates 863 & 864 to maintain their position relative to each other, whereby the user does not have to maintain their position through the steady hold of body weight. The brake 879 engages adjacent edges of the plates and is activated via a lever and cable assembly that can be mounted on an arm extension as shown, the frame, or anywhere else within the reach of the user. Although the device in FIG. 45B is shown having both a brake and a ball detent mechanism, it will be appreciated that device could include one or both of these features.

Figure 35:
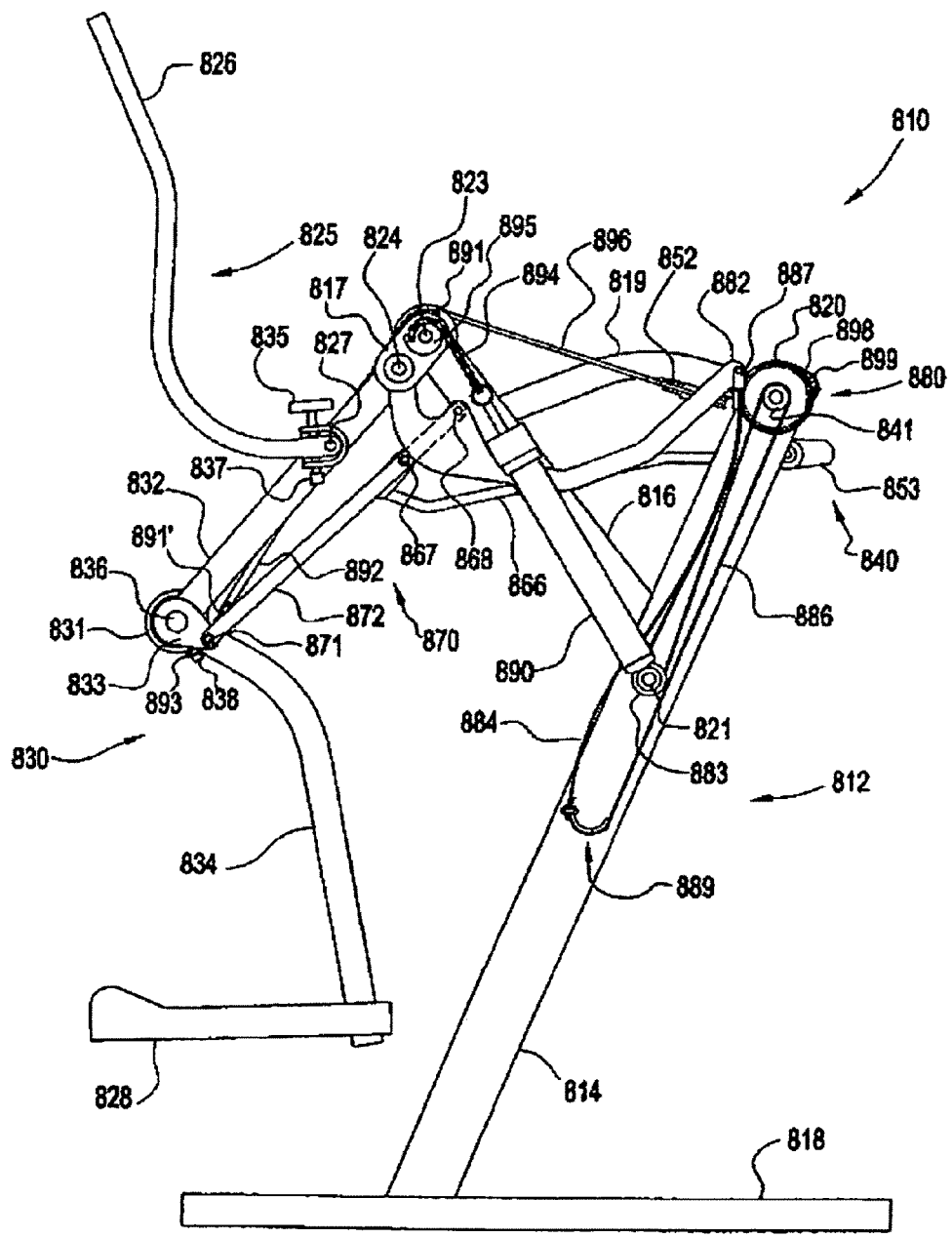
FIG. 35 is a side view of the device illustrated in FIG. 34.
Figure 40:
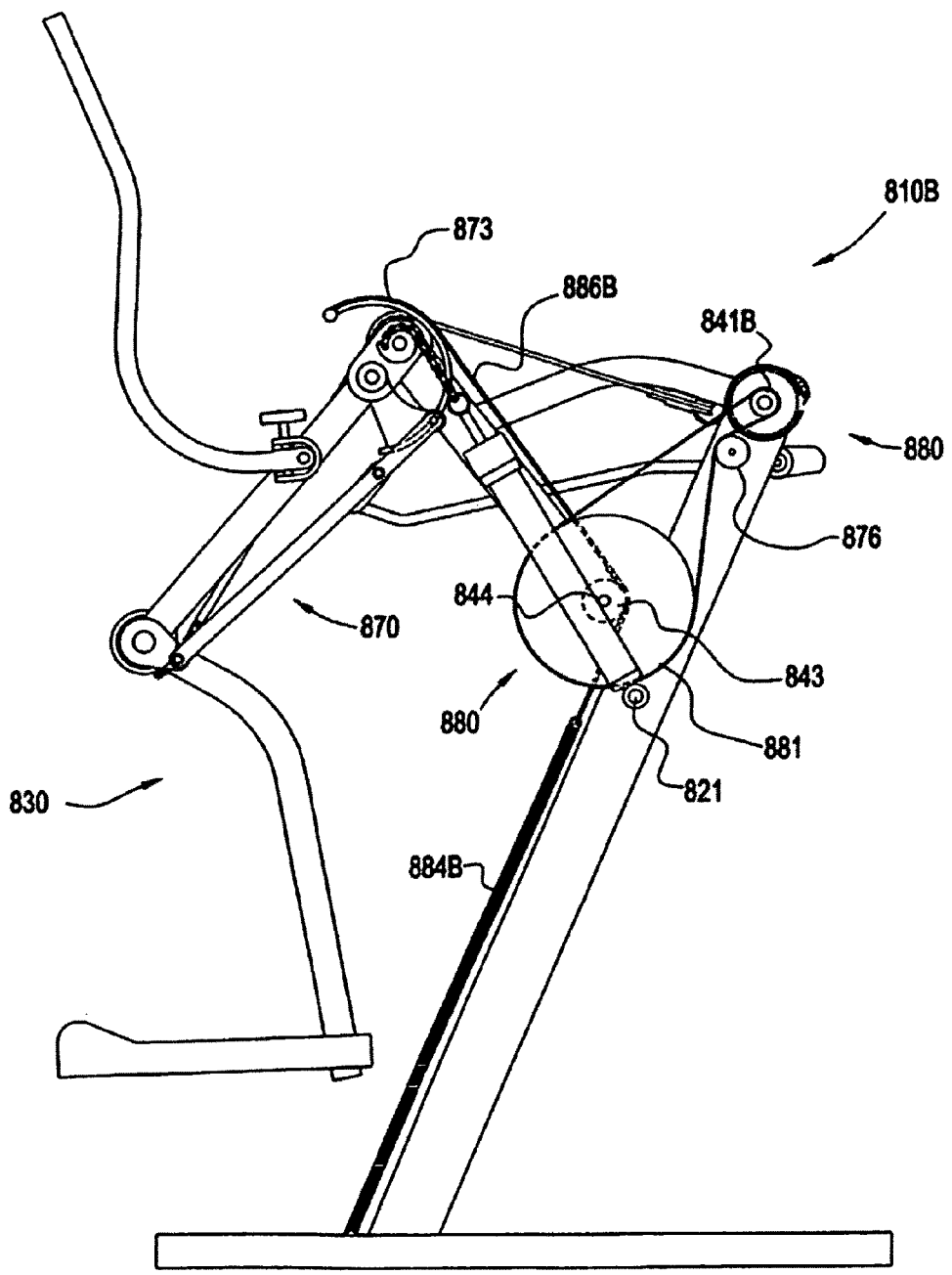
FIG. 40 is a side view of a sixteenth embodiment of an exercise device according to the present invention having an alternative horizontal resistance system.

FIG. 40 shows another modification of an exercise device according to the present invention, designated as 810B, that is similar to the device shown in FIG. 35 but with an alternative method of engagement of the horizontal resistance system 880. Used instead of the lifting arm 882 as one of the primary components of the horizontal isolation system 870, generally indicated as a component of device 810 in FIG. 35, the lifting arc 873 is used to pull the transmission belt 886B to indirectly drive the drive pulley 841, which engages the horizontal resistance system 880. As the leg linkages swing rearward, the lifting arc 873 pulls the transmission belt 886B as the lifting arc is forced to rotate forward about the hip pivot as the leg linkages 830 swing rearward. The rotation of the lifting arc 873 provides a consistent platform upon which the transmission belt will indirectly drive the drive pulley 841. As the lifting arc 873 has a relatively small radius, small so as not to interfere with the user, the amount of pulling distance upon the transmission would be too small to cause the flywheel of the horizontal resistance system 880 to rotate enough to generate the desired resistance curve. Therefore, as a method of gearing up the performance, or amplify the minimal pulling capacity of the lifting arc 873, a sub-drive pulley or cam 844 affixed or coupled to a large drive disk 881 has been added to this device 810B. If utilizing the horizontal resistance system 880, featuring the one-way clutches bearings mounted internally within the flywheel 842, as shown in FIG. 38, then the sub-drive pulley 841 would be affixed to the drive disk. Therefore, in use, the sub-drive pulley and drive disk would rotate counterclockwise in the drive mode or as the leg linkages 830 travel rearward, and would than reverse direction and travel clockwise as the reset spring 884B resets the system.

A more efficient system using generally the same components shown in FIG. 40, would consist of the relocating of the one-way clutches bearings 844 to a press mounted location within each sub-drive pulley. Relocating the one-way clutch bearings allows for a more simplified flywheel assembly, eliminating the need for the clutch/bearing housing 845 and dual shafts 843. Noise created by the free-wheeling clutch bearings is much less a concern in this design configuration due to the much slower frequency in which the one-way clutch bearings will operate, due to the relatively short arc, therefore pulling distance created by the lifting arc 873. With the one-way clutch bearings 844 relocated within the sub-drive pulleys 841 the drive disk 881 must be detached from the sub-drive pulley, now that the drive disk will operate in a continuous counterclockwise direction. Continuous rotation of the drive disks 881, rather than rotating forward and backward, allows the drive disks to contribute to the flywheel's momentum, which enables fluid operation of this device.

The sub-drive pulley with the internally mounted one-way clutches will influence the drive disks 881 to rotate counterclockwise as the clutches grip the hollow shaft affixed to the drive disk which both rotate freely about the piston mount rod 821.

Figure 41:
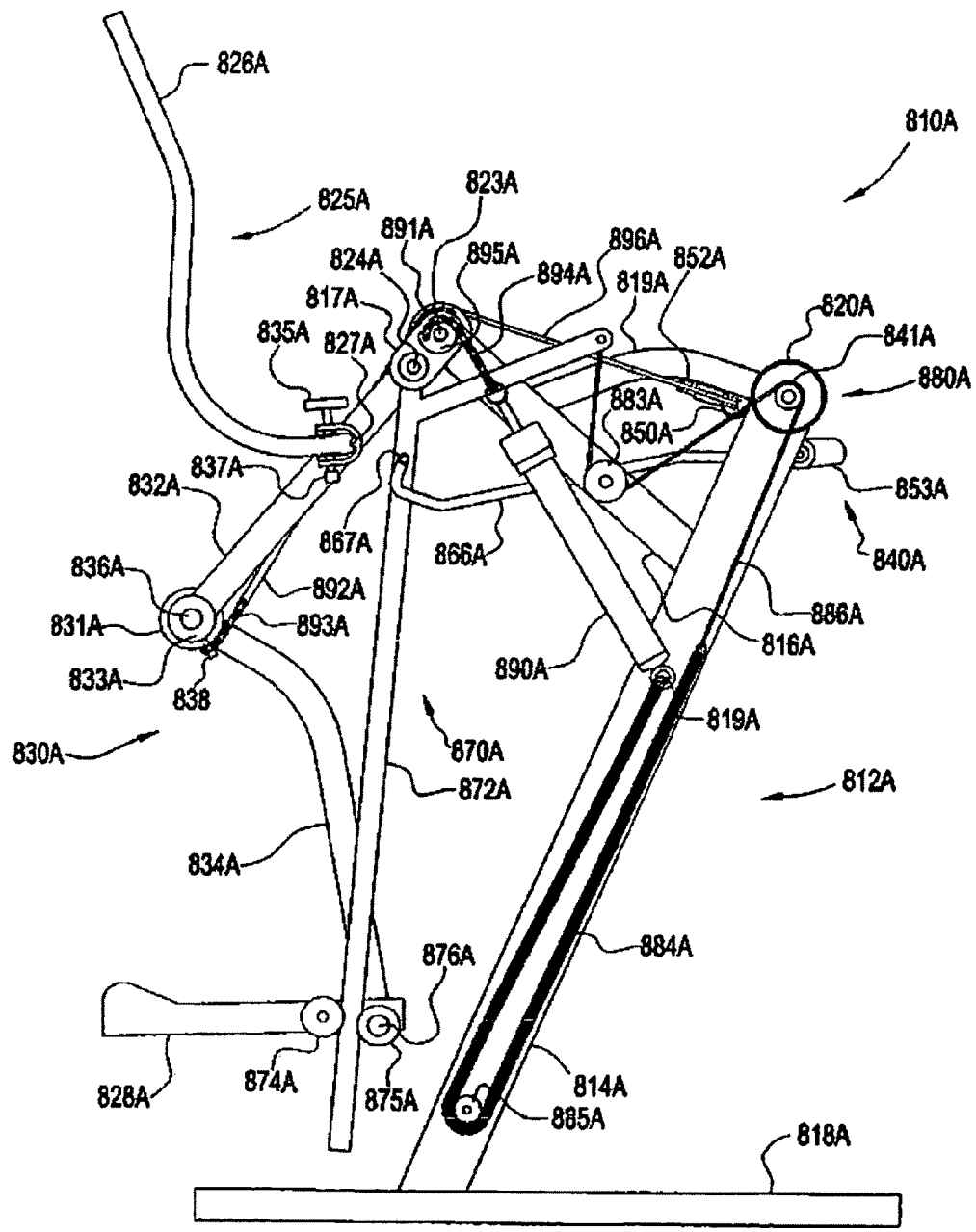
FIG. 41 is a side view of a seventeenth embodiment of an exercise device according to the present invention featuring an alternative horizontal isolation system and horizontal resistance system.

FIG. 41 shows yet another modification of an exercise device, designated 810A, which is similar to the devices described above, but with a more basic mechanism for isolating and activating horizontal resistance. Before describing the method of operation of this horizontal resistance system 880A, Illustrated in FIG. 41 the horizontal movement isolation system 870A features a left and right hand pivot bar or tube 872A, which is pivotally mounted near or to the hip pivots 824A, and extends downward toward the ground or may indirectly route to a point at or below the lowest dropping point of each foot platform 828A. Mounted to each foot platform or near to it, are affixed guide rollers 874A and 875A which are spaced such as to surround and hold firm pivot bar 872A, yet allow foot platforms 828A to be able to lift and lower in free unrestricted fashion. It should be appreciated that the pivot bar 872A could be constructed using telescoping members, whereby the rollers 874A & B could be eliminated, as one telescoping member would pivotally attach near or at the foot platform. It should also be appreciated that low friction guide members could be substituted for the rollers. Now, looking at FIG. 41, one can see that the foot platforms 828A can move up and down in stepper mode fashion while not causing the pivotal movement of pivot bar 872A, which when left undisturbed will not engaged resistance system 840A. Pivot bar 872A is linked to horizontal resistance system 880A directly from the extension arm 873A, which is affixed to the pivot bar 872A at one end, where the opposite end is attached to the resistance pull cord 886A. The attachment point between the extension arm 873A and the pull cord 886A should be a distance great enough away from the hip pivot, where the arc distance of travel is great enough to cause adequate rotation of the internal flywheel, located within frame bridge tube 820A. To successfully simulate human forward travel on various sloped grades, a certain balance between the Flywheel mass, rotation speed and braking force against the flywheel rotation must be carefully considered. The resistance pull cord 886A will activate the horizontal resistance system 880A as the pivot bar 872A with affixed arm 873A rotate counterclockwise, thus pulling the pull cord 886A. The pull cord 886A engages the horizontal resistance system 880A by engaging the drive pulley 841A after first encircling idler guide pulley 883A. As the pull cord 886A is pulled by the pivot bar arm 873A, the frictional engagement between the pull cord and the drive pulley 841A causes the drive pulley to rotate, which in turn, causes the internal frame tube flywheel 842 to rotate within the frame tube 820A, as best seen in FIG. 39.

As the pull cord 886A, found in FIG. 41, engages the horizontal resistance system 880A, as the pivot bar pivots rearward, it should be understood that when the pivot bar pivots forward the flexible pull cord would produce undesirable slack, however with the incorporation of a spring or spring-like element to maintain tension on the cord slack is avoided. Shown in this illustration, FIG. 41, is an extension spring 884A that attaches at one end to the pull cord 886A and encircles an idler pulley 885A that is affixed near the lower portion of the frame upright tube 814A, then the spring or stretch cord attaches to the piston mount 819A. This configuration enables a spring to have sufficient length such that the pulling distance of the pull cord will only minimally stretch the spring 884A. Too short a spring, when fully stretched, would create to great a resisting force which would in turn generate an undesirable rate and resistance curve against the rearward moving leg. Three other methods of maintaining proper tension on the drive cord are illustrated in FIGS. 35, 40 & 47 as explained above. Other transmission methods could be adapted for this application, such as: direct drive systems using gears or gear segments, sprockets, rack & pinions, bows & cord spools, counter weights and so forth.

Figure 42:
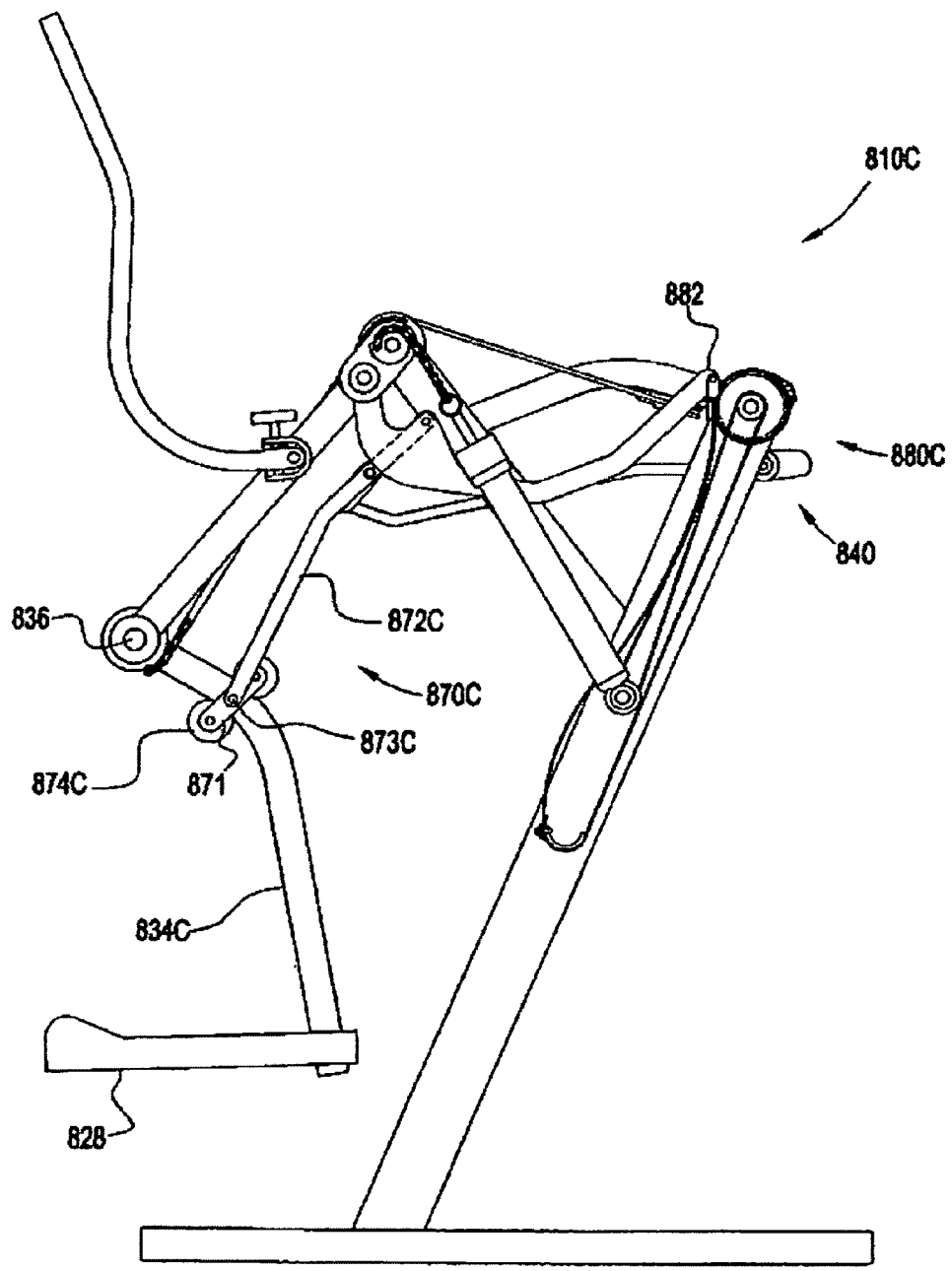
FIG. 42 is a side view of an eighteenth embodiment of an exercise device according to the present invention featuring an alternative horizontal isolation system.
Figure 43:
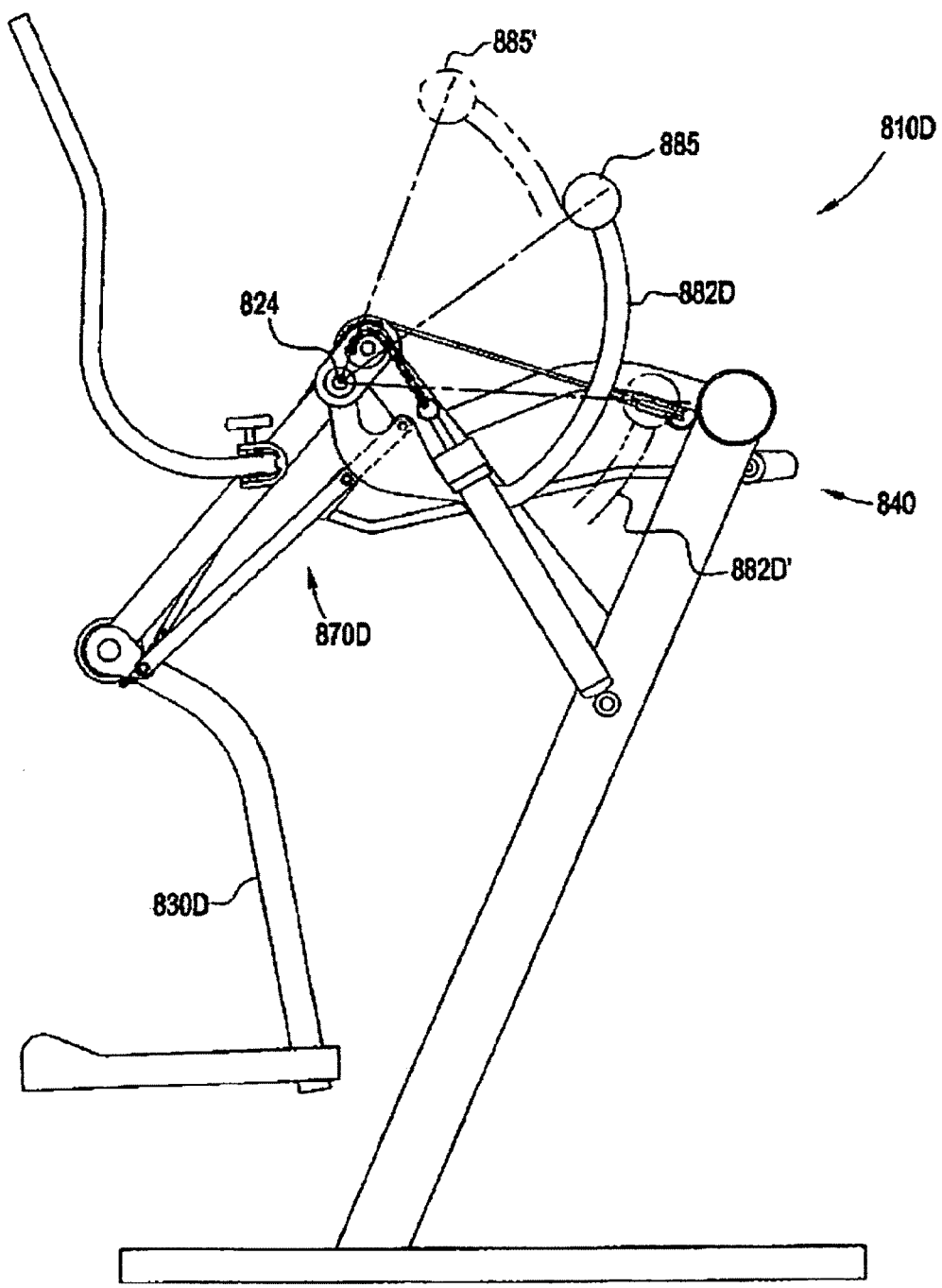
FIG. 43 is a side view of a nineteenth embodiment of an exercise device according to the present invention featuring a momentum weight shown as an alternative or additive method of influencing generally horizontal leg movement.

Other sample methods used to isolate horizontal resistance are illustrated as FIGS. 42 & 43. The exercise device 810C shown in FIG. 42 illustrates another variation of the horizontal isolation system 870C in which a mechanism causes the lift arm 882 to engage the horizontal resistance system 880. As is the case with devices 810 and 810B, the lift arm 882 is pushed upward by the upward moving pivot bar 872C as the leg linkages 830 swing rearward. Located and pivotally mounted to the lower end of the pivot bar 872C, is a pair of guide rollers 874C, held in position by mounting plates 871, so that the guide rollers firmly embrace the lower leg link tube 834C, yet only allows the lower link tube 834C to pass through when the lower link tube pivots up and down from the knee pivot 836. In stepper mode where activation of the horizontal resistance system 880C is not wanted, the pivot bar remains virtually in stationary position as the foot platforms 828 move up and down. As the foot platforms 828 move up and down, and the knee pivot travels upward, the lower leg link tube 834C passes through the guide rollers 874C, without causing the pivot bar 872C to move. Conversely, in the ski mode, as the foot platforms 828 travel rearward while the upper and lower leg linkages 830 remain in affixed position to each other, the pivot bar 872C is forced to travel along with the rearward moving lower leg tube 834C. The guide roller 874C remain held in the same position about the lower link tube 834C as the angle of the lower link tube does not allow the guide rollers to advance up the lower link tube.

Another method of influencing horizontal movement is illustrated as device 810D in FIG. 43. Featured in this device is the momentum weight 885, which may be affixed or made part of the lifting arm 882D or may be removable and re-attachable to positions varying from near to away from the hip pivot 824. The purpose of the momentum weight 885 is to add mass to the horizontal isolation system 870D in a position generally above and rearward to the hip pivot to influence the rate of rearward leg swing, as well as, assist in the forward return of the leg linkages 830D which adds fluidity to the leg swing rhythm. As the momentum weight is or becomes a part of the lifting arm 882D of the horizontal isolation system 870D, the movement of the momentum weight 885 will occur only when lower leg linkage 834 travels along the horizontal plane. Initially at the beginning of the exercise movement, the rearward moving leg of the user, experiences some resistance as the momentum weight 885 must be raised upward from a rest position. This raising of the momentum weight 885 from an at rest position, simulates the force needed to move the body forward from a rest position as one begins to walk or cross country ski in the natural world. Once the exercise has begun, the momentum weight 885 still further contributes to the simulation accuracy of horizontal travel, as the momentum weight 885 swings up and down as the lower leg linkage 834 swings back and forth. As the lower leg linkage 834 completes the rearward stroke, the momentum weight 885' will begin to fall, as gravity dictates, and the falling momentum weight 885' helps return the leg linkages 830 to the forward position. As the user begins to drive the foot platform 828 rearward once again, the user will once again experience some resistance as the momentum weight 885 still has at that point some forward momentum.

The use of the flat spring 884 as shown in FIGS. 35-37 & 42 has several advantages over the other methods described above in that 1) the flat spring 884 acts like a push rod enabling the transmission belt to drive the drive pulley 841 as the lift arm 882 pulls the transmission belt 886, then the flat spring pulls the transmission belt back through its configured path to a reset position, 2) the flat spring creates and maintains a near constant level of minimal tension adequate enough to generate enough frictional force between the transmission belt and the drive pulley to drive the drive pulley and further enough tension to disallow slack to be created in the transmission belt as the belt is forced to its reset position, yet not produce an excess of resistance which would diminish smooth operation; 3) the flat spring is caused to produce an arc shape about which the transmission belt will follow, maintaining a near consistent pulling of the transmission belt throughout the full range of motion.

Without the momentum weight 885 or horizontal resistance system 880 used on the previously described devices, the user's feet would travel rearward too quickly and out of natural rhythm. Simulating a natural rhythm will offer greater realism and comfort to the user. As the rate of descent of the lower linkage 834 slows down, as the vertical resistance system is increased, the need to control the rate of horizontal rearward movement becomes more important. If the user's legs swung backward at a rate much quicker than the feet drop, the result would be awkward and uncomfortable. Alone, as the only means to influence horizontal movement, the momentum weight 885 is an inexpensive and effective means that will add a degree of simulation accuracy to the exercises, yet may further be married to the previous described horizontal isolation systems 870 to add further fluidity and consistent rhythm.

Changing the amount of weight of the momentum weight 885 and/or its mounted position toward or away from the hip pivot 824 will have an influence on the amount of resistance the user may feel and the frequency of the leg swing. The further away or the heavier the weight, the greater the momentum influence, whereby the frequency of the swing rhythm will slow down. A slower swing rate is more suited for walking while a faster swing rate is more suited for running or fast cross country ski simulation. It should be appreciated that a more sophisticated version of this device could be produced where the momentum weight would automatically move toward or away from the hip pivot to better suit the exercise mode selected by the user or by computer control. It should further be appreciated that the momentum weight could be attached toward the lower end of the transmission belt in a married format to a device, such as 810 in FIG. 35. The momentum weight may also be suspended from a linkage attached to the lift arm, to lower the center of gravity, making the device less top heavy.

It should also be appreciated that in any embodiment of the exercise device described herein, the horizontal isolation system 870-870D as a mechanical system, could be replaced with a computer controlled system able to sense the movement chosen by the user and select and apply a force(s) against the movement of the appropriate leg linkage component(s).

As mounting and dismounting from this device could be intimidating for certain individuals it should be appreciated that elements could be added to this device to make mounting and dismounting easier. One such method would be to provide a raised platform independent to or apart of the lower frame, positioned just forward to the foot platforms when foot platforms are at rest position, whereby the mounting and dismounting height is reduced. Another method could include a lever-activated mechanism, which could draw down the foot platforms and hold in a lowered position. In a more sophisticated device, the foot platforms could be lowered and held stationary automatically, when the user is not on the machine or when the user is not in exercise mode.

FIG. 46 illustrates arm handles, levers or poles 826, which are held in tight position within a mounting holster, which is welded to the upper leg linkage. The mounting holster is provided with two separate and opposing screw clamping pins 835, which clamp against the base portion of the arm handle. Each screw clamping pin may be fine adjusted to cause the angle of the arm lever to change, or in other words the distance of the handle grips of the upper end of the arm handle to position nearer or further from the user.

Referring again to FIG. 37, an arm pole 826 is shown in a folded down position. Also shown in this Figure is a climbing pole 855 with handle 856, which allows the user to perform a climbing exercise. It should be appreciated that other design variations could be had which provide climbing handles, which may be linked to the frame and to and driven by the lower leg linkages.

FIG. 47 shows yet another modification of an exercise device according to the present invention, designated 810E, which is similar to the device shown in FIG. 35, but with an alternative force transmission assembly for the horizontal resistance mechanism. Instead of the flat spring and transmission belt assembly shown in FIG. 35, the horizontal resistance mechanism in FIG. 47 includes a flexible belt or cable 886E extending downwardly from lift arm 882 to a pulley 883 mounted on frame 812 at or near the point of attachment of cylinder 890. Cable 886E loops under pulley 883 and extends upwardly therefrom to pulley 841 that drives the flywheel via the one-way clutch. Cable 886E loops over pulley 841 and extends downwardly therefrom to idler pulley 889 where it is redirected upwardly to a point of attachment A on frame 812. Idler pulley 889 is mounted at the free end of an elastic spring or cord 884E that is fixed to the frame to create a generally constant tension in cable 886E via the idler pulley to eliminate slack in the horizontal isolation system throughout the range of motion of the leg members. It will be appreciated that the spring-loaded cable and pulley assembly shown and described engages the rest of the horizontal isolation system to resist rearward movement of the user's legs while also assisting forward movement of the user's leg on the return stroke, while also resisting excessive forward movement and ease the change of direction during an exaggerated forward stroke. If desired, a momentum weight can be attached to lift arm 882 as shown in FIG. 43, or hanged from idler pulley 883 or 889 on device 810E, to increase resistance to rearward movement of the user's legs and influence the rate of movement and change of direction of the rearward and forward moving leg. Suspending the momentum weight from idler pulley 889 cuts the travel rate of the momentum weight in half, whereby greatly reducing the risk of over lift, as the weight is drawn upward by the rearward moving leg.

It should be further appreciated that any embodiments of the exercise device according to the present invention could be linked to a computer system as an input device, to help generate perhaps a digital figure to provide feedback to the user through a distant or head mounted monitor(s) for the purpose of providing entertainment, training, or rehab biofeedback and such. To further aid in the versatility of this device as an input tool for a computer, an under foot sensor could be installed under each of the user's feet to register a turning intent by the user to add a turning dimension to the program.

It should be further appreciated that manual manipulation or computer controlled devices can manipulate and adjust resistance sources and the suspension system to produce a range of simulation possibilities to numerous to list.

Details of the invention discussed above or shown in the accompanying drawings should be interpreted as illustrative only, as the scope of the invention is not intended to be limited to the exact details shown or described. For example, the components of the exercise device can be made of any suitable materials and can be made of multiple parts of various configurations to simplify assembly and/or reduce manufacturing and shipping costs. Furthermore, the features of the various embodiments described above can be combined to produce other embodiments that remain within the scope of the present invention.

The frame can have any configuration to support a user standing on the foot supports including, but not limited to, configurations wherein one or two uprights extend upwardly from a horizontal base or configurations wherein the frame is mounted on or part of a wall or ceiling. Any suitable structural members can be used in fabricating the frame including, but not limited to, solid or hollow members formed of metal, plastic or reinforced plastic materials.

The links can be straight, curved or angled and can be formed of any suitable material, such as metal, plastic or reinforced plastic, in solid or hollow configurations. While the linkages preferably include two links, it will be appreciated that any number of links can be used to suspend the foot supports from the frame. Preferably, the upper and lower links correspond substantially in overall length to the length of a user's upper and lower legs, respectively, to provide the greatest degree of realism possible. One or both of the upper and lower links can be configured to have an adjustable length, for example, by forming one or both of the links using telescoping members which are threadedly connected so that users can change the length of the links to suit their preference. As mentioned above, the upper link can also be a track defining a path of movement of the pivoted upper end of the lower link. While such a track is shown and described herein as being formed of square tubing, it will be appreciated that other configurations are can be used including but not limited to, configurations wherein the rollers on each side the linkage rest upon separate tracks or configurations wherein the lower linkage is suspended from a bracket extending around the track.

The foot supports can extend inwardly or outwardly of the linkages or be disposed beneath, to the rear of or forwardly of the linkages. The lower links can be attached to the foot supports near the fount, rear or medial portions of the foot supports. The foot supports are preferably provided with foot restraints to, among other things, prevent the user's feet from sliding off the foot support platforms in a forward direction; however, foot supports without restraints can also be used. While foot restraints in the form of toe kicks and straps have been illustrated and described, it will be appreciated that other types of foot restraints can be used including, but not limited to, clips, suction devices and tacky surfaces. Foot restraints in the form of heel kicks may also be provided on the rear or medial portions of the foot supports, if desired. The foot supports can be configured to be adjustable in terms of tilt relative to the lower links, for example by mounting the foot supports as shown in FIG. 36 so that they pivot about a point P on the lower links and are each held in place by a suspension cable C extending from one of a series of point attachments A1, A2 or A3 on the link to a point near a free end of the foot support. Moving the cable from one point on the link to another point on the link results in a different degree of tilt, thereby altering the attitude of the user's foot for a customized workout. Alternatively, a suspension cable or threaded rod(s) with a turnbuckle or other tensioning device can extend from a fixed position on the lower link to the foot support to permit tilt adjustment of the foot support by loosening or tightening the suspension cable.

The horizontal resistance system and/or the safety/suspension system, when provided, can be configured such that one or more of their components are concealed within the frame of the device, or within shrouds that are attached to the frame of the device so as to conceal system components.

In addition to the walking, stair climbing, running and cross-country skiing motions described above, the exercise device according to the present invention facilitates skipping, dragging weight, leg extension thrusts, hamstring, and steep hill climbing exercises. If provided with a seat, the exercise device also permits a user to perform realistic cycling exercises. The exercise device can be used for physical therapy and rehabilitation. Furthermore, if equipped with sensors, the exercise device could become part of a virtual reality system in which the user's motions are sensed and used to create a virtual display.

Although this invention has been described in connection with specific forms and embodiments thereof, it will be appreciated that various modifications other than those discussed may be resorted to without departing from the spirit or scope of the invention. For example, functionally equivalent elements may be substituted for those specifically shown and described, and in the process method steps described, particular steps may be reversed or interposed, all without departing from the spirit or scope of the invention as defined in the appended Claims.

What is claimed is:

1. An exercise device comprising:
    a frame;
    a first upper leg link and a second upper leg link, each pivotally coupled to the frame;
    a first lower leg link pivotally coupled to the first upper leg link and a second lower leg link pivotally coupled to the second upper leg link, each lower leg link including a foot support;
    a lower leg link cable directly coupled to the first lower leg link and the second lower leg link by way of at least two pulleys pivotally mounted to the frame; and
    an upper leg link cable system comprising a first cable segment and a second cable segment, both coupled to and not extending past a first upper leg link driver and a second upper leg link driver, each pivotally mounted to the frame, whereby the upper leg link cable system provides a continuous loop enabling bidirectional substantially reciprocating angular displacement of the first upper leg link relative to the second upper leg link, the first driver and second driver are disposed at an upper portion of their respective leg link.

2. The exercise device as recited in claim 1, wherein the first upper leg link driver is a substantially circular disk mounted to the first upper leg link, and pivotally coupled to the frame about an axis of the substantially circular disk.

3. The exercise device as recited in claim 1, wherein the second cable segment is received by at least one pulley mounted to the frame and operationally positioned between the first upper leg link driver and the second upper leg link driver.

4. The exercise device as recited in claim 1, wherein the second cable segment is comprised of two cable sub-segments coupled to the first upper leg link driver and the second upper leg link driver, and a compliance mechanism connecting the cable sub-segments.

5. The exercise device as recited in claim 4, wherein the compliance mechanism is comprised of a hydraulic cylinder.

6. The exercise device as recited in claim 4, wherein the compliance mechanism is a damper with a spring return.

7. The exercise device as recited in claim 1, wherein the first cable segment is comprised of two cable sub-segments coupled to the first upper leg link driver and the second upper leg link driver, and a compliance mechanism connecting the cable sub-segments.

8. The exercise device as recited in claim 7, wherein the compliance mechanism is comprised of a hydraulic cylinder.

9. The exercise device as recited in claim 7, wherein the compliance mechanism is a damper with a spring return.

10. An exercise device comprising:
    a frame;
    a first upper leg link and a second upper leg link, each pivotally coupled to the frame;
    a first lower leg link pivotally coupled to the first upper leg link and a second lower leg link pivotally coupled to the second upper leg link, each lower leg link including a foot support; and
    a system comprising a lower leg link cable directly coupled to the first lower leg link and the second lower leg link by way of a pulley pivotally mounted to the frame; and an upper leg link cable system comprising a first cable segment coupled to a first upper leg link driver and a second upper leg link driver and a second cable segment, both coupled to and not extending past the first upper leg link driver and the second upper leg link driver, each upper leg link driver pivotally mounted to the frame, whereby the upper leg link cable system provides a continuous loop enabling bidirectional substantially reciprocating angular displacement of the first upper leg link relative to the second upper leg link, the first driver and second driver are disposed at an upper portion of their respective leg link.

11. The exercise device as recited in claim 10, wherein the first upper leg link driver is a substantially circular disk mounted to the first upper leg link, and pivotally mounted to the frame about an axis of the substantially circular disk.

12. The exercise device as recited in claim 10, wherein the second cable segment is received by at least one pulley mounted to the frame and operationally positioned between the first upper leg link driver and the second upper leg link driver.

13. The exercise device as recited in claim 10, wherein the second cable segment is comprised of two cable sub-segments coupled to the first upper leg link driver and the second upper leg link driver, and a compliance mechanism connecting the cable sub-segments.

14. The exercise device as recited in claim 13, wherein the compliance mechanism is comprised of a hydraulic cylinder.

15. The exercise device as recited in claim 13, wherein the compliance mechanism is a damper with a spring return.

16. The exercise device as recited in claim 10, wherein the first cable segment is comprised of two cable sub-segments coupled to the first upper leg link driver and the second upper leg link driver, and a compliance mechanism connecting the cable sub-segments.

17. The exercise device as recited in claim 16, wherein the compliance mechanism is comprised of a hydraulic cylinder.

18. The exercise device as recited in claim 16, wherein the compliance mechanism is a damper with a spring return.

19. A method of performing physical exercise for use with an exercise device including a frame; a first upper leg link and a second upper leg link, each pivotally coupled to the frame; a first lower leg link pivotally coupled to the first upper leg link and a second lower leg link pivotally coupled to the second upper leg link, each lower leg link including a foot support; and a system including a lower leg link cable directly coupled to the first lower leg link and the second lower leg link by way of a pulley pivotally mounted to the frame; and an upper leg link cable system comprising a first cable segment coupled to a first upper leg link driver and a second upper leg link driver and a second cable segment, both coupled to and not extending past the first upper leg link driver and the second upper leg link driver, each upper leg link driver pivotally mounted to the frame, whereby the upper leg link cable system provides a continuous loop enabling bidirectional substantially reciprocating angular displacement of the first upper leg link relative to the second upper leg link, the first driver and second driver are disposed at an upper portion of their respective leg link, the method including the steps of:
 a user positioning their feet on the foot supports;
 moving a first foot in a user defined pattern; and
 allowing a second foot to be moved in a similar user defined pattern.

20. The method as recited in claim 19, further including the steps of:
 altering the movement pattern of the first foot to a second pattern; and
 allowing the second foot to be moved to follow similar to the second pattern.

\* \* \* \* \*